(12) United States Patent
Rogers et al.

(10) Patent No.: US 12,478,268 B2
(45) Date of Patent: Nov. 25, 2025

(54) APPARATUS AND METHOD FOR NON-INVASIVELY MEASURING BLOOD PRESSURE OF MAMMAL SUBJECT

(71) Applicant: NORTHWESTERN UNIVERSITY, Evanston, IL (US)

(72) Inventors: John A. Rogers, Wilmette, IL (US); Shuai Xu, Bala Cynwyd, PA (US); Yinji Ma, Evanston, IL (US); Jungil Choi, Evanston, IL (US); Aurelie Hourlier-Fargette, Evanston, IL (US); Yonggang Huang, Evanston, IL (US)

(73) Assignee: Northwestern University, Evanston, IL (US)

( * ) Notice: Subject to any disclaimer, the term of this patent is extended or adjusted under 35 U.S.C. 154(b) by 1184 days.

(21) Appl. No.: 16/670,161

(22) Filed: Oct. 31, 2019

(65) Prior Publication Data

US 2020/0129077 A1    Apr. 30, 2020

Related U.S. Application Data

(60) Provisional application No. 62/753,625, filed on Oct. 31, 2018, provisional application No. 62/753,453, (Continued)

(51) Int. Cl.
*A61B 5/00* (2006.01)
*A61B 5/01* (2006.01)
(Continued)

(52) U.S. Cl.
CPC ............ *A61B 5/022* (2013.01); *A61B 5/0004* (2013.01); *A61B 5/0006* (2013.01); (Continued)

(58) Field of Classification Search
CPC ..... A61B 5/022; A61B 5/0004; A61B 5/0006; A61B 5/0022; A61B 5/0024; (Continued)

(56) References Cited

U.S. PATENT DOCUMENTS 4,328,814 A * 5/1982 Arkans ................. A61B 5/303
600/397
6,654,632 B2 * 11/2003 Lange .................. A61B 5/4824
600/544

(Continued)

OTHER PUBLICATIONS

Fung et al. (2004). Continuous noninvasive blood pressure measurement by pulse transit time. Conference proceedings : . . . Annual International Conference of the IEEE Engineering in Medicine and Biology Society. IEEE Engineering in Medicine and Biology Society. Conference. 1. 738-41. 10.1109/IEMBS.200 (Year: 2004).*
(Continued)

*Primary Examiner* — Justin Xu
(74) *Attorney, Agent, or Firm* — Nolte Lackenbach Siegel

(57) ABSTRACT

Provided are apparatuses and methods for non-invasively measuring a blood pressure of a mammal subject. The apparatus includes a first sensor system and a second sensor system time-synchronized to each other and spatially separated by a pulse arrival distance L, and a microcontroller unit (MCU). The first and second sensor systems are respectively attached to first and second positions of the mammal subject for detecting first and second signals. The second position is more distal or proximal to a heart of the mammal subject than the first position. The MCU processes the output signals to determine a pulse arrival time (PAT) as a time delay $\Delta t$ between detections of the first and second signals, and determines a pulse wave velocity (PWV) based on the PAT and L, where (Continued)

$$PWV = \frac{L}{\Delta t}.$$

Then the MCU determines the blood pressure P from the PWV, where P is a parabolic function of the PWV.

42 Claims, 35 Drawing Sheets

Related U.S. Application Data filed on Oct. 31, 2018, provisional application No. 62/753,303, filed on Oct. 31, 2018.

(51) Int. Cl.

| | |
|---|---|
| *A61B 5/02* | (2006.01) |
| *A61B 5/021* | (2006.01) |
| *A61B 5/022* | (2006.01) |
| *A61B 5/024* | (2006.01) |
| *A61B 5/026* | (2006.01) |
| *A61B 5/08* | (2006.01) |
| *A61B 5/11* | (2006.01) |
| *A61B 5/145* | (2006.01) |
| *A61B 5/1455* | (2006.01) |
| *A61B 5/28* | (2021.01) |
| *H04W 4/80* | (2018.01) |

(52) U.S. Cl.
CPC .......... *A61B 5/0022* (2013.01); *A61B 5/0024* (2013.01); *A61B 5/0051* (2013.01); *A61B 5/01* (2013.01); *A61B 5/02028* (2013.01); *A61B 5/02108* (2013.01); *A61B 5/02405* (2013.01); *A61B 5/02416* (2013.01); *A61B 5/02427* (2013.01); *A61B 5/0261* (2013.01); *A61B 5/0816* (2013.01); *A61B 5/11* (2013.01); *A61B 5/14542* (2013.01); *A61B 5/14552* (2013.01); *A61B 5/28* (2021.01); *A61B 5/4205* (2013.01); *A61B 5/6801* (2013.01); *A61B 5/6823* (2013.01); *A61B 5/6825* (2013.01); *A61B 5/6828* (2013.01); *A61B 5/683* (2013.01); *A61B 5/6833* (2013.01); *A61B 5/7207* (2013.01); *A61B 5/7225* (2013.01); *A61B 5/7285* (2013.01); *A61B 5/7405* (2013.01); *A61B 5/742* (2013.01); *A61B 5/746* (2013.01); *A61B 5/747* (2013.01); *H04W 4/80* (2018.02); *A61B 2503/045* (2013.01); *A61B 2503/40* (2013.01); *A61B 2560/0214* (2013.01); *A61B 2562/0204* (2013.01); *A61B 2562/0219* (2013.01); *A61B 2562/0271* (2013.01); *A61B 2562/162* (2013.01); *A61B 2562/164* (2013.01); *A61B 2562/227* (2013.01)

(58) Field of Classification Search
CPC ..... A61B 5/0051; A61B 5/01; A61B 5/02028; A61B 5/02108; A61B 5/02405; A61B 5/02416; A61B 5/02427; A61B 5/0261; A61B 5/0816; A61B 5/11; A61B 5/14542; A61B 5/14552; A61B 5/28; A61B 5/4205; A61B 5/6801; A61B 5/6823; A61B 5/6825; A61B 5/6828; A61B 5/683; A61B 5/6833; A61B 5/7207; A61B 5/7225; A61B 5/7285; A61B 5/7405; A61B 5/742; A61B 5/746; A61B 5/747; A61B 2503/045; A61B 2503/40; A61B 2560/0214; A61B 2562/0204; A61B 2562/0219; A61B 2562/0271; A61B 2562/162; A61B 2562/164; A61B 2562/227; A61B 5/282; A61B 5/352; A61B 5/02125; A61B 5/0245; A61B 5/1455; A61B 5/259; A61B 5/6832; H04W 4/80; H04L 67/12; G16H 40/63; G16H 40/67; G16H 50/50; G16H 80/00
See application file for complete search history.

(56) References Cited

U.S. PATENT DOCUMENTS

| | | | |
|---|---|---|---|
| 2007/0027383 A1* | 2/2007 | Peyser | A61B 5/6833 600/362 |
| 2008/0221461 A1* | 9/2008 | Zhou | A61B 5/02125 600/485 |
| 2013/0041235 A1* | 2/2013 | Rogers | H05K 1/0283 600/386 |
| 2015/0112164 A1* | 4/2015 | Heikenfeld | A61B 10/0064 600/584 |
| 2017/0020399 A1* | 1/2017 | Shemesh | A61B 5/02416 |
| 2017/0164876 A1* | 6/2017 | Hyde | A61B 5/1118 |
| 2017/0347894 A1* | 12/2017 | Bhushan | A61B 5/14542 |
| 2019/0343407 A1* | 11/2019 | Huijbregts | A61B 5/02125 |
| 2020/0085299 A1* | 3/2020 | Xu | H01L 24/81 |
| 2020/0337641 A1* | 10/2020 | Wang | A61B 5/1486 |

OTHER PUBLICATIONS

Lewington S (2002) Prospective studies collaboration. Age-specific relevance of usual blood pressure to vascular mortality: A meta-analysis of individual data for one mil-lion adults in 61 prospective studies. Lancet 360:1903-1913, and erratum (2003) 361: 1060.

Méndez AS, et al. (2018) Risk factors for orthostatic hypotension: Differences be-tween elderly men and women. Am J Hypertens 31:797-803.

Lewington S, et al.; China Kadoorie Biobank Consortium (2016) The burden of hypertension and associated risk for cardiovascular mortality in China. JAMA Intern Med 176:524-532.

McLaughlin AR (1928) A modified erlanger sphygmomanometer. Science 67:72-73.

Punzi HA (1998) Why ambulatory blood pressure monitoring? Am J Health Syst Pharm 55:S12-S16.

Ukawa T, et al. (2012) Novel non-invasive method of measurement of endothelial function: Enclosed-zone flow-mediated dilatation (ezFMD). Med Biol Eng Comput 50: 1239-1247.

Chandrasekhar A, et al. (2018) Smartphone-based blood pressure monitoring via the oscillometric finger-pressing method. Sci Transl Med 10:eaap8674.

Pickering TG, et al. (2005) Recommendations for blood pressure measurement in humans and experimental animals: Part 1: Blood pressure measurement in humans: A statement for professionals from the subcommittee of professional and public edu-cation of the American Heart Association council on high blood pressure research. Circulation 111:697-716.

Fuke S, Suzuki T, Nakayama K, Tanaka H, Minami S (2013) Blood pressure estimation from pulse wave velocity measured on the chest. Conf Proc IEEE Eng Med Biol Soc 2013:6107-6110.

Berkelmans GFN, Kuipers S, Westerhof BE, Spoelstra-de Man AME, Smulders YM (2018) Comparing volume-clamp method and intra-arterial blood pressure measure-ments in patients with atrial fibrillation admitted to the intensive or medium care unit. J Clin Monit Comput 32:439-446.

Scheer B, Perel A, Pfeiffer UJ (2002) Clinical review: Complications and risk factors of peripheral arterial catheters used for haemodynamic monitoring in anaesthesia and intensive care medicine. Crit Care 6:199-204.

Sharma M, et al. (2017) Cuff-less and continuous blood pressure monitoring: A methodological review. Technologies 6:21.

(56) References Cited

OTHER PUBLICATIONS

Boutry CM, et al. (2015) A sensitive and biodegradable pressure sensor array for cardiovascular monitoring. Adv Mater 27:6954-6961.

Katsuura T, et al. (2017) Wearable pulse wave velocity sensor using flexible piezo-electric film array. 2017 IEEE Biomedical Circuits and Systems Conference (BioCAS)(Inst Electr Electron Eng, New York), abstr 7208.

Hughes DJ, Babbs CF, Geddes LA, Bourland JD (1979) Measurements of Young's modulus of elasticity of the canine aorta with ultrasound. Ultrason Imaging 1: 356-367.

Timoshenko S (1940) Theory of Plates and Shells (McGraw-Hill, London).

Dagdeviren C, et al. (2014) Conformable amplified lead zirconate titanate sensors with enhanced piezoelectric response for cutaneous pressure monitoring. Nat Commun 5:4496.

Maximon LC (2003) The dilogarithm function for complex argument. Proc R Soc A 459: 2807-2819.

Morris RM, Leach PGL (2015) Symmetry reductions and solutions to the Zoomeron equation. Phys Scr 90:015202.

Chamiot-Clerc P, Copie X, Renaud JF, Safar M, Girerd X (1998) Comparative reactivity and mechanical properties of human isolated internal mammary and radial arteries. Cardiovasc Res 37:811-819.

Aurent S, et al.; European Network for Non-invasive Investigation of Large Arteries (2006) Expert consensus document on arterial stiffness: Methodological issues and clinical applications. Eur Heart J 27:2588-2605.

Acton FS (1970) Numerical Methods That Work (Harper Row, Washington, DC).

Chen Y, Wen C, Tao G, Bi M (2012) Continuous and noninvasive measurement of systolic and diastolic blood pressure by one mathematical model with the same model parameters and two separate pulse wave velocities. Ann Biomed Eng 40:871-882.

Liu Y, et al. (2018) Intraoperative Monitoring of neuromuscular function with soft, skin-mounted wireless devices. npj Digital Med, 1:19.

Jang KI, et al. (2017) Self-assembled three dimensional network designs for soft electronics. Nat Commun 8:15894.

Li H, et al. (2017) Epidermal inorganic optoelectronics for blood oxygen measurement. Adv Healthc Mater, 6:1601013.

doi.org/10.1073/pnas.1814392115 Yniji Ma et al. "Relation between blood pressure and pulse wave velocity for human arteries" PNAS (published Oct. 15, 2018).

* cited by examiner

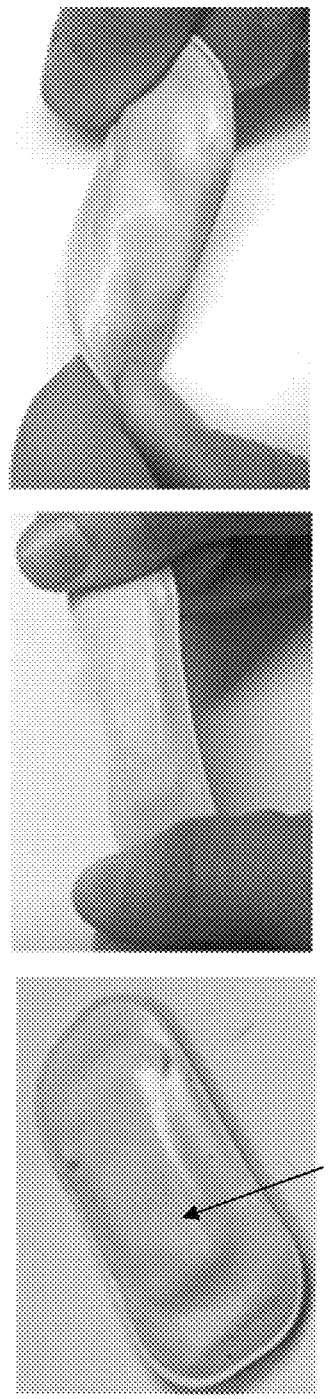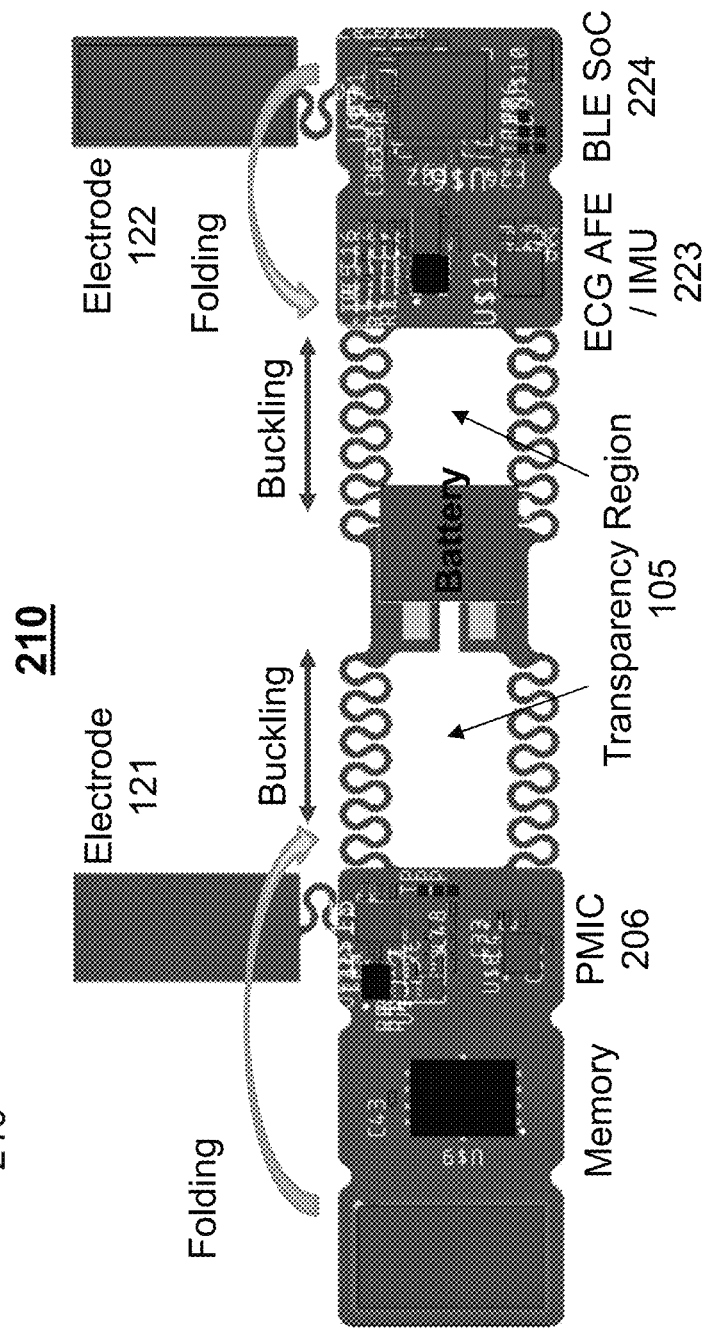
FIG. 2D

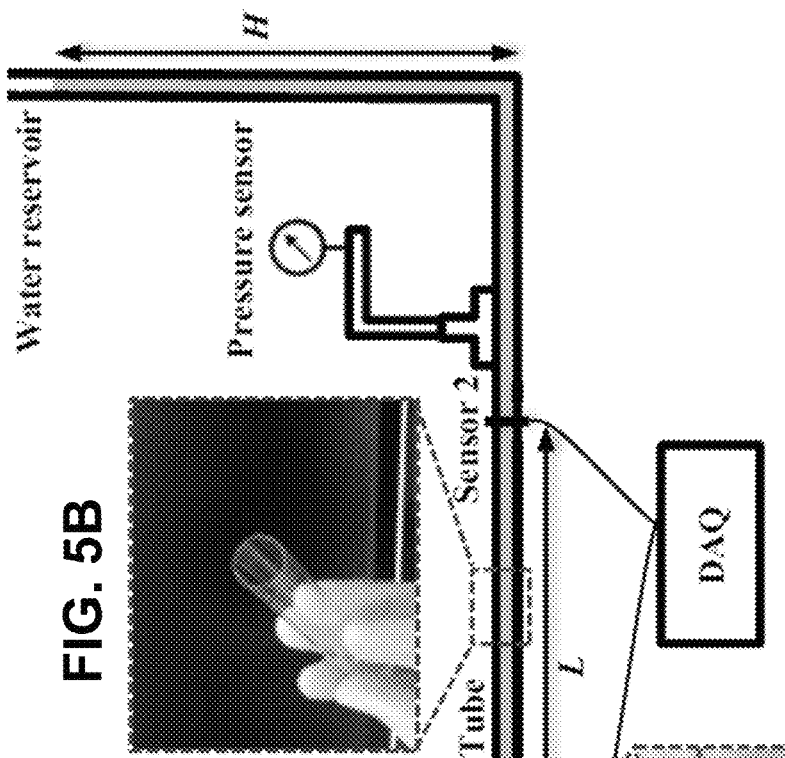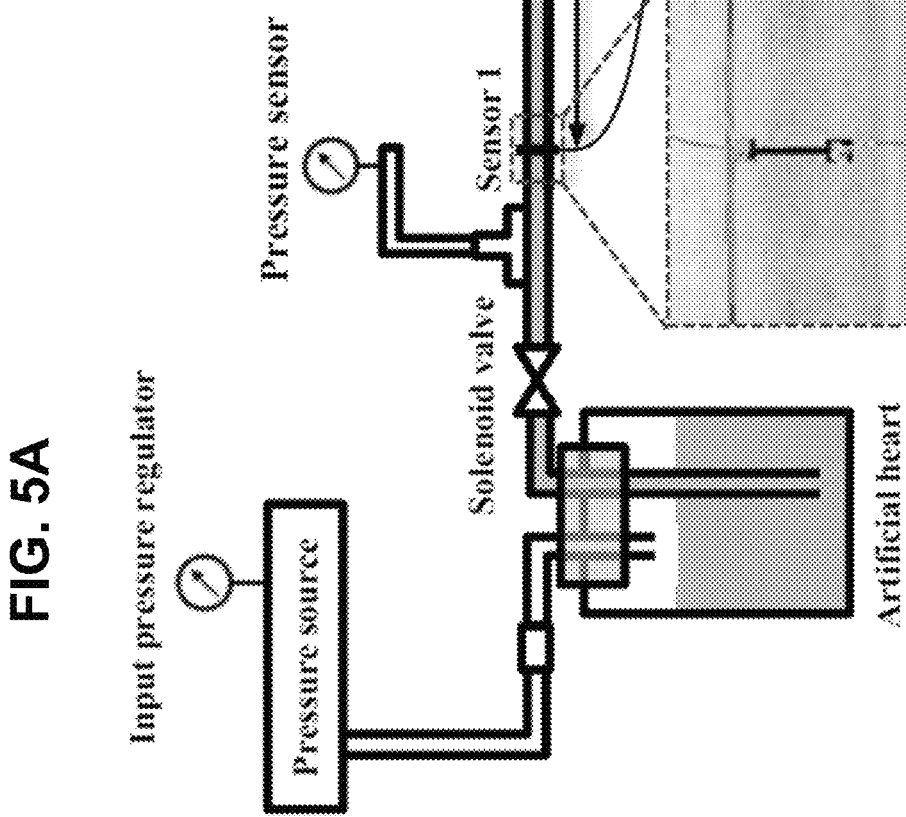
FIG. 5A
FIG. 5B
FIG. 5C

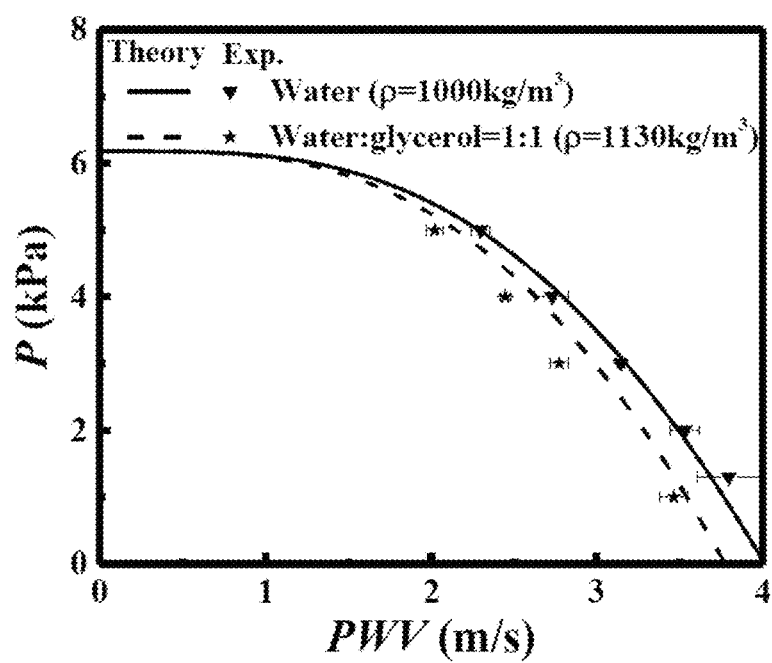
FIG. 11
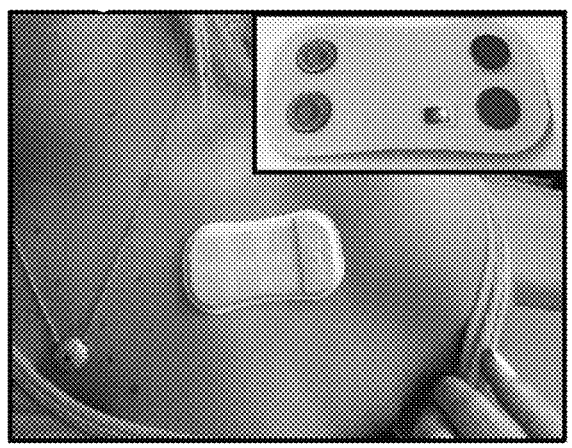 
FIG. 12A  FIG. 12B

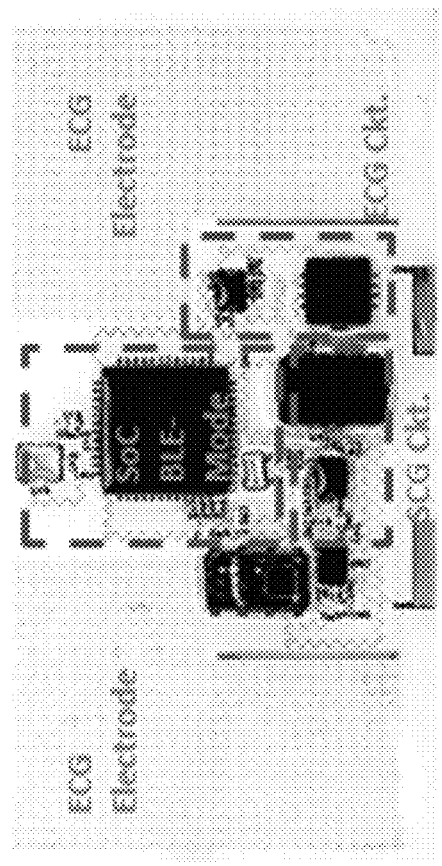
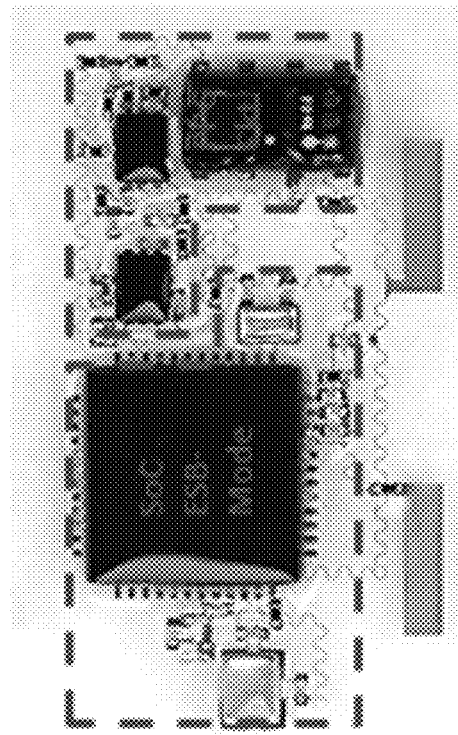
FIG. 15

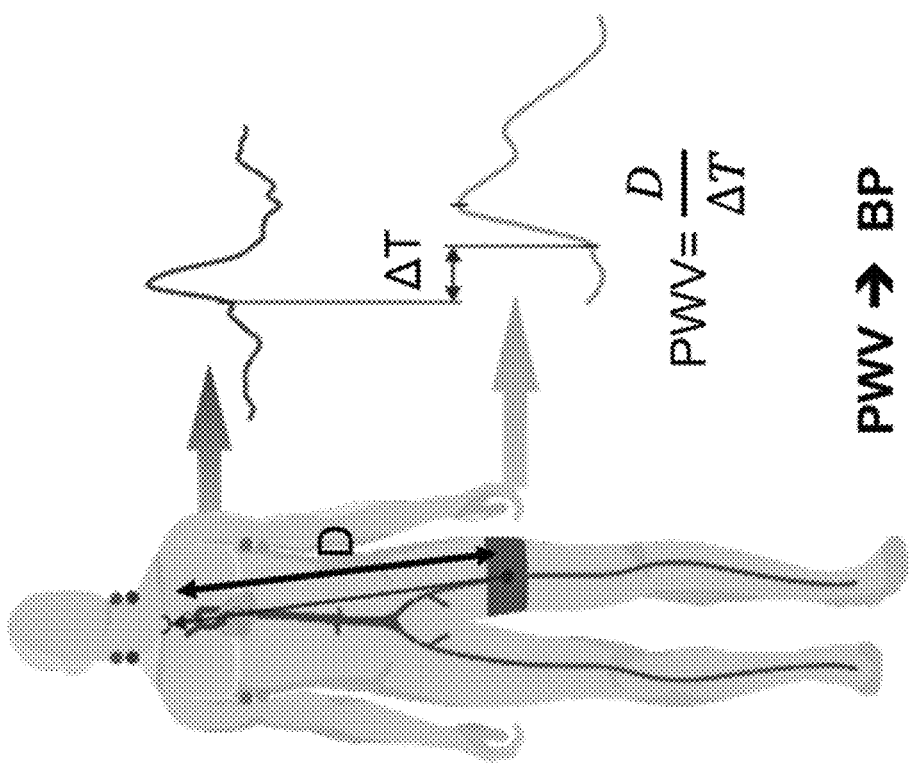
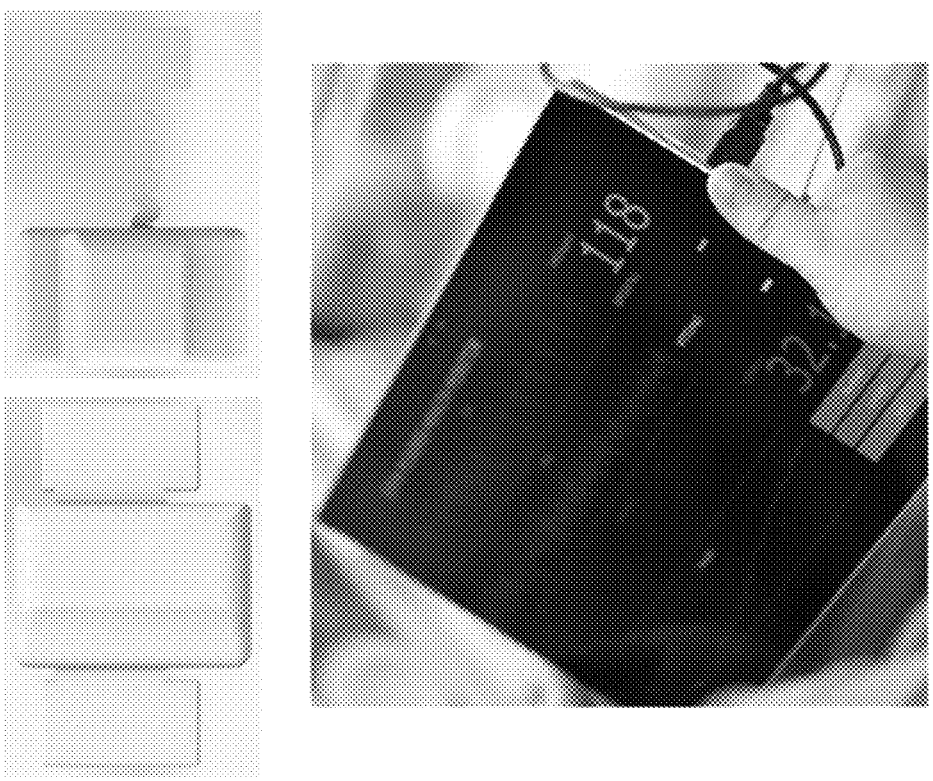
FIG. 16

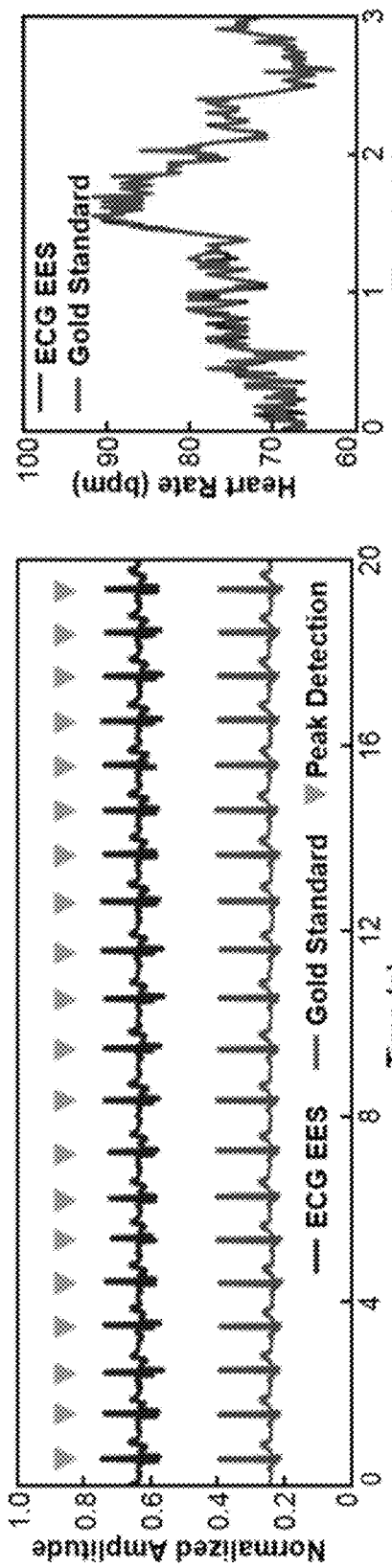
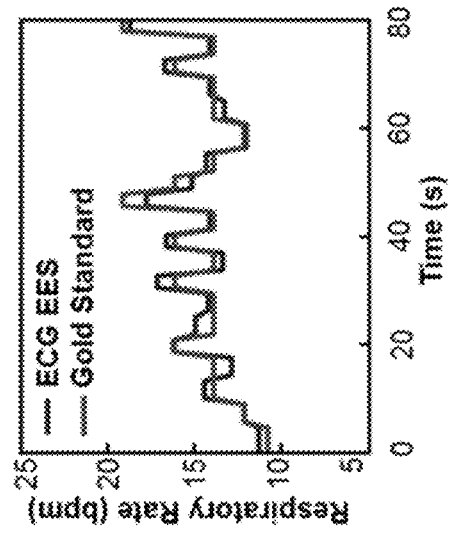
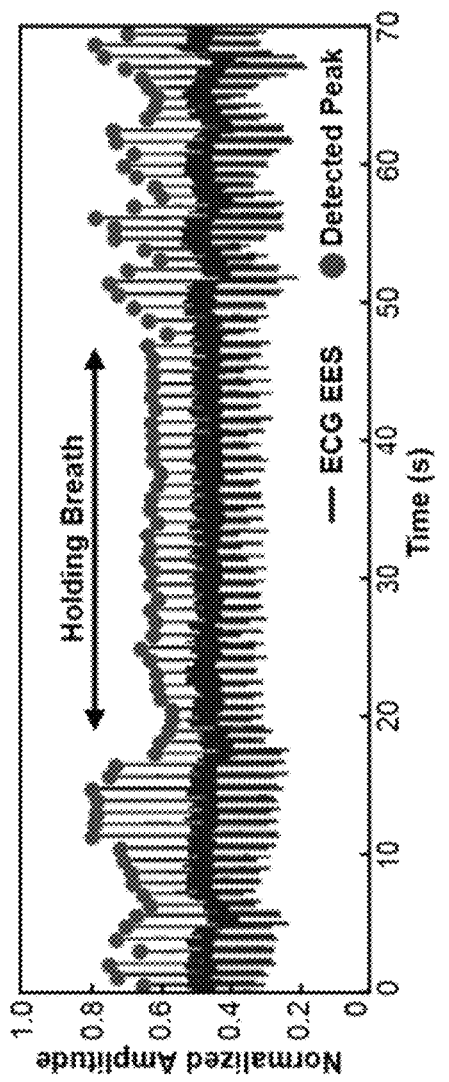
FIG. 25A
FIG. 25B
FIG. 25C
FIG. 25D

APPARATUS AND METHOD FOR NON-INVASIVELY MEASURING BLOOD PRESSURE OF MAMMAL SUBJECT

CROSS-REFERENCE TO RELATED APPLICATIONS

This application claims priority to and the benefit of U.S. Provisional Patent Application Ser. Nos. 62/753,303, 62/753,453 and 62/753,625, each of which was filed Oct. 31, 2018, and is incorporated herein by reference in its entirety, respectively.

This application is related to a co-pending PCT patent application entitled "APPARATUS AND METHOD FOR MEASURING PHYSIOLOGICAL PARAMETERS OF MAMMAL SUBJECT AND APPLICATIONS OF SAME", by John A. Rogers et al., and a co-pending PCT patent application entitled "SENSOR NETWORK FOR MEASURING PHYSIOLOGICAL PARAMETERS OF MAMMAL SUBJECT AND APPLICATIONS OF SAME", by John A. Rogers et al., each of which is filed on the same day that this application is filed, and with the same assignee as that of this application, and is incorporated herein by reference in its entirety, respectively.

Some references, which may include patents, patent applications and various publications, are cited and discussed in the description of this invention. The citation and/or discussion of such references is provided merely to clarify the description of the present invention and is not an admission that any such reference is "prior art" to the invention described herein. All references cited and discussed in this specification are incorporated herein by reference in their entireties and to the same extent as if each reference was individually incorporated by reference.

FIELD OF THE INVENTION

The present invention relates generally to healthcare, and more particularly to apparatuses and methods for non-invasively measuring a blood pressure of a mammal subject and applications of the same.

BACKGROUND OF THE INVENTION

The background description provided herein is for the purpose of generally presenting the context of the invention. The subject matter discussed in the background of the invention section should not be assumed to be prior art merely as a result of its mention in the background of the invention section. Similarly, a problem mentioned in the background of the invention section or associated with the subject matter of the background of the invention section should not be assumed to have been previously recognized in the prior art. The subject matter in the background of the invention section merely represents different approaches, which in and of themselves may also be inventions. Work of the presently named inventors, to the extent it is described in the background of the invention section, as well as aspects of the description that may not otherwise qualify as prior art at the time of filing, are neither expressly nor impliedly admitted as prior art against the invention.

Blood pressure is a critical vital sign essential to the care of patients in outpatient, inpatient, and critical care settings. Traditionally, measurement of blood pressure requires a sphygmomanometer that inflates around the arm. The acoustic return of blood flow signifies blood pressure. However, sphygmomanometers are bulky, only cycle every 15-30 minutes due to patient discomfort, and require fitting to an individual's habitus. Ultimately, sphygmomanometers fail to deliver a continuous blood pressure metric. In instances where continuous blood pressure is needed (e.g. critical care or hemodynamic instability), invasive monitoring catheters are required (e.g. arterial lines) to be placed in the superficial arterial system (e.g. radial artery) or directly in the central arterial system. These arterial lines, however, have significant drawbacks, as they can cause thrombosis, infection, and even death in fragile patients such as premature infants.

Therefore, a heretofore unaddressed need exists in the art to address the aforementioned deficiencies and inadequacies.

SUMMARY OF THE INVENTION

One of the objectives of the invention is to provide an apparatus and a method that reliably and accurately determine blood pressure in a living animal, such as a human, that is non-invasive and can be continuous in nature, based on a new model using the pulse wave velocity (PWV). This platform may be incorporated with unique patch-like sensor systems that are soft, stretchable and flexible, and that can be conformally mounted to the skin surface. In this manner, more accurate sensing of continuous blood pressure is achieved, while minimizing discomfort to the individual. Furthermore, undesirable constraints on the individual are avoided by providing the system in a wireless manner, so that the sensors are uniquely uncoupled during use from any external components, such as power supply, controllers or the like.

In one aspect, the invention relates to an apparatus for non-invasively measuring a blood pressure of a mammal subject. In certain embodiments, the apparatus includes: a first sensor system and a second sensor system that are time-synchronized to each other and spatially separated by a pulse arrival distance L, where the first sensor system is attached to a first position of the mammal subject for detecting a first signal, the second sensor system attached to a second position of the mammal subject for detecting a second signal, the second position is more distal or proximal to a heart of the mammal subject than the first position, and the pulse arrival distance L is defined by the first and second positions; and a microcontroller unit (MCU) adapted in wireless communication with the first sensor system and the second sensor system, and configured to: receive output signals of the first sensor system and the second sensor system; process the output signals to determine a pulse arrival time (PAT) as a time delay $\Delta t$ between detection of the first signal and detection of the second signal; determine a pulse wave velocity (PWV) based on the PAT and the pulse arrival distance L, where $$PWV = \frac{L}{\Delta t};$$

and determine the blood pressure P of the mammal subject from the PWV, where P is a parabolic function of the PWV.

In one embodiment, $P=\alpha PWV^2+\beta$, and $\alpha$ and $\beta$ are empirically determined constants depending on artery geometry and artery material properties of the mammal subject. In one embodiment, at a blood pressure range between 5 kPA and 20 kPa, 0.13 kPa×s²/m² ≤ α ≤ 0.23 kPa×s²/m²; and 2.2 kPa ≤ β ≤ 3.2 kPa.

In one embodiment, the MCU is further configured to transmit the determined blood pressure to at least one of a patient database, a cloud server, and a mobile device.

In one embodiment, the MCU is further configured to generate an alarm when the determined blood pressure is out of a pre-defined range, and notify a practitioner or caregiver of the alarm.

In one embodiment, each of the first sensor system and the second sensor system includes: a plurality of electronic components, and a plurality of flexible and stretchable interconnects electrically connected to different electronic components, wherein the plurality of electronic components comprise a sensor member for measuring the first signal and the second signal of the mammal subject; and an elastomeric encapsulation layer at least partially surrounding the electronic components and the flexible and stretchable interconnects to form a tissue-facing surface attached to the mammal subject and an environment-facing surface. In one embodiment, the plurality of flexible and stretchable interconnects comprise at least one of serpentine interconnects and zigzag interconnects.

In one embodiment, the first sensor system is an electrocardiography (ECG) sensor system, and the second sensor system is a photoplethysmography (PPG) sensor system. In one embodiment, the sensor member of the first sensor system includes at least two ECG electrodes spatially separated from each other by an electrode distance. In one embodiment, the sensor member of the second sensor system includes a photoplethysmogram (PPG) sensor comprising an optical source and an optical detector located within a sensor footprint.

In one embodiment, the first sensor system is an inertial motion sensor system or an accelerometer system.

In one embodiment, the first position is at a torso region of the mammal subject, and the second position is at an extremity region of the mammal subject.

In one embodiment, the apparatus is used for continuously measuring the blood pressure of the mammal subject for a time period.

In one embodiment, each system is in wireless communication with the MCU via a near field communication (NFC) protocol, or Bluetooth protocol.

In another aspect, the invention relates to an apparatus for non-invasively measuring blood pressure of a mammal subject. In certain embodiments, the apparatus includes: a sensing apparatus attached to the mammal subject, comprising: a first sensor system attached to a first position of the mammal subject for detecting a first signal; and a second sensor system attached to a second position of the mammal subject for detecting a second signal, where the second position is more distal or proximal to a heart of the mammal subject than the first position, and the first sensor system and the second sensor system are time-synchronized, and spatially separated by a pulse arrival distance L defined by the first and second positions; and a microcontroller unit (MCU) in wireless communication with the sensor systems, configured to: receive output signals of the first sensor system and the second sensor system; process the output signals to determine a pulse wave velocity (PWV) based on a pulse arrival time (PAT), where the PAT is a time delay $\Delta t$ between detection of the first signal and detection of the second signal; and determine a blood pressure P of the mammal subject from the PWV.

In one embodiment, the MCU is further configured to determine the PWV by: determining the PAT as the time delay $\Delta t$ between the detection of the first signal and the detection of the second signal; and determining the PWV based on the PAT and the pulse arrival distance L, where $$PWV = \frac{L}{\Delta t}.$$

In one embodiment, the blood pressure P of the mammal subject is calculated from the PWV according to the formula of:

$$P = \alpha PWV^2 + \beta,$$

where $\alpha$ and $\beta$ are empirically determined constants depending on artery geometry and artery material properties of the mammal subject. In one embodiment, at a blood pressure range between 5 kPa and 20 kPa, $$0.13 \text{ kPa} \times s^2/m^2 \leq \alpha \leq 0.23 \text{ kPa} \times s^2/m^2; \text{ and}$$

$$2.2 \text{ kPa} \leq \beta \leq 3.2 \text{ kPa}.$$

In one embodiment, the MCU is further configured to transmit the determined blood pressure to at least one of a patient database, a cloud server, and a mobile device.

In one embodiment, the MCU is further configured to generate an alarm the determined blood pressure is out of a pre-defined range, and notify a practitioner or caregiver of the alarm.

In one embodiment, each of the first sensor system and the second sensor system includes: a plurality of electronic components, and a plurality of flexible and stretchable interconnects electrically connected to different electronic components, wherein the plurality of electronic components comprise a sensor member for measuring the first signal and the second signal of the mammal subject; and an elastomeric encapsulation layer at least partially surrounding the electronic components and the flexible and stretchable interconnects to form a tissue-facing surface attached to the mammal subject and an environment-facing surface. In one embodiment, the plurality of flexible and stretchable interconnects comprise at least one of serpentine interconnects and zigzag interconnects.

In one embodiment, the first sensor system is an electrocardiography (ECG) sensor system, and the second sensor system is a photoplethysmography (PPG) sensor system. In one embodiment, the sensor member of the first sensor system comprises at least two ECG electrodes spatially separated from each other by an electrode distance. In one embodiment, the sensor member of the second sensor system comprises a photoplethysmogram (PPG) sensor comprising an optical source and an optical detector located within a sensor footprint.

In one embodiment, the first sensor system is an inertial motion sensor system or an accelerometer system.

In one embodiment, the first position is at a torso region of the mammal subject, and the second position is at an extremity region of the mammal subject.

In one embodiment, each of the first sensor system and the second sensor system is in wireless communication with the MCU via a near field communication (NFC) protocol, or Bluetooth protocol.

In one embodiment, the mammal subject is a human subject or a non-human subject.

In yet another aspect, the invention relates to a method of non-invasively measuring blood pressure of a mammal subject, including: deploying a sensing apparatus on the mammal subject, where the sensing apparatus is in wireless communication with a MCU, and comprises a first sensor system attached to a first position of the mammal subject for measuring a first signal and a second sensor system attached to a second position of the mammal subject for measuring a second signal, the second position is more distal or proximal to a heart of the mammal subject than the first position, and the first sensor system and the second sensor system are time-synchronized, and spatially separated by a pulse arrival distance L defined by the first and second positions; measuring, by the sensing apparatus, the first signal and the second signal of the mammal subject; processing, by the MCU, output signals of the first sensor system and the second sensor system to determine a PWV based on a PAT, where the PAT is a time delay Δt between detection of the first signal and detection of the second signal; and determining a blood pressure P of the mammal subject from the PWV.

In one embodiment, said determining the PWV comprises: determining the PAT as the time delay Δt between the detection of the first signal and the detection of the second signal; and determining the PWV based on the PAT and the pulse arrival distance L, where $$PWV = \frac{L}{\Delta t}.$$

In one embodiment, the blood pressure P of the mammal subject is calculated from the PWV according to the formula of:

$$P = \alpha PWV^2 + \beta,$$

where α and β are empirically determined constants depending on artery geometry and artery material properties of the mammal subject. In one embodiment, at a blood pressure range between 5 kPa and 20 kPa, $$0.13 \text{ kPa} \times \text{s}^2/\text{m}^2 \leq \alpha \leq 0.23 \text{ kPa} \times \text{s}^2/\text{m}^2; \text{ and}$$

$$2.2 \text{ kPa} \leq \beta \leq 3.2 \text{ kPa}.$$

In one embodiment, the method further includes transmitting the determined blood pressure to at least one of a patient database, a cloud server, and a mobile device.

In one embodiment, the method further includes generating an alarm the determined blood pressure is out of a pre-defined range, and notify a practitioner or caregiver of the alarm.

In one embodiment, the first sensor system is an electrocardiography (ECG) sensor system, and the second sensor system is a photoplethysmography (PPG) sensor system.

In one embodiment, the first sensor system is an inertial motion sensor system or an accelerometer system.

In one embodiment, the first position is at a torso region of the mammal subject, and the second position is at an extremity region of the mammal subject.

In one embodiment, each of the first sensor system and the second sensor system is in wireless communication with the MCU via a near field communication (NFC) protocol, or Bluetooth protocol.

In a further aspect, the invention relates to a non-transitory tangible computer-readable medium storing instructions which, when executed by one or more processors, cause the method as discussed above to be performed.

These and other aspects of the invention will become apparent from the following description of the preferred embodiment taken in conjunction with the following drawings, although variations and modifications therein may be affected without departing from the spirit and scope of the novel concepts of the invention.

BRIEF DESCRIPTION OF THE DRAWINGS

The following drawings form part of the present specification and are included to further demonstrate certain aspects of the invention. The invention may be better understood by reference to one or more of these drawings in combination with the detailed description of specific embodiments presented herein. The drawings described below are for illustration purposes only. The drawings are not intended to limit the scope of the present teachings in any way.

FIGS. 2A-2E show schematic illustrations and photographic images of ultra-thin, skin-like wireless modules in the apparatus for monitoring the blood pressure in the neonatal intensive care unit (NICU) with comparisons to clinical standard instrumentation, according to embodiments of the invention. FIG. 2A schematically shows wireless, battery-free modules for recording electrocardiogram (ECG) and photoplethysmogram (PPG) data and skin temperature according to one embodiment of the present invention. FIG. 2B is a functional block diagram showing analog front end and electronic components of each EES, components of the near-field communication (NFC) system on a chip (SoC) including microcontroller, general-purpose input/output (GPIO), and radio interface, with a host reader platform that includes an NFC reader module and a Bluetooth low energy (BLE) interface with circular buffer. FIG. 2C shows a functional block diagram of the two sensor systems according to another embodiment of the invention. The power management unit involves dual power operation mode from primary wireless power transfer and the secondary battery for portability. The ECG EES includes optional electrode for fECG measurement and 6 axial inertial measurement unit (IMU) for seismocardiography (SCG) and respiratory rate measurement on top of ECG analog front end. The PPG EES includes the pulse oximetry analog front end and 6 axial IMU for motion artifact reduction algorithm. Each individual unit is controlled by BLE SoC. FIG. 2D is a schematic of a sensor system configured to mount on the torso, such as a chest, according to one embodiment of the invention. The sensor system is stretchable and foldable, as illustrated in the top panels. The electrical components and layout are illustrated in the bottom panel, including the components providing a networked and wireless platform (including power unit, memory unit, temperature unit, ECG unit, Bluetooth low energy (BLE)). FIG. 2E shows a sensor system configured to mount on an extremity, such as a foot, leg, hand, arm finger, toe or nail, such as by a wrapping-type mechanism to secure the main circuit components with a mechanically decoupled sensor system connected thereto, according to one embodiment of the invention. The sensor system is stretchable and foldable, as illustrated in the top panels. The electrical components (including power unit, memory unit, temperature unit, PPG sensor, Bluetooth low energy (BLE)) and layout are illustrated in the bottom panel, including the components to provide a networked and wireless platform. The sensor portion may be aligned in a different direction, such as an orthogonal direction relative to the main circuit components. In this manner, the main circuit components may wrap around the foot, with the sensor portion independently mountable, such as to a nail region.

FIG. 4A is a schematic diagram of the pulse wave propagation in the human artery. FIG. 4B schematically shows a cross-sectional view of the artery before deformation due to the blood pressure. FIG. 4C schematically shows a cross-sectional view of the artery after deformation due to the blood pressure.

FIGS. 5A-5D schematically shows the in vitro experimental setup according to certain embodiments of the invention. FIG. 5A is a schematic diagram of the in vitro experimental setup. FIG. 5B is an experimental image of the PDMS tube in FIG. 5A. FIG. 5C is an experimental image of the strain sensor in FIG. 5A. FIG. 5D shows output signals from the two sensors in FIG. 5A.

FIG. 11 shows the relation of the pressure versus PWV in the in vitro experiments (h0=0.29 mm, R0=6.3 mm, and 15:1 PDMS (580 kPa)) for different liquids and the results for the present model according to one embodiment of the invention.

FIGS. 12A and 12B shows photographs of a multimodal wearable sensor on the torso region of a human subject according to certain embodiments of the invention. FIG. 12A shows the multimodal wearable sensor on the torso in the sub-clavicular region. FIG. 12B shows the multimodal wearable sensor on the posterior side overlaying the scapula.

FIG. 15 shows an exemplary sensor design of the sensor systems in a synchronous real-time blood pressure monitoring system according to certain embodiments of the invention, where the time-synchronized sensors are in a master-slave configuration.

FIG. 16 shows a soft wearable electronics platform for wireless non-invasive continuous monitoring of blood pressure according to one embodiment of the invention.

FIG. 24B shows the raw signal. FIG. 24C shows the band-pass filtered signal. FIG. 24D shows the differentiation of the signal. FIG. 24E shows squaring the signal. FIG. 24F shows moving average applied to the signal. FIG. 24G shows the detected peak with automatically adjusted threshold level.

FIG. 25A shows ECG signals acquired simultaneously from an ECG EES (top) and a gold standard (bottom), with detected peaks (inverted triangles) according to certain embodiments of the invention.

FIG. 25B shows comparison of heart rate determined using data from the ECG EES and a gold standard according to one embodiment of the invention.

FIG. 25C shows respiration rate extracted from oscillations of the amplitudes of peaks extracted from the ECG waveforms according to one embodiment of the invention.

FIG. 25D shows comparison of respiration rate determined using data from the ECG EES and manual count by a physician according to one embodiment of the invention.

FIG. 26A shows a block diagram of in-sensor analytics for detection of peaks and valleys from PPG waveforms and for dynamic baseline control. FIG. 26B shows a circuit diagram with GPIO enabled baseline control scheme. FIG. 26C shows a demonstration of dynamic baseline level control with a sinusoidal input (blue) and corresponding output changes (red). FIG. 26D shows a demonstration of operation of a PPG EES with (blue and red) and without (black dot) dynamic baseline control, where analytics on baseline level serves as an input to a control system that combines a GPIO port on the NFC SoC with an offset to ensure that the signal input to the ADC lies within its dynamic range (orange). FIG. 26E shows convention for calculating direct and alternating components of PPG waveforms collected in the red and IR, for purposes of calculating $SpO_2$. FIG. 26F shows an empirical formula for $SpO_2$ calculation using Roa based on comparison to a commercial pulse oximeter. FIG. 26G shows $SpO_2$ determined using in-sensor analytics during a period of rest followed by a breath hold and then another period of rest.

DETAILED DESCRIPTION OF THE INVENTION

Figure 1:
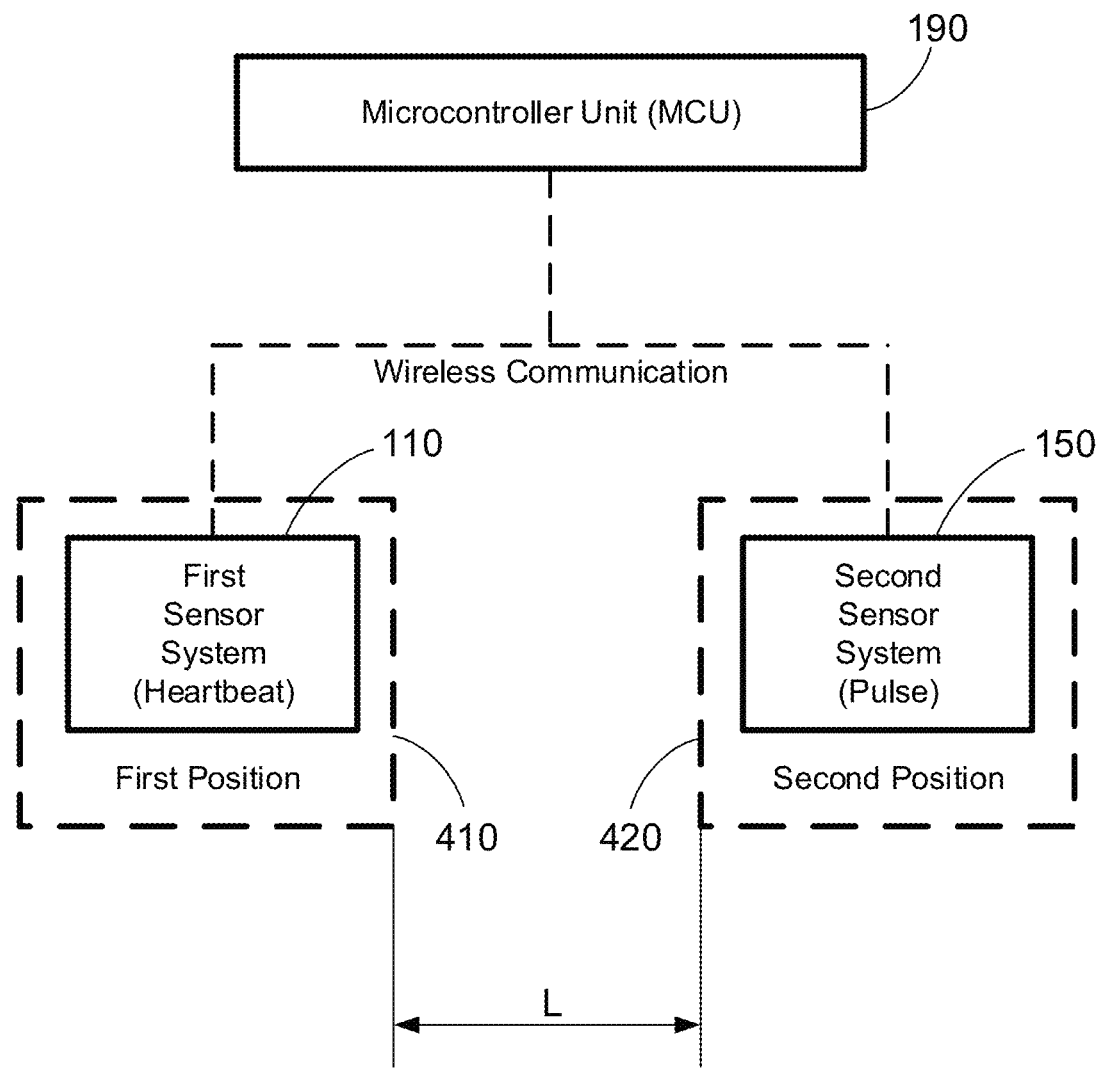
FIG. 1 schematically shows a functional block diagram of an apparatus according to certain embodiments of the present invention.

The present invention will now be described more fully hereinafter with reference to the accompanying drawings, in which exemplary embodiments of the present invention are shown. The present invention may, however, be embodied in many different forms and should not be construed as limited to the embodiments set forth herein. Rather, these embodiments are provided so that this disclosure will be thorough and complete, and will fully convey the scope of the invention to those skilled in the art. Like reference numerals refer to like elements throughout.

The terms used in this specification generally have their ordinary meanings in the art, within the context of the invention, and in the specific context where each term is used. Certain terms that are used to describe the invention are discussed below, or elsewhere in the specification, to provide additional guidance to the practitioner regarding the description of the invention. For convenience, certain terms may be highlighted, for example using italics and/or quotation marks. The use of highlighting and/or capital letters has no influence on the scope and meaning of a term; the scope and meaning of a term are the same, in the same context, whether or not it is highlighted and/or in capital letters. It will be appreciated that the same thing can be said in more than one way. Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification, including examples of any terms discussed herein, is illustrative only and in no way limits the scope and meaning of the invention or of any exemplified term. Likewise, the invention is not limited to various embodiments given in this specification.

It will be understood that, although the terms first, second, third, etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below can be termed a second element, component, region, layer or section without departing from the teachings of the present invention.

It will be understood that, as used in the description herein and throughout the claims that follow, the meaning of "a", "an", and "the" includes plural reference unless the context clearly dictates otherwise. Also, it will be understood that when an element is referred to as being "on," "attached" to, "connected" to, "coupled" with, "contacting," etc., another element, it can be directly on, attached to, connected to, coupled with or contacting the other element or intervening elements may also be present. In contrast, when an element is referred to as being, for example, "directly on," "directly attached" to, "directly connected" to, "directly coupled" with or "directly contacting" another element, there are no intervening elements present. It will also be appreciated by those of skill in the art that references to a structure or feature that is disposed "adjacent" to another feature may have portions that overlap or underlie the adjacent feature.

It will be further understood that the terms "comprises" and/or "comprising," or "includes" and/or "including" or "has" and/or "having" when used in this specification specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the figures. It will be understood that relative terms are intended to encompass different orientations of the device in addition to the orientation shown in the figures. For example, if the device in one of the figures is turned over, elements described as being on the "lower" side of other elements would then be oriented on the "upper" sides of the other elements. The exemplary term "lower" can, therefore, encompass both an orientation of lower and upper, depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

Unless otherwise defined, all terms (including technical and scientific terms) used herein have the same meaning as commonly understood by one of ordinary skill in the art to which the present invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

As used in this disclosure, "around", "about", "approximately" or "substantially" shall generally mean within 20 percent, preferably within 10 percent, and more preferably within 5 percent of a given value or range. Numerical quantities given herein are approximate, meaning that the term "around", "about", "approximately" or "substantially" can be inferred if not expressly stated.

As used in this disclosure, the phrase "at least one of A, B, and C" should be construed to mean a logical (A or B or C), using a non-exclusive logical OR. As used herein, the term "and/or" includes any and all combinations of one or more of the associated listed items.

As used in this disclosure, the term "spatially separated" refers to two different locations on skin, where the two sensor systems disposed on those locations are not in physical contact. For example, one sensor system may be on the torso, and another sensor system on the limb.

As used in this disclosure, the term "mammal subject" refers to a living human subject or a living non-human subject. For the purpose of illustration of the invention, the apparatus and method are applied to monitor and/or measure physiological parameters of neonates or infants. It should be appreciated to one skilled in the art that the apparatus can also be applied to monitor and/or measure physiological parameters of children or adults in practice the invention.

The description below is merely illustrative in nature and is in no way intended to limit the invention, its application, or uses. The broad teachings of the invention can be implemented in a variety of forms. Therefore, while this invention includes particular examples, the true scope of the invention should not be so limited since other modifications will become apparent upon a study of the drawings, the specification, and the following claims. For purposes of clarity, the same reference numbers will be used in the drawings to identify similar elements. It should be understood that one or more steps within a method may be executed in different order (or concurrently) without altering the principles of the invention.

Blood pressure is a critical and highly elusive vital sign that varies depending on emotional state, physical activity, and health status. Low and high blood pressures correspond to two disease states called hypotension and hypertension, respectively. Roughly 30% of the population has hypertension-related health issues. The traditional method to measure blood pressure relies on an inflating cuff that imparts an external pressure to the arm to stop the blood flow. Releasing this external pressure allows determination of the systolic and diastolic blood pressure, as pressures that correspond to stages of initiation and unimpeded flow of blood, respectively. Ambulatory blood pressure monitoring based on this scheme requires an inflating cuff and oscillometric measurement. The possibility for tissue damage due to the repeated blocking of blood flow in such approaches limits the interval of measurement to between 15 min and 30 min. This sampling frequency fails to offer the time resolution necessary to detect fluctuations in blood pressure caused by, for example, exercise or mood swings. Continuous blood pressure monitoring is also essential for the care of critically ill patients and is typically achieved using invasive techniques based on intraarterial pressure measurements. Although considered the gold standard for beat-to-beat blood pressure monitoring, such methods expose patients to risks of complications and require intensive care monitoring.

Pulse wave velocity (PWV) has been used as a non-invasive, cuffless and continuous surrogate marker of blood pressure. PWV is the measure of the velocity of a blood pressure pulse through an artery, as it has shown clinically to be an independent measure of cardiovascular events and all-cause mortality. Traditionally, measurement of PWV requires ultra-sensitive pressure sensors placed on the carotid and femoral arteries. The connection between PWV and blood pressure requires mathematical transformations—traditionally the Moens-Kortweg (MK) equation and the Hughes Equation, to relate PWV to the blood pressure P.

$$MK\ \text{Equation:}\ PWV = \sqrt{\frac{Eh_0}{2\rho R_0}}, \tag{1a}$$

$$\text{Hughes Equation:}\ E = E_0\ \exp(\zeta P), \tag{1b}$$

where $E$, $h_0$, and $R_0$ are the elastic (tangent) modulus at blood pressure P and thickness and radius of the artery, respectively, $\rho$ is the blood density, $E_0$ is the elastic modulus at zero blood pressure, and $\zeta$ is a material coefficient of the artery. As the blood pressure P increases, the artery stiffens (i.e., increase of the tangent modulus E based on Equation 1b), leading to an increase in PWV according to Equation 1a.

However, there are fundamental problems with the MK Equation and the Hughes Equation. The MK Equation 1a involves two assumptions: (i) the artery wall is thin such that it can be modeled as a thin shell; and (ii) the thickness and radius of the artery remain fixed as the blood pressure changes. For human arteries, however, these two assumptions may not hold since the thickness-to-radius ratio $h_0/R_0 = 0.08$-$0.22$ is beyond the limit $h_0/R_0 < 0.05$ for a thin shell, and the change of the radius of a human artery can reach ~30% due to blood pressure. In addition, the Hughes Equation 1b is completely empirical, without any theoretical foundation.

To address the aforementioned deficiencies and inadequacies, provided herein are systems and methods that reliably and accurately determine blood pressure in a living mammal subject, such as a human, that is non-invasive and can be continuous in nature, based on a new model of PWV. Specifically, the new model relies on algorithms that model the artery by linear, and non-linear constitutive models. By leveraging the Fung hyperelastic model, provided is a more accurate measure of blood pressure by specially correlating PWV to blood pressure compared to prior reported models.

In one aspect, the invention relates to an apparatus for non-invasively and continuously measuring a blood pressure of a mammal subject. FIG. 1 schematically shows a functional block diagram of an apparatus according to certain embodiments of the present invention. As shown in FIG. 1, the apparatus 100 includes a first sensor system 110 and a second sensor system 150 that are time-synchronized to each other, and a microcontroller unit (MCU) 190 adapted in wireless communication with the first sensor system 110 and the second sensor system 150. In certain embodiments, each of the first sensor system 110 and the second sensor system 150 is in wireless communication with the MCU 190 via a wireless transmission protocol, such as a near field communication (NFC) protocol, or Bluetooth protocol. Specifically, the term "time-synchronized" (or "time-synced") refers to measurement of a parameter by different sensors, at different locations, that are synchronized in time to allow for measurement of novel physiological parameters. Examples include master-slave linked sensor systems that allow for time-synced measurements. Any of a range of time-synched methods are compatible, so long at the ability to measure $\Delta T$, and the PAT, from two spatially-separated systems, is preserved. Examples include time-stamped data, mother-daughter and master-slave.

Referring back to FIG. 1, the first sensor system 110 is attached to a first position 410 of the mammal subject for detecting a first signal of the mammal subject, and the second sensor system 150 attached to a second position 420 of the mammal subject for detecting a second signal of the mammal subject. In certain embodiments, the second position 420 is more distal or proximal to a heart of the mammal subject than the first position 410. For example, in one exemplary embodiment, the first position 410 is located at a torso region of the mammal subject, and the second position 420 is located at an extremity region or a limb region of the mammal subject. In this case, the first signal may be a heartbeat signal measured from the torso region, and the second signal may be a pulse signal measured from the extremity region or the limb region. In other embodiments, the first position 410 and the second position 420 may be located at different regions of the mammal subject, as long as the first position 410 and the second position 420 are spatially separated. In certain embodiments, the first sensor system 110 and the second sensor system 150 collectively form a sensing apparatus. The MCU 190 is configured to receive output signals of the first sensor system 110 and the second sensor system 150, process the output signals to determine a pulse arrival time (PAT) as a time delay $\Delta t$ between detection of the first signal (e.g., the heartbeat signal) and detection of the second signal (e.g., the pulse signal). Once the PAT is determined, the MCU 190 may then determine a PWV based on the PAT and a pulse arrival distance L between the first 410 and the second position 420. In one embodiment, the PWV is determined by:

$$PWV = \frac{L}{\Delta t} \quad (2)$$

Once the PWV is obtained based on equation 2, the MCU 190 may further calculate and determine the blood pressure P of the mammal subject from the PWV, where P is a parabolic function of the PWV. In one embodiment, the relation between P and PWV can be represented by:

$$P = \alpha PWV^2 + \beta, \quad (3)$$

where $\alpha$ and $\beta$ are empirically determined constants depending on artery geometry and artery material properties of the mammal subject. In one embodiment, at a blood pressure range between 5 kPA and 20 kPa, $$0.13 \text{ kPa} \times \text{s}^2/\text{m}^2 \leq \alpha \leq 0.23 \text{ kPa} \times \text{s}^2/\text{m}^2; \text{ and}$$

$$2.2 \text{ kPa} \leq \beta \leq 3.2 \text{ kPa}.$$

In certain embodiments, the first sensor system 110 is a torso sensor system, which can be an electrocardiography (ECG) sensor system, and the second sensor system 150 is a limb sensor system or an extremity sensor system, which can be a photoplethysmography (PPG) sensor system. In certain embodiments, the first sensor system 110 and the second sensor system 150 can be implemented as separate physical devices. Alternatively, in certain embodiments, the first sensor system 110 and the second sensor system 150 can reside in a single physical device integrally.

In certain embodiments, the MCU 190 can be communicatively connected to, or alternatively be a part of, a remote reader device, which can be a computing device such as a hand-held or tablet device.

In certain embodiments, once the MCU 190 determines the blood pressure P based on equation 3, the MCU 190 may further utilize the determined blood pressure for various applications. For example, in one embodiment, the MCU 190 may transmit the determined blood pressure to at least one of a patient database, a cloud server, and a mobile device. In another embodiment, the MCU 190 may further generate an alarm the determined blood pressure is out of a pre-defined range, and notify a practitioner or caregiver of the alarm.

Figure 2A:
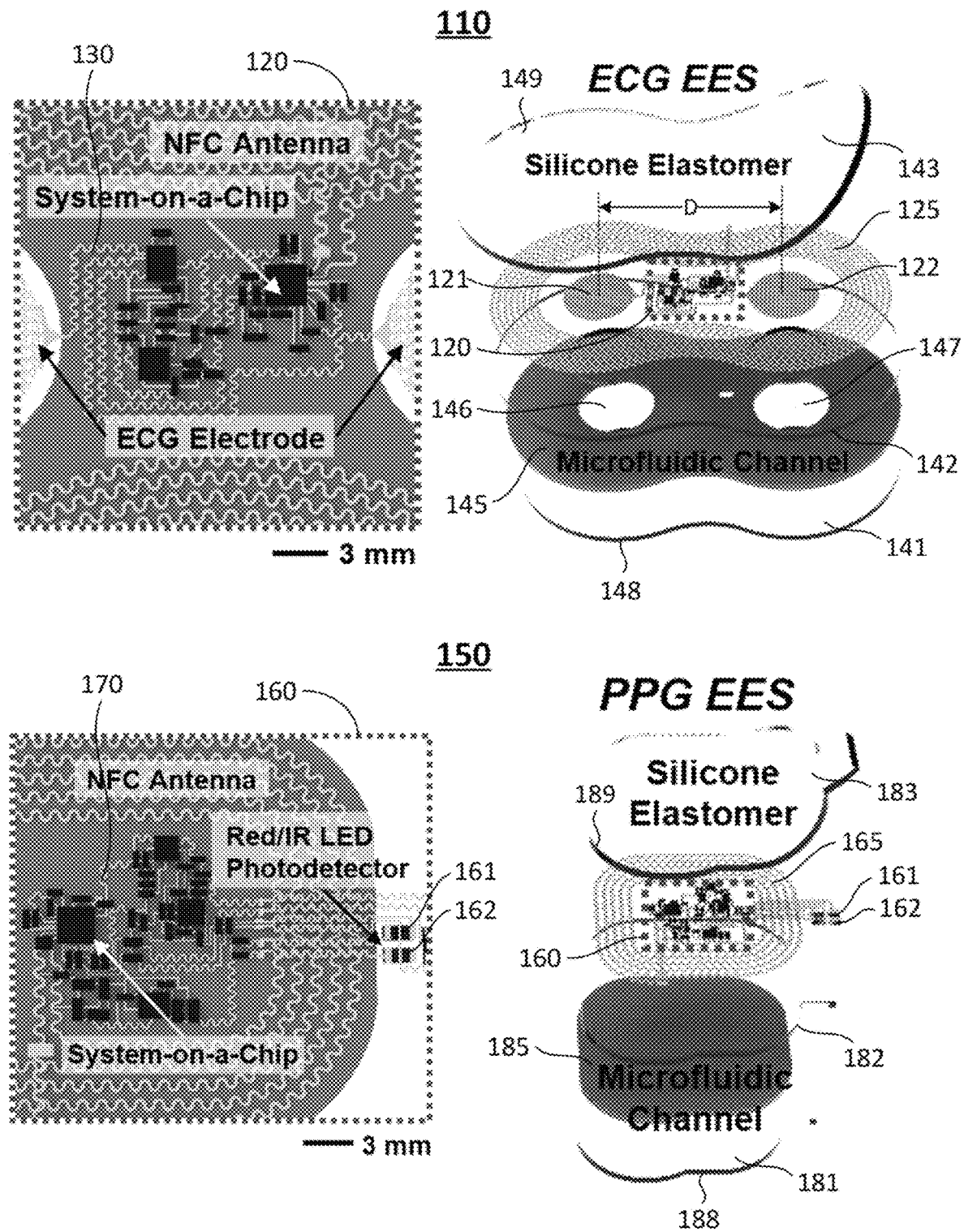

Referring to FIGS. 2A-2E, schematic illustrations and photographic images of ultra-thin, skin-like wireless modules in the apparatus for monitoring the blood pressure in the neonatal intensive care unit (NICU) with comparisons to clinical standard instrumentation are shown according to embodiments of the invention. Specifically, FIG. 2A schematically shows wireless, battery-free modules for recording electrocardiogram (ECG) and photoplethysmogram (PPG) data and skin temperature.

As shown in FIG. 2A, the first sensor system 110 is a torso sensor system 110 (ECG EES 110), and the second sensor system 150 is a limb sensor system 150 (PPG EES 150). In one exemplary embodiment shown in FIGS. 2A and 2B, the torso sensor system 110 is a wireless, battery-free sensor system for recording ECG data and skin temperature and includes a plurality of electronic components 120 and flexible and stretchable interconnects 130 electrically connecting to different electronic components, and an elastomeric encapsulation member (including layers 141, 142 and 143 shown in the top panel of FIG. 2A) surrounding the electronic components 120 and the flexible and stretchable interconnects 130 to form a tissue-facing surface 148 and an environment-facing surface 149. The elastomeric encapsulation member is formed of a silicone elastomer, or the like.

The flexible and stretchable interconnects 130 are serpentine interconnects. Other forms of flexible and stretchable interconnects such as zigzag interconnects can also be utilized to practice the invention. The flexible and stretchable interconnects 130 is formed of any conductive material including a metal material such as Au, Ag, Cu, etc.

The electronic components 120 include a sensor member for measuring the physiological parameters such as ECG data. The sensor member includes, but is not limited to, two electrodes 121 and 122 spatially separated from each other by an electrode distance, D, for ECG generation. The electrodes 121 and 122 can be either mesh electrodes (FIG. 2A) or solid electrodes (FIG. 2D). The electrode distance D may be adjustable between a minimal electrode distance, $D_{min}$, and a maximal electrode distance, $D_{max}$.

Figure 2B:
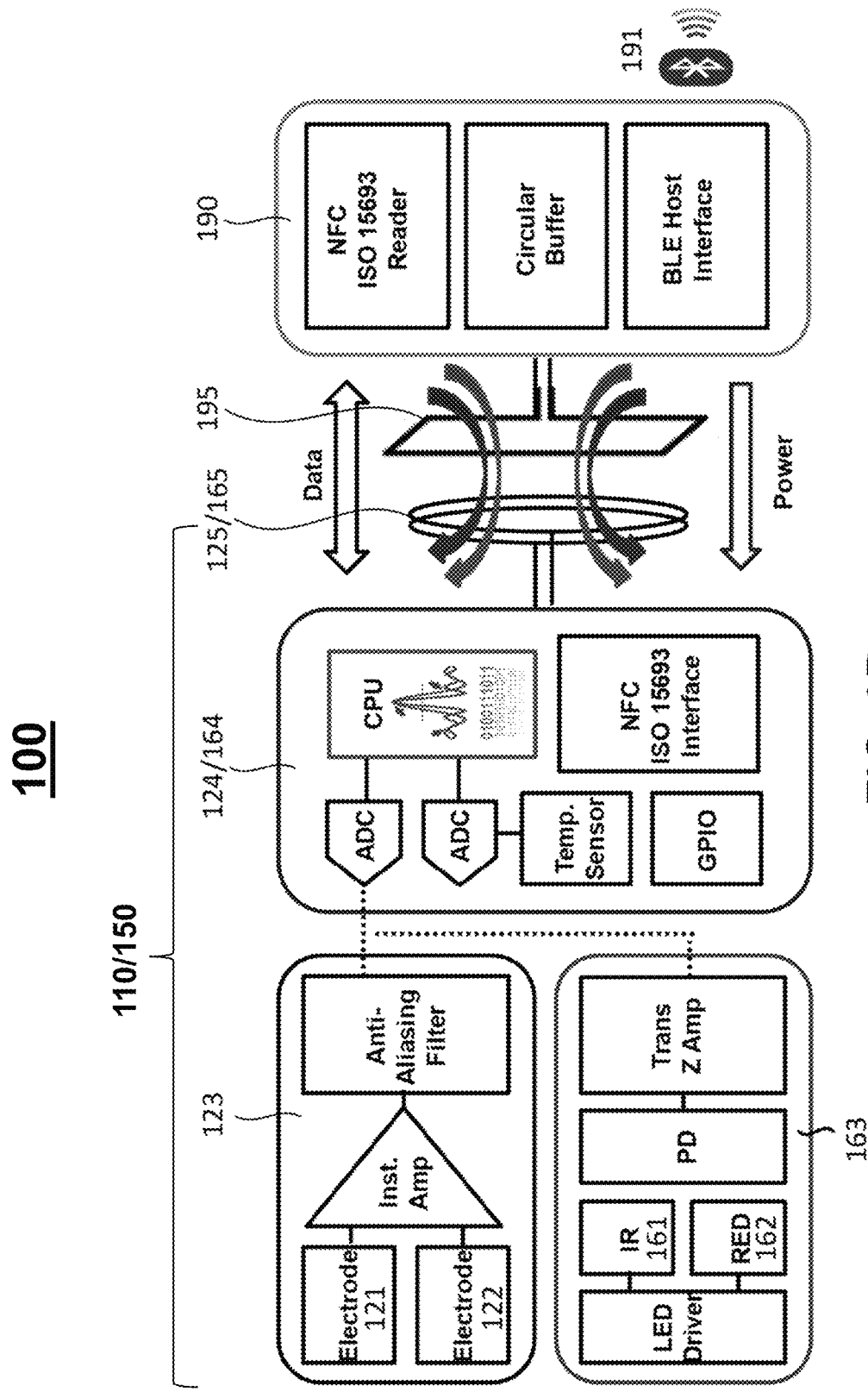

As shown in FIG. 2B, the sensor member 123 also includes, but is not limited to, an instrumentation amplifier (e.g., Inst. Amp) electrically coupled to the two electrodes 121 and 122, adapted for eliminating the need for input impedance matching and thus making the amplifier particularly suitable for use in measurement and test equipment, and an anti-aliasing filter (AAF) electrically couple to the instrumentation amplifier and used before a signal sampler to restrict the bandwidth of a signal to approximately or completely satisfy the Nyquist-Shannon sampling theorem over the band of interest.

Further referring to FIG. 2B, the electronic components 120 also includes a system on a chip (SoC) 124 that includes, but is not limited to, a microprocessor unit, e.g., CPU, a near-field communication (NFC) interface, e.g., NFC ISO 15693 interface, general-purpose input/output (GPIO) ports, one or more temperature sensors (Temp. sensor), and analog-to-digital converters (ADCs) in communication with each other, for receiving data from the sensor member 123 and processing the received data.

Still referring to FIG. 2B, the electronic components 120 includes a transceiver 125 coupled to the SoC 124 for wireless data transmission and wireless power harvesting. In the exemplary embodiment, the transceiver 125 comprises a magnetic loop antenna tuned to compliance with the NFC protocol and configured to allow simultaneous wireless data transmission and wireless power harvesting through a single link.

In addition, referring back to FIG. 2A, the torso sensor system 110 also includes a microfluidic chamber (channel) 145 formed between the tissue-facing surface 148 and the electronic components 120 in the elastomeric encapsulation member and is configured to mechanically isolate the electronic components 120 from a skin surface 148 during use. In one embodiment, the microfluidic chamber 145 is at least partially filled with at least one of an ionic liquid and a gel. For example, in the embodiment shown in FIG. 2A, the ionic liquid in microfluidic channel 145 contains blue dye for visualization purposes. Furthermore, two through openings 146 and 147 are defined in the microfluidic channel 145 such that during use the electrodes 121 and 122 are operably in epidermal contact with the skin surface of a user through the opening 147 and 147, respectively, for measuring the ECG signals.

As shown in FIGS. 2A-2B, the extremity sensor system 150 is also a wireless, battery-free sensor system for recording PPG data and skin temperature and includes a plurality of electronic components 160 and flexible and stretchable interconnects 170 electrically connecting to different electronic components, and an elastomeric encapsulation member (including layers 181, 182 and 183 shown in the bottom panel of FIG. 2A) surrounding the electronic components 160 and the flexible and stretchable interconnects 170 to form a tissue-facing surface 188 and an environment-facing surface 189. The elastomeric encapsulation member is formed of a silicone elastomer, or the like.

The flexible and stretchable interconnects 170 are serpentine interconnects as shown in FIG. 2A. Other forms of flexible and stretchable interconnects such as zigzag interconnects can also be utilized to practice the invention. The flexible and stretchable interconnects 170 is formed of any conductive material including a metal material such as Au, Ag, Cu, etc.

The electronic components 160 include a sensor member for measuring the physiological parameters such as PPG data. As shown in FIG. 2B, the sensor member 163 includes a PPG sensor located within a sensor footprint, which has an optical source having an infrared (IR) light emitting diode (LED) 161 and a red LED 162, and an optical detector (PD) electrically coupled to the IR LED 161 and the red LED 162. The sensor member 163 also includes, but is not limited to, an LED driver electrically coupled to the two electrodes 161 and 162 for driving the IR LED 161 and the red LED 162, and a trans Z amplifier electrically coupled to the PD.

Referring to FIG. 2B, the electronic components 160 also include a system on a chip (SoC) 164 that includes, but is not limited to, a microprocessor unit, e.g., CPU, a near-field communication (NFC) interface, e.g., NFC ISO 15693 interface, general-purpose input/output (GPIO) ports, one or more temperature sensors (Temp. sensor), and analog-to-digital converters (ADCs) in communication with each other, for receiving data from the sensor member 163 and processing the received data.

Still referring to FIG. 2B, the electronic components 160 includes a transceiver 165 coupled to the SoC 164 for wireless data transmission and wireless power harvesting. In the exemplary embodiment, the transceiver 165 comprises a loop antenna tuned to compliance with the NFC protocol and configured to allow simultaneous wireless data transmission and wireless power harvesting through a single link.

In addition, referring back to FIG. 2A, the extremity sensor system 150 also includes a microfluidic chamber (channel) 185 formed between the tissue-facing surface 188 and the electronic components 160 in the elastomeric encapsulation member and is configured to mechanically isolate the electronic components 160 from a skin surface of the patient during use. In one embodiment, the microfluidic chamber 185 is at least partially filled with at least one of an ionic liquid and a gel. For example, in the embodiment shown in FIG. 2A, the ionic liquid in microfluidic channel 185 contains blue dye for visualization purposes.

In operation, the torso sensor system 110 (ECG EES 110) and the extremity sensor system 150 (PPG EES 150) are in wireless communication with a reader system 190, alternatively, a microcontroller unit (MCU), having an antenna 195. Specifically, the RF loop antennas 125 and 165 in both the torso sensor system 110 (ECG EES 110) and the extremity sensor system 150 (PPG EES 150) are in wireless communication with the antenna 195 and serve dual purposes in power transfer and in data communication, as shown in FIG. 2B. In one embodiment, the reader system 190 also includes, but is not limited to, an NFC ISO 15693 reader, a circular buffer and a Bluetooth Low Energy (BLE) interface, which are configured such that data can be continuously streamed at rates of up to 800 bytes/s with dual channels, which is orders of magnitude higher than those previously achieved in NFC sensors. A key to realizing such high rates is in minimizing the overhead associated with transfer by packaging data into 6 blocks (24 Bytes) in the circular buffer. The primary antenna 195 connects to the host system for simultaneous transfer of RF power to the ECG EES 110 and the PPG EES 150. As such, the apparatus can operate at vertical distances of up to 25 cm, through biological tissues, bedding, blankets, padded mattresses, wires, sensors and other materials found in NICU incubators, for full coverage wireless operation in a typical incubator. BLE radio transmission then allows transfer of data to a personal computer, tablet computer or smartphone with a range of up to 20 m. Connections to central monitoring systems in the hospital can then be established in a straightforward manner.

Figure 2C:
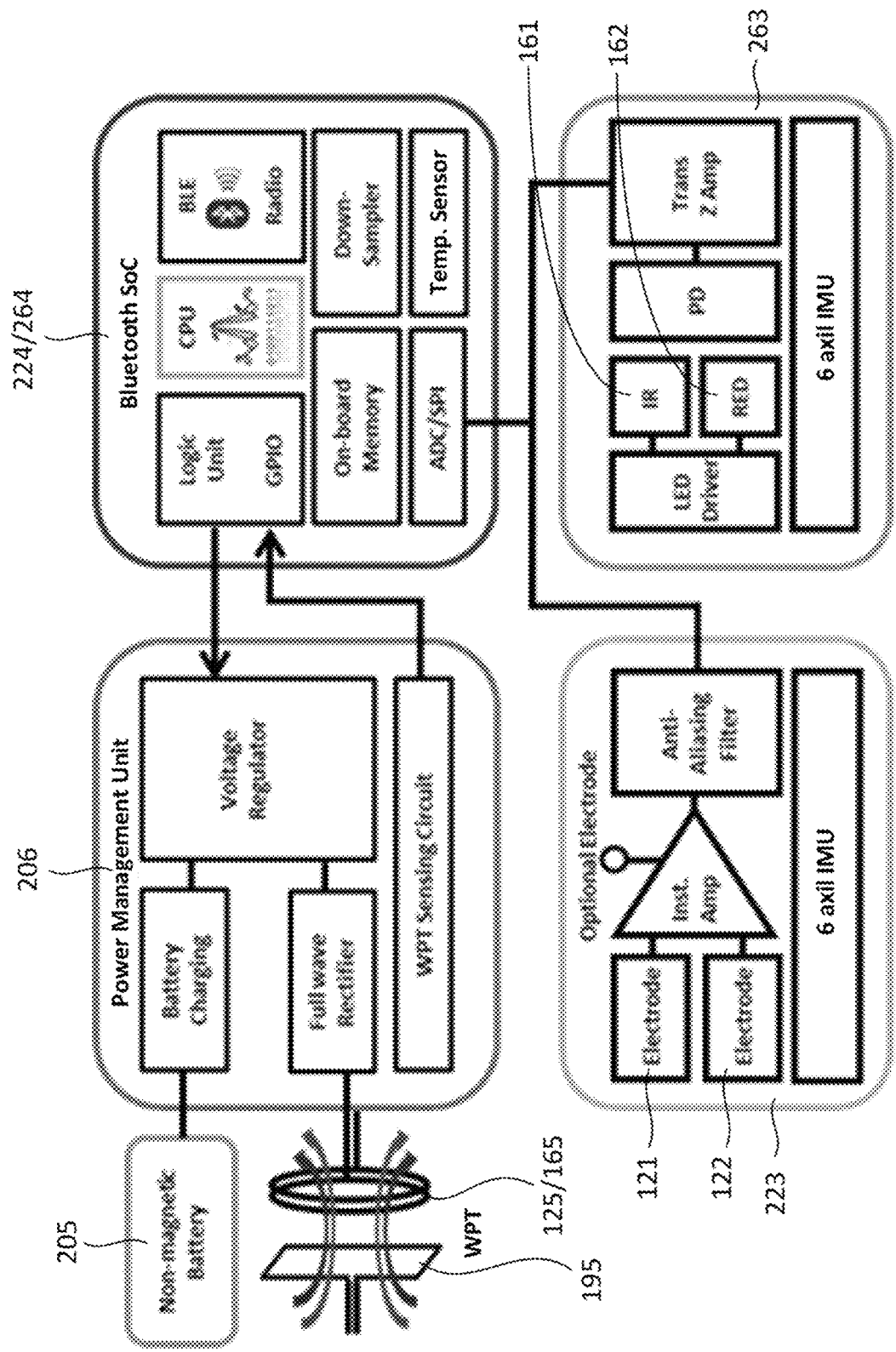
Figure 2E:
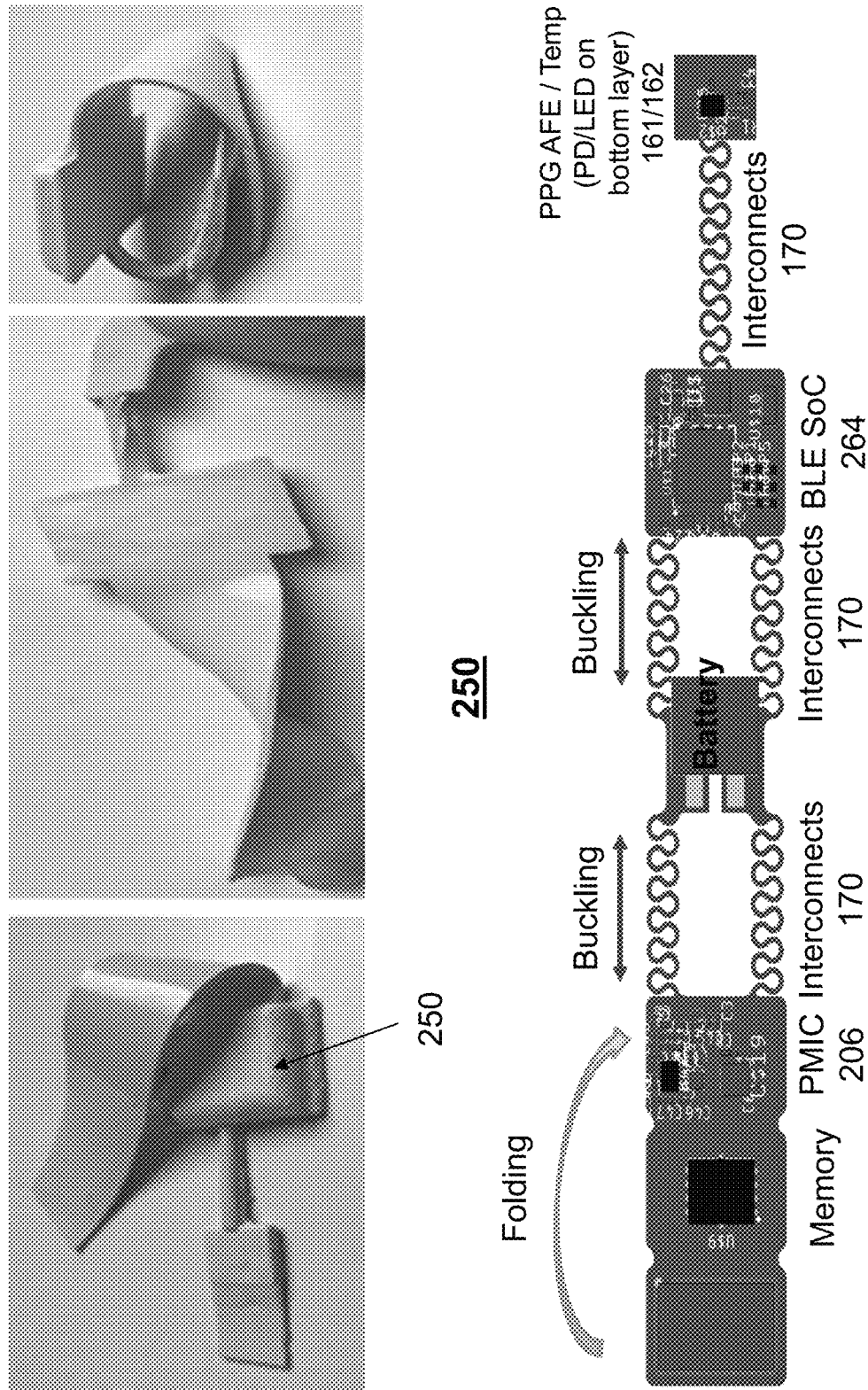

In another embodiment as shown in FIGS. 2C-2E, the first sensor system 210 and the second sensor system 250 are similar to the first sensor system 110 and the second sensor system 150 shown in FIG. 2B, except that each of the first sensor system 210 and the second sensor system 250 further comprises a battery 205 for provide power to said sensor system, and a power management unit/IC (PMIC) 206 electrically coupled with the battery 205, the SoC 224/264 and the transceiver (antenna) 195. The power management unit 206 operably involves dual power operation mode from primary wireless power transfer and the secondary battery 205 for portability. In addition, the sensor member (or sensor circuit) 223 of the first sensor system (ECG EES) 210 also includes optional electrode for fECG measurement and 6 axial inertial measurement unit (IMU) for seismocardiography (SCG) and respiratory rate measurement on the top of an ECG analog front end (AFE). The sensor member (or sensor circuit) 263 of the second sensor system (PPG EES) 250 also includes also a PPG AFE and 6 axial IMU for motion artifact reduction algorithm. The SoC 224/264 of each of the first sensor system 210 and the second sensor system 250 further comprises a down-sampler and BLE radio. Each of the power management unit 206 and the sensor members 223 and 263 is controlled by BLE SoC 224/264.

In certain embodiments, the battery 205 is a rechargeable battery operably recharged with wireless recharging. In one embodiment, the electronic components of each of the first sensor system 210 and the second sensor system 250 further comprises a failure prevention element that is a short-circuit protection component or a battery circuit (not shown) to avoid battery explosion.

In the embodiments as shown in FIGS. 2A-2E, the first sensor system 110 is an ECG sensor system. In other embodiments, the first sensor system 110 may be implemented by other types of sensor systems. For example, the first sensor system 110 may be an inertial motion sensor system or an accelerometer system.

Figure 3:
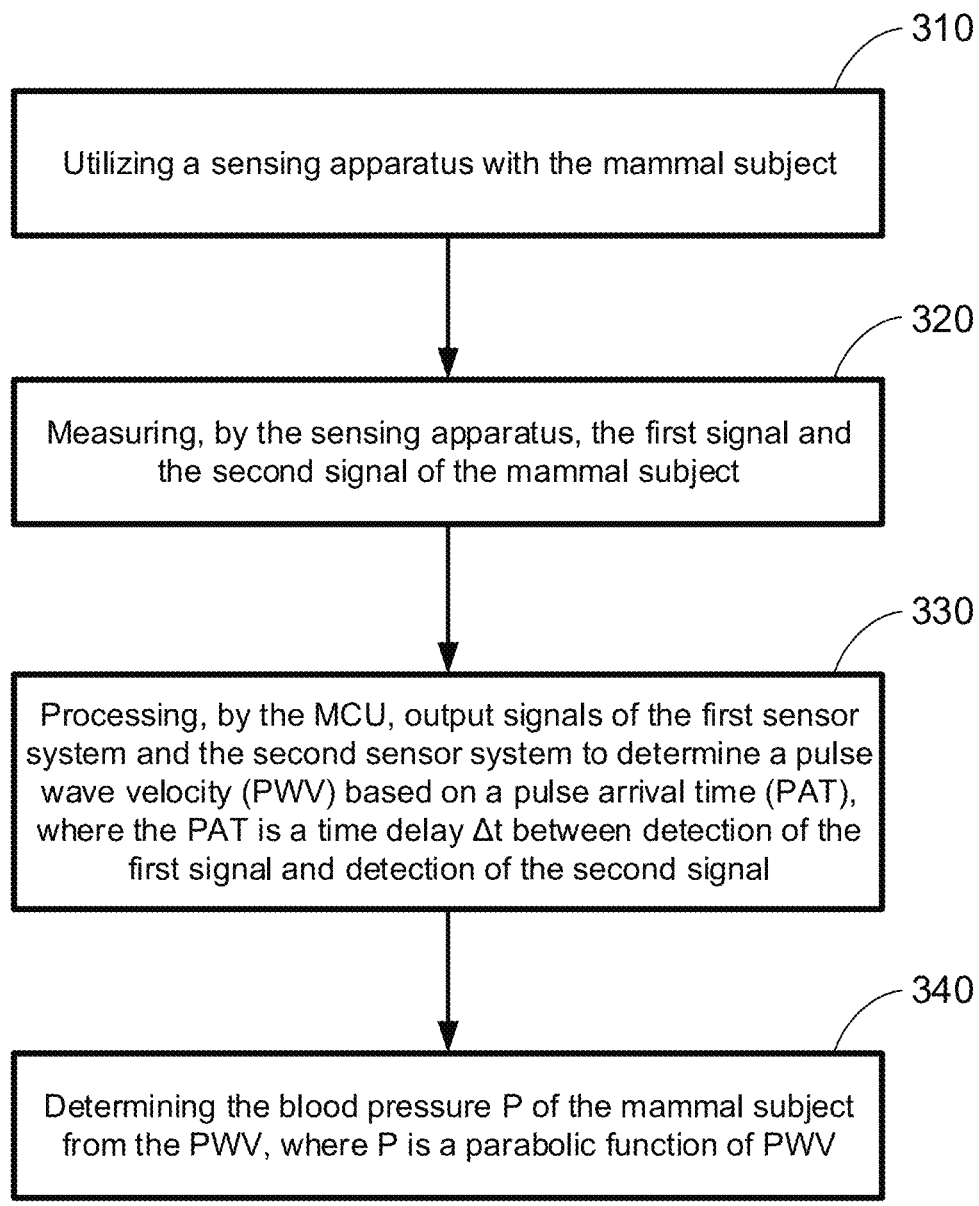
FIG. 3 shows a flowchart of a method of non-invasively measuring blood pressure of a mammal subject according to certain embodiments of the present invention.

FIG. 3 shows a flowchart of a method of non-invasively measuring blood pressure of a mammal subject according to certain embodiments of the present invention. In certain embodiments, the method as shown in FIG. 3 may be implemented on the apparatus as shown in FIG. 1. It should be particularly noted that, unless otherwise stated in the disclosure, the steps of the method may be arranged in a different sequential order, and are thus not limited to the sequential order as shown in FIG. 3.

As shown in FIG. 3, at procedure 310, the sensing apparatus (i.e., the first sensor system 110 and the second sensor system 150 as shown in FIG. 1) are utilized with the mammal subject. Specifically, the first sensor system 110 is attached to a first position 410 of the mammal subject for measuring a first signal of the mammal subject, and the second sensor system 150 is attached to a second position 420 of the mammal subject for measuring a second signal of the mammal subject. Further, the sensing apparatus is in wireless communication with the MCU 190, the first sensor system 110 and the second sensor system are time-synchronized, and spatially separated by a distance (i.e., the pulse arrival distance L) defined by the first and second positions 410 and 420. In certain embodiments, the first position 410 is at a torso region of the mammal subject, and the second position 420 is at an extremity region or a limb region of the mammal subject. In this case, the first signal may be a heartbeat signal detected from the torso region, and the second signal may be a pulse signal detected from the extremity region or the limb region.

At procedure 320, the sensing apparatus measures the first signal and the second signal of the mammal subject, and generates corresponding output signals, which are transmitted wirelessly to the MCU 190.

At procedure 330, the MCU 190 processes the output signals of the first sensor system 110 and the second sensor system 150 to determine the PWV based on the PAT. As discussed above, the PAT is a time delay $\Delta t$ between detection of the first signal and detection of the second signal, and the PWV can be determined based on the PAT and the pulse arrival distance L. At procedure 340, once the PWV is obtained, the MCU 190 may further calculate and determine the blood pressure P of the mammal subject from the PWV, where P is a parabolic function of the PWV.

In certain embodiments, the time synchronization between the first and second sensor systems 110 and 150 can be achieved utilizing a multiprotocol functionality that incorporates a secondary 2.4 Ghz radio protocol other than Bluetooth to create a private star network among the network of sensors. The secondary radio protocol will allow one of the sensors to act as the central hub to broadcast the local clock based on its crystal oscillator to create a common clock within the network. Every sensor can have a local clock running and will adjust the local clock value based on the broadcasted clock value. The central hub can additionally communicate with the base station (including, for example, a remote reader or a receiver) to synchronize its local clock to the base station's clock. The private network will not be bounded to the base station allowing two different body-sensor networks to be synchronized in time without the need for a central hub. This is relevant in situations where the sensors function as blind data collection tools with data that can be downloaded and used later via a base unit. The common clock can timestamp all of the signals captured through the sensors that the private star network uses allowing novel algorithms that depend on a common clock to be used in our sensor system. The only source of time lag/drift is from the crystal oscillator that is typically low (0.0004%). This time lag can be adjusted and corrected via the central hub at a frequency determined by the user.

It should be noted that all or a part of the methods according to the embodiments of the invention is implemented by hardware or a program instructing relevant hardware.

Yet another aspect of the invention provides a non-transitory computer readable storage medium/memory which stores computer executable instructions or program codes. The computer executable instructions or program codes enable a computer or a similar computing apparatus to complete various operations in the above disclosed method of non-invasively measuring physiological parameters of a mammal subject. The storage medium/memory may include, but is not limited to, high-speed random access medium/memory such as DRAM, SRAM, DDR RAM or other random access solid state memory devices, and non-volatile memory such as one or more magnetic disk storage devices, optical disk storage devices, flash memory devices, or other non-volatile solid state storage devices.

Certain aspects of the invention relate to a method of continuously and non-invasively measuring blood pressure. In certain embodiments, the method comprises the steps of: measuring pulse arrival time (PAT) with a wearable sensor, wherein the wearable sensor comprises a photoplethysomgraphy sensor and an electrocardiography (ECG) sensor, wherein PAT is determined from a time delay between a heartbeat measured by the ECG sensor and a pulse detected by the photoplethysomgraphy sensor at a location distant from the ECG sensor; providing an output from the wearable sensor to a microprocessor to determine a pulse wave velocity (PWV); and continuously determining a blood pressure from the PWV.

In certain embodiments, the blood pressure is measured in: a pregnant subject, including a pregnant subject suffering from pre-eclampsia; a patient suffering from renal disease, including end stage renal disease; a pediatric patient, including a neonatal patient; a patient suffering from a cardiac disease or cardiac defect; a patient suffering from a stenosis, including a renal artery stenosis; a cancer patient, including a patient having a tumor producing a blood-pressure changing biomolecule; an exercising individual; or an apparently healthy individual to assess essential hypertensive risk.

In certain embodiments, the sensors are in a patch geometry and are stretchable and flexible for conformal contact with a skin surface of a user.

In certain embodiments, the method further comprises the step of mounting the ECG sensor to a torso region and the photoplethysmography sensor to a limb or limb extremity.

In certain embodiments, the photoplethysmography sensor is wrapped around a foot, a wrist, a finger or a toe.

In certain embodiments, the sensor is wireless and is capable of continuously monitoring blood pressure for a time period that is greater than 6 hours without recharging of a power source.

In certain embodiments, the sensors conformally contact a skin region with a hydrogel positioned between the skin and a skin-facing surface of the sensor.

In certain embodiments, the continuously measured blood pressure comprises a plurality of individual BP measurements over a time span of at least 1 hour.

In certain embodiments, the PWV is a function of pressure, artery Young's modulus, artery wall thickness and artery radius.

In certain embodiments, PWV=L/Δt, wherein L is an arterial separation distance between the sensors and Δt is a time required for a pulse detected by the ECG sensor to arrive at the photoplethysmography sensor.

In certain embodiments, the blood pressure P is calculated from the PWV according to the formula of:

$$P = \alpha PWV^2 + \beta$$

where α and β are empirically determined constants that depend on artery geometry and artery material properties.

In certain embodiments, at a blood pressure range of between 5 kPa and 20 kPa:

$$0.13\ kPa \times s^2/m^2 \leq \alpha \leq 0.23\ kPa \times s^2/m^2;\ and$$

$$2.2\ kPa \leq \beta \leq 3.2\ kPa.$$

In certain embodiments, the method further comprises the step of processing an output of the wearable sensor to obtain an ongoing dynamic threshold to improve accuracy of a physiological parameter monitored by the sensor.

In certain embodiments, the sensor is an ECG sensor or a PPG sensor.

Certain aspects of the invention relate to a physiological monitor for non-invasively and continuously measuring blood pressure, which includes: a pair of electronically-coupled sensor systems, each sensor system comprising: a plurality of electronic components; a serpentine interconnect that electrically interconnects different electronic components; an elastomeric encapsulation layer that at least partially surrounds the plurality of electronic components and the serpentine interconnect to form a bottom tissue-facing surface and a top environment-facing surface; a transmitter system for wirelessly communicating data related to a physiological parameter measured from the sensor system; wherein a first sensor system of the pair of electronically-coupled sensor systems is a conformable torso sensor system configured to epidermally-mount and conform to a torso region; wherein a second sensor system of the pair of electronically-coupled sensor systems is a conformable limb sensor system configured to epidermally mount and conform to a limb region; and wherein the pair of sensors communicate time-synchronized data to a microprocessor to determine PAT and PWV to determine blood pressure.

Certain aspects of the invention relate to a method of continuously and non-invasively measuring a physiological parameter of a patient. In certain embodiments, the method comprises the steps of: mounting a wearable sensor to a skin surface; measuring a physiological parameter with the wearable sensor; and continuously determining an optimal driving signal provided to an electronic component of the wearable sensor to obtain an optimized measurement of the physiological parameter.

In certain embodiments, the sensor is a PPG sensor and the driving signal is an electrical input provided to a light emitting diode.

In certain embodiments, the continuously determining step comprises dynamic thresholding.

In certain embodiments, the skin parameter is skin pigmentation or skin translucency.

These and other aspects of the present invention are further described below. Without intent to limit the scope of the invention, examples according to the embodiments of the present invention are given below. Note that titles or subtitles may be used in the examples for convenience of a reader, which in no way should limit the scope of the invention. Moreover, certain theories are proposed and disclosed herein; however, in no way they, whether they are right or wrong, should limit the scope of the invention so long as the invention is practiced according to the invention without regard for any particular theory or scheme of action.

EXAMPLE 1

As discussed above, there are fundamental problems with the MK Equation and the Hughes Equation. This example, related to one aspect of the invention, establishes a relation between the PWV and blood pressure P for human arteries without the two assumptions involved in the MK Equation 1a, nor the empirical Hughes Equation 1b, which is replaced by the linear or nonlinear constitutive models for the artery. The results are validated by in vitro experiments using thin walled tubes of poly-dimethylsiloxane (PDMS), as a linear elastic material, for an artificial blood vessel. For human artery, which is well represented by the Fung hyperelastic model, the newly established relation between the PWV and blood pressure is much more accurate than the MK and Hughes Equations, leading to an improved understanding of the connections between blood pressure and PWV, with relevance in continuous, cuffless, and noninvasive blood pressure monitoring.

Figure 4A:
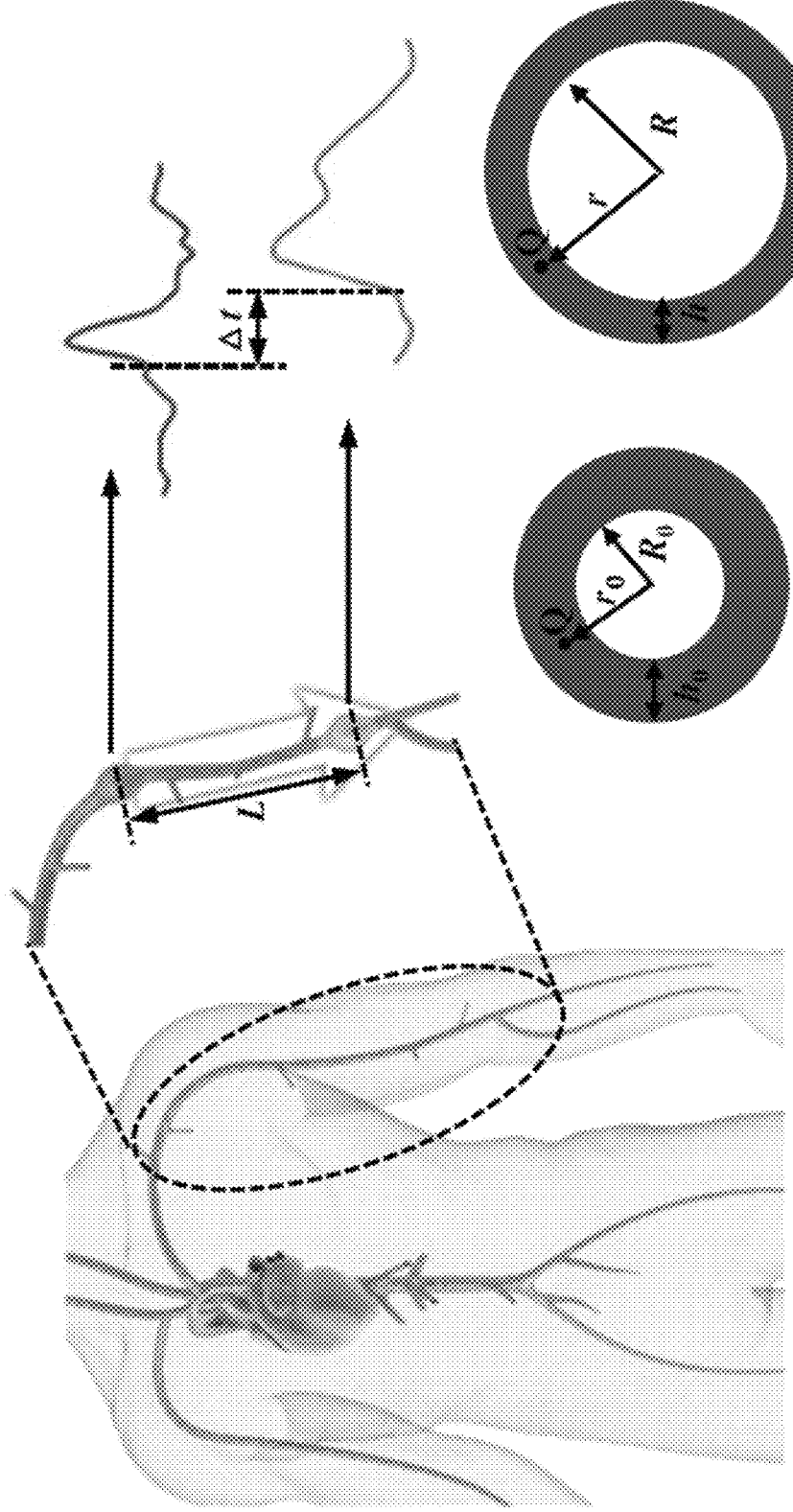
FIGS. 4A-4C schematically shows pulse wave propagation in a human artery according to certain embodiments of the present invention.
Figure 4B:
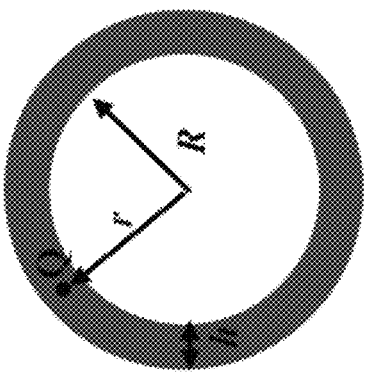
Figure 4C:
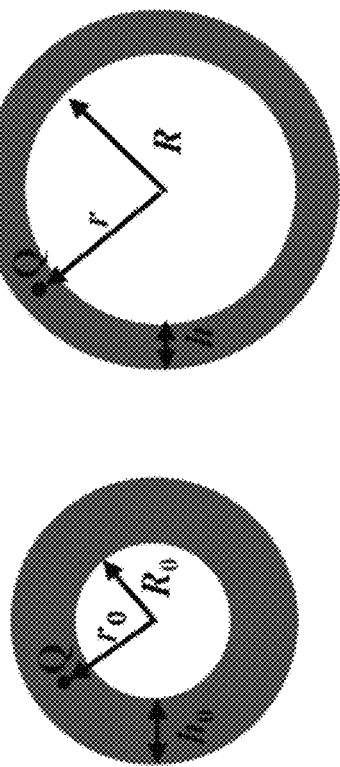

The schematic diagrams in FIGS. 4A-4C show the pulse wave propagation in a human artery. The disturbances caused by beating of the heart propagate as waves along the artery at a finite velocity. For a long and straight tube (artery) containing incompressible and nonviscous blood, the PWV is related to P, the inner area of the artery (A), and ρ by:

$$PWV = \sqrt{\frac{A}{\rho}\frac{dP}{dA}}. \quad (4)$$

FIGS. 4B and 4C illustrate the cross-section of the artery before (initial thickness $h_0$ and radius of $R_0$) and after (thickness h and radius of R) the deformation induced by the blood pressure. Assumption (ii) in the MK Equation 1a stated above gives the inner area of the artery fixed at $A=\pi R_o^2$. The two assumptions (i) and (ii) in the MK Equation 1a, together with the equilibrium of force in the artery wall, yield $dP/dA=Eh_0/2\pi R_0^3$, and its substitution in Equation 4 leads to the MK Equation 1a. In the following analysis, a P-A relation is established without the two assumptions in the MK Equation 1a.

Equilibrium of force in the artery wall in the cylindrical co-ordinates $\{r,\theta,z\}$ along the artery wall requires $$\frac{d\sigma_{rr}}{dr} + \frac{1}{r}(\sigma_{rr} - \sigma_{\theta\theta}) = 0, \quad (5)$$

where the stresses $\sigma_{rr}$ and gee in the radial and circumferential directions are no longer uniform after assumption (i) in the MK Equation 1a is relaxed; they are related to the corresponding strains via a constitutive model, such as the Fung hyperelastic model for the human artery. After assumption ii in the MK Equation is relaxed, the (logarithmic) strains are obtained in terms of the (change of) inner area of the artery A. The pressure P can be obtained by integrating Equation 5 from the inner radius r=R to the outer radius r=R+h after the deformation, i.e., $$P = \int_{-P}^{0} d\sigma_{rr} = \int_{R}^{R+h} \frac{1}{r}(\sigma_{\theta\theta} - \sigma_{rr})dr. \quad (6)$$

This equation 6, together with the constitutive model of the artery, gives the relation between P and A. Its substitution into Equation 4 yields the relation between the blood pressure P and PWV, which is given separately in Equations 7, 8, 10 and 11 for the linear elastic model and Fung hyperelastic model of the artery, and is validated by the in vitro experiments.

In Vitro Experiments

Figure 5D:
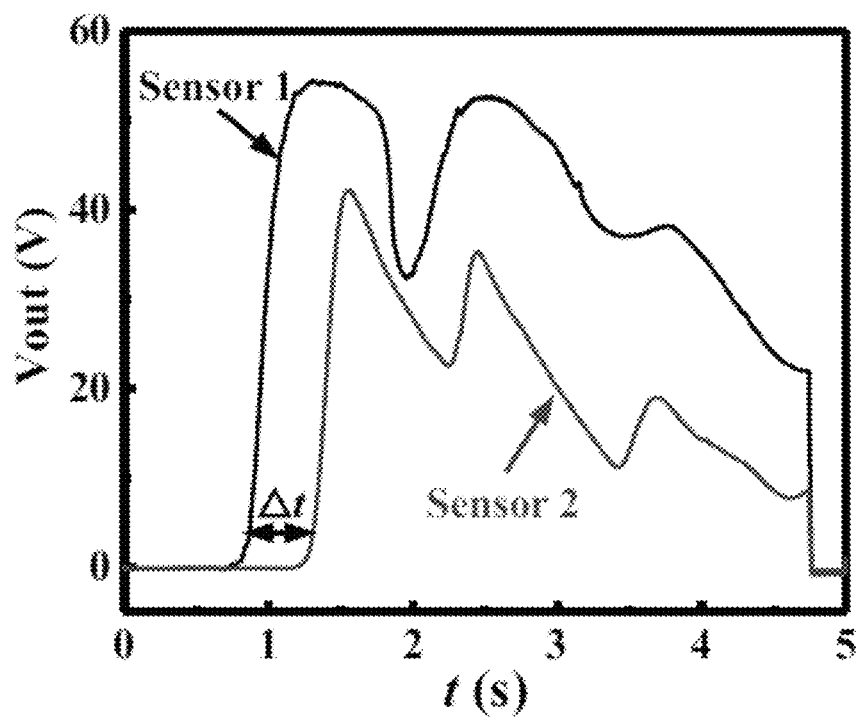

An in vitro hemodynamic simulator is developed, as shown in FIG. 5A, to verify the theory. The simulator includes a pulsatile flow generator, an artificial blood vessel, strain sensors, pressure sensors, and a water reservoir to define the base pressure on the tube. Pressurized water controlled by solenoid valve provides pulsatile flow, while the height of the water reservoir determines the diastolic pressure in the tube. Thin PDMS tubes with various wall thicknesses and elastic properties (controlled by changing the base to curing agent mixing ratio) provide artificial blood vessels with linear elastic properties within the range of deformations studied (FIG. 5B). Two strain sensors made of carbon black-doped PDMS (CB-PDMS) detect the pulses at two different positions along the tube. The time difference $\Delta t$ between the arrival of the pulse at each sensor position together with the distance L between the two sensors allows calculation of PWV (FIG. 5C). FIG. 5D shows the voltage signal of the two sensors with the distance L, which gives the PWV as $$PWV = \frac{L}{\Delta t} \quad (2)$$

Figure 9:
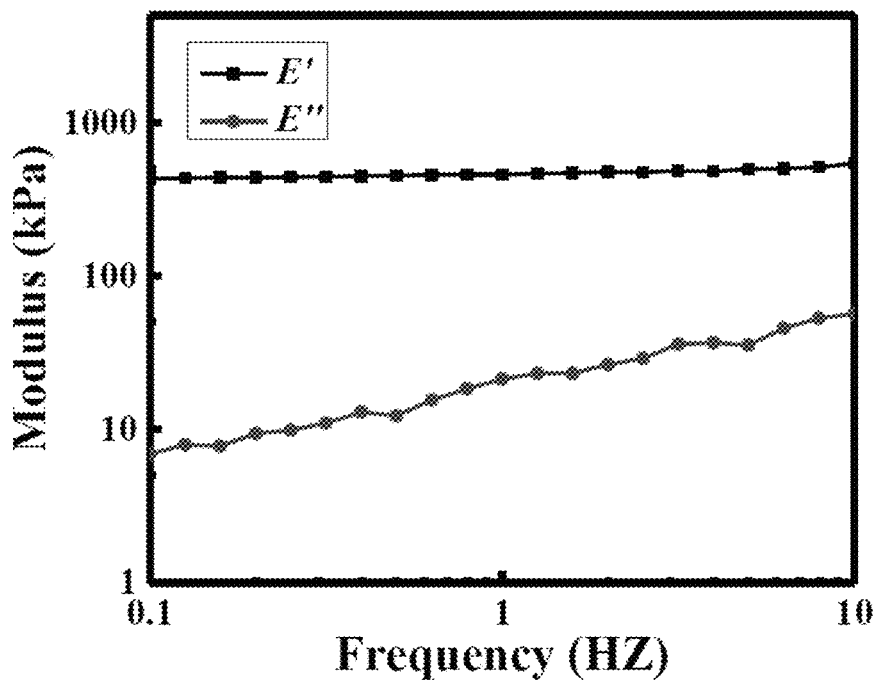
FIG. 9 shows the relations of the modulus (storage E' and loss moduli E") of the 17:1 PDMS versus the frequency in the range of 0.1-10 HZ according to one embodiment of the invention.
Figure 10:
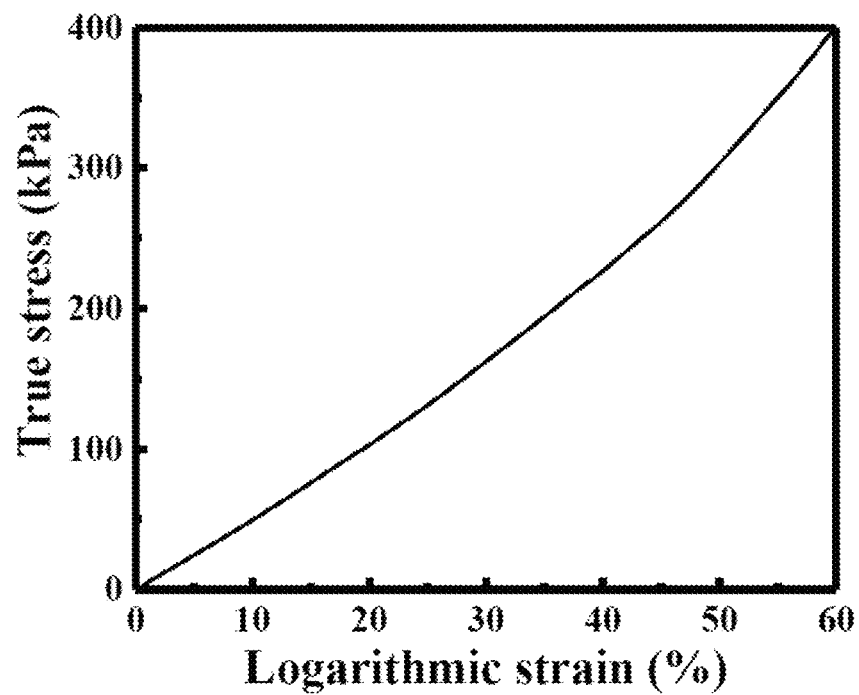
FIG. 10 shows the relation of true stress versus logarithmic strain of the 17:1 PDMS, which is linear elastic for the strain up to 30%, according to one embodiment of the invention.

PDMS (base polymer: curing agent=15:1, 17:1, and 19:1) is used to fabricate the tube for the in vitro experiment. FIG. 9 shows the storage and loss moduli (E' and E") of the 17:1 PDMS measured by dynamic mechanical analysis at frequencies between 0.1 Hz and ~10 Hz. The dynamic modulus is $\sqrt{E'^2+E''^2}$. The moduli of the 15:1, 17:1, and 19:1 PDMS at 10 Hz are 650, 540, and 420 kPa, respectively, for the samples used in the experiment shown in FIG. 5F. FIG. 10 shows the relation between the true stress and logarithmic strain of the 17:1 PDMS measured by tensile testing, which displays good linearity for strain less than 30%. The tube in the in vitro experiment is, therefore, linear elastic with the modulus of E (i.e., the dynamic modulus $\sqrt{E'^2+E''^2}$ at 0 Hz).

Relation Between Pressure and PWV for Linear Elastic Tube Walls

The linear stress-strain relation for the PDMS tubes, together with Eq. 4, gives the relation between the pressure P and inner area A as:

$$P = \frac{\tilde{E}}{4}\left[dilog\left(\frac{A+A_{wall}}{A_0+A_{wall}}\right) - dilog\left(\frac{A}{A_0}\right)\right] + \frac{\tilde{E}}{8}\left[\ln\left(\frac{A+A_{wall}}{A_0+A_{wall}}\right)^2 - \ln\left(\frac{A}{A_0}\right)^2\right], \quad (7)$$

where $\tilde{E}=E/(1-v^2)$ is the plane strain modulus; $v=0.5$ is the Poisson's ratio for PDMS; $A_0=\pi R_0^2$ and $A_{wall}=\pi(R_0+h_0)^2-\pi R_0^2$ are the inner area of the artery and the area of artery wall, respectively, without pressure; and dilog is the dilogarithm function. Substitution of Equation 7 into Equation 4 gives the PWV as $$PWV = \sqrt{\frac{\tilde{E}A}{4\rho}\left[\frac{A_0}{A(A-A_0)}\ln\frac{A}{A_0} - \frac{A_0+A_{wall}}{(A+A_{wall})(A-A_0)}\ln\left(\frac{A+A_{wall}}{A_0+A_{wall}}\right)\right]}. \quad (8)$$

Figure 5E:
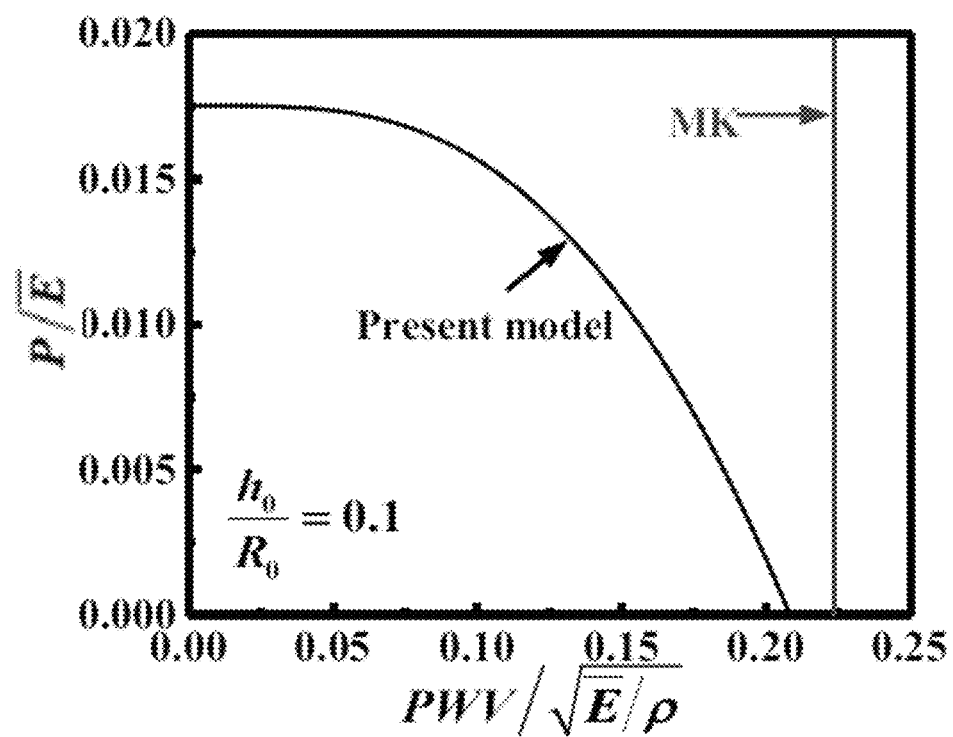
FIG. 5E shows a comparison of normalized pressure versus normalized PWV for linear elastic behavior of the tube between the present model and the MK Equation.
Figure 5F:
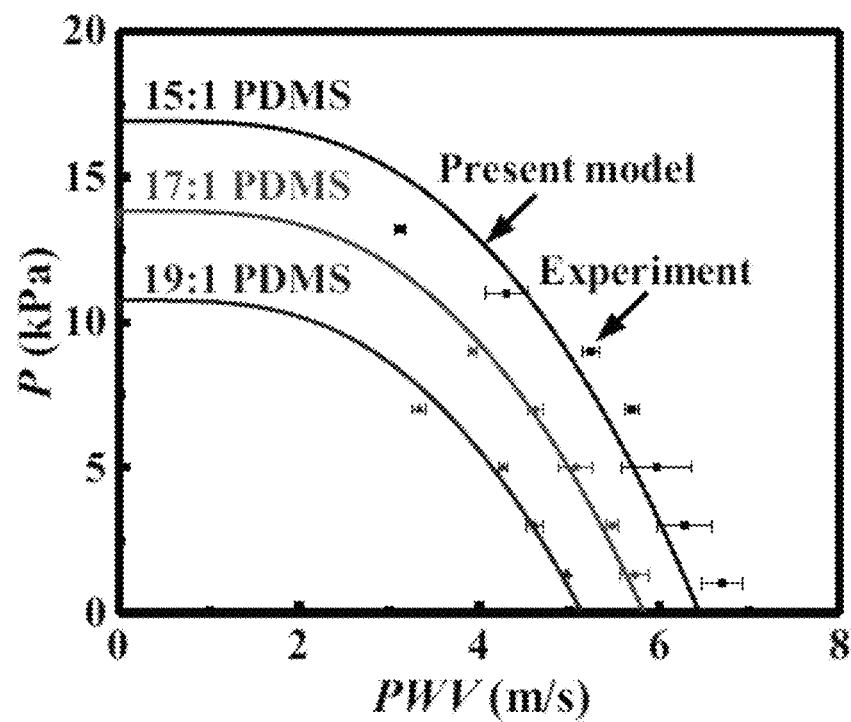
FIG. 5F shows a comparison between the present model and the in vitro experiment, without any parameter fitting, for different materials according to one embodiment of the invention.
Figure 5G:
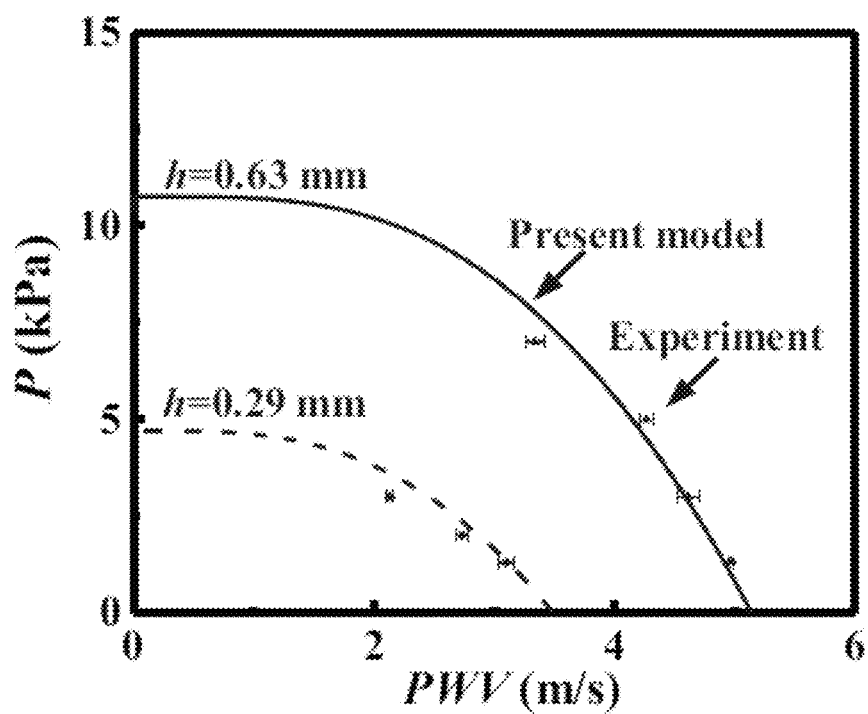
FIG. 5G shows a comparison between the present model and the in vitro experiment, without any parameter fitting, for different tube thickness according to one embodiment of the invention.

Equations 7 and 8 are parametric equations for the relation between the pulse wave velocity PWV and pressure P; elimination of the intermediate variable A yields the following scaling law between the normalized PWV and pressure P:

$$\frac{PWV}{\sqrt{\frac{E}{\rho}}} = g\left(\frac{P}{E}, \frac{h_0}{R_0}\right), \quad (9)$$

where g is a nondimensional function shown in FIG. 5E. It is clear that PWV displays a strong dependence on P. For comparison, the MK Equation 1a predicts a constant PWV (independent of the pressure), and is also shown in FIG. 5E. FIG. 5F indicates that, without any parameter fitting, the relation between PWV and P obtained from Equation 9 agrees well with the in vitro experiments for 15:1, 17:1, and 19:1 PDMS and fixed $R_0=6.3$ mm, $h_0=0.63$ mm, and $\rho=1,000$ kg/m³ for water. The effect of liquid viscosity is shown in FIG. 11. Similarly, FIG. 5G shows excellent agreement with experimental results for two thicknesses ($h_0=0.63$ and 0.29 mm) of the tube made of 19:1 PDMS and fixed $R_0=6.3$ mm, and $\rho=1,000$ kg/m³, without any parameter fitting. The experimental data all display strong dependence on the pressure, which clearly do not support the MK and Hughes Equations.

Relation Between Blood Pressure and PWV for Human Artery Walls

Figure 6A:
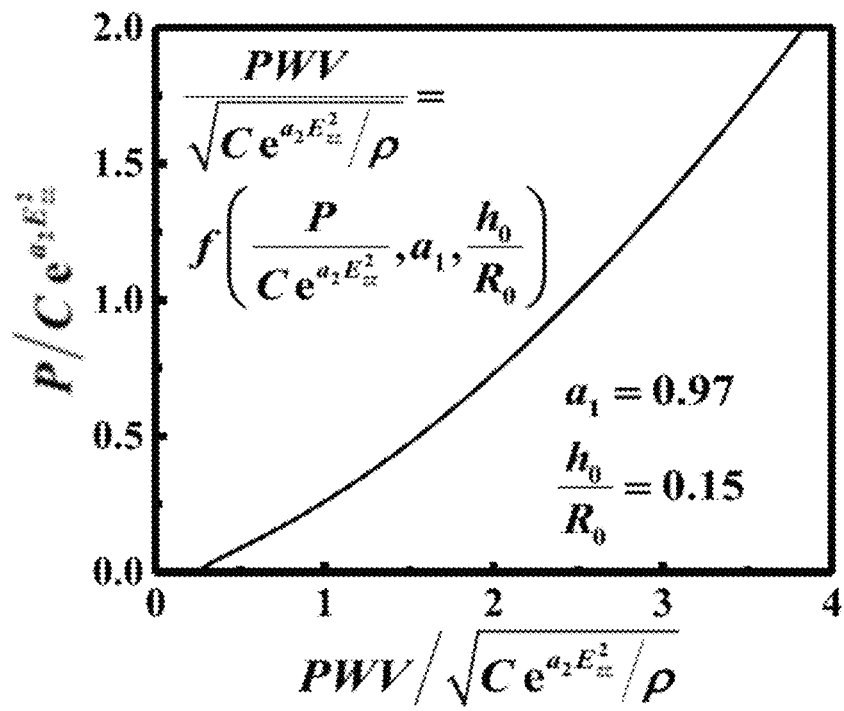
FIG. 6A shows the relation of normalized blood pressure P versus normalized PWV for the human artery characterized by the Fung hyperelastic model according to one embodiment of the invention.
Figure 6B:
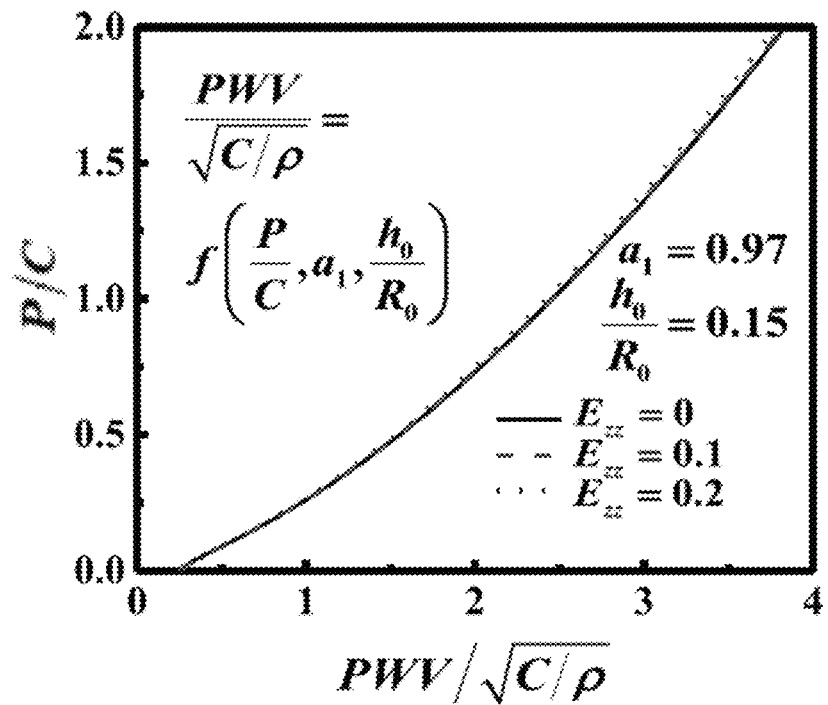
FIG. 6B shows the relation of normalized P versus normalized PWV for (FIG. 3B) different axial stretching of the artery according to one embodiment of the invention.

The human artery walls are well characterized by the Fung hyperelastic model, which has the strain energy density $$W = \frac{C}{2}e^{a_1 E_{\theta\theta}^2 + a_2 E_{zz}^2} - \frac{C}{2}, \tag{10}$$

where $E_{\theta\theta}$ and $E_{zz}$ are the Green strains in the circumferential and axial directions of the artery, respectively, and $\alpha_1$, $\alpha_2$, and C are the material parameters, which are related to the elastic modulus (at zero pressure) by $E_0 = C\alpha_1$. Following the same analysis, but with the linear elastic model replaced by the Fung hyperelastic model for human arteries, yields parametric equations for the relation between the pulse wave velocity and pressure, similar to Equations 7 and 8, as:

$$P = \frac{1}{4}Ce^{a_2 E_{zz}^2}\sqrt{ra_1}\left\{erfi\left(\frac{A-A_0}{2A_0}\sqrt{a_1}\right) - erfi\left[\frac{A-A_0}{2(A_0+A_{wall})}\sqrt{a_1}\right]\right\}, \tag{11}$$

$$PWV = \sqrt{\frac{Ce^{a_2 E_{zz}^2}a_1 A}{4\rho}\left[\frac{1}{A_0}e^{\frac{a_1(A-A_0)^2}{4A_0^2}} - \frac{1}{A_0+A_{wall}}e^{\frac{a_1(A-A_0)^2}{4(A_0+A_{wall})^2}}\right]}. \tag{12}$$

where erfi is the imaginary error function. Elimination of the intermediate variable A in Equations 11 and 12 yields the following scaling law between the normalized pulse wave velocity PWV and blood pressure P:

$$\frac{PWV}{\sqrt{\frac{Ce^{a_2 E_{zz}^2}}{\rho}}} = f\left(\frac{P}{Ce^{a_2 E_{zz}^2}}, a_1, \frac{h_0}{R_0}\right), \tag{13}$$

where f is a nondimensional function, and is shown in FIG. 6A for $\alpha_1=0.97$ and $h_0/R_0=0.15$ for the human artery. FIG. 6B examines the effect of artery stretching $E_{zz}$ by comparing the limit $E_{zz}=0$ of Equation 13, which takes the form $$\frac{PWV}{\sqrt{\frac{C}{\rho}}} = f\left(\frac{P}{C}, a_1, \frac{h_0}{R_0}\right), \tag{14}$$

to the scaling law in Equations 11 and 12 for a representative $a\lambda_z^2$-2.69 and $E_{zz}=0.1$ and 0.2. The effect of artery stretching is negligible even for 20% stretching.

The scaling law in Equation 14 degenerates to the MK Equation 1a in the limit of low blood pressure, which gives $A \to A_0$. Therefore, $e^{\alpha_1(A-A_0)^2/(4A_0^2)} = \sim 1$ and $e^{\alpha_1(A-A_0)^2/[4(A_0+A_{wall})^2]} = \sim 1$. Equation 12, at the limit $E_{zz}=0$, then becomes $PWV = \sqrt{Ca_1 A_{wall}/[4\rho(A_0+A_{wall})]}$, which is identical to the MK Equation 1a for a thin artery wall [i.e., $A_{wall}/(A_0+A_{wall}) = \sim 2h_0/R_0$] at zero blood pressure.

Figure 6C:
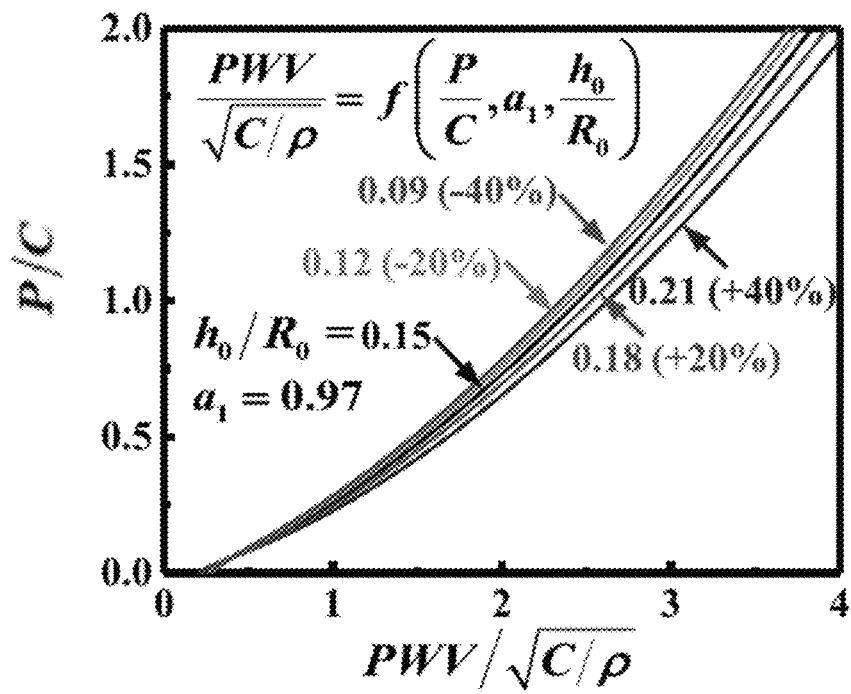
FIG. 6C shows the relation of normalized P versus normalized PWV for (FIG. 3B) different thickness-to-radius ratio $h_0=R_0$ of the artery according to one embodiment of the invention.
Figure 6D:
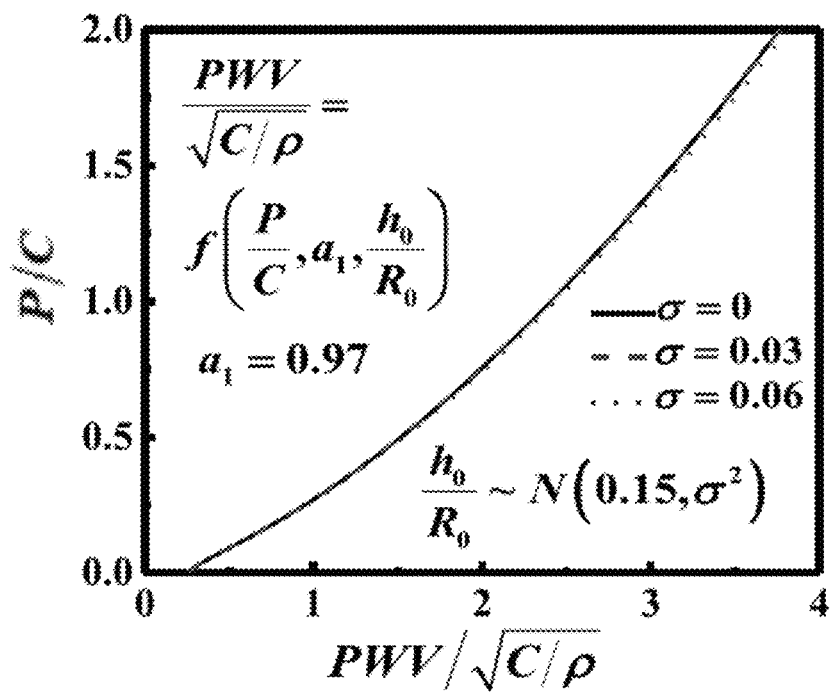
FIG. 6D shows the relation of normalized P versus normalized PWV for (FIG. 3B) different SD $\sigma$ for a normal distribution of $h_0=R_0$ according to one embodiment of the invention.

The artery thickness, in general, is not a constant even for the same human artery. The thickness-to-radius ratio $h_0/R_0$ has an average of 0.15 and a variation of 40%. FIG. 6C shows the normalized pressure P/C versus $PWV/\sqrt{C/\rho}$ for $h_0/R_0=0.09$, 0.12, 0.15, 0.18, and 0.21, corresponding to ±20% and ±40% variations of $h_0/R_0=0.15$. Even for 40% variations, the curves in FIG. 6C are different by only ~6%. For $\alpha_1=0.97$ and a normal distribution of $h_0/R_0$ with the mean 0.15 and SD σ, the mean PWV is obtained as $$\frac{PWV}{\sqrt{\frac{C}{\rho}}} = f\left[\frac{P}{C}, a_1 = 0.97, \frac{h_0}{R_0} \sim N(0.15, \sigma^2)\right]. \tag{15}$$

and is shown in FIG. 6D for several values of σ. The curve based on the mean $h_0/R_0$ gives an accurate relation between the PWV and blood pressure.

Figure 7A:
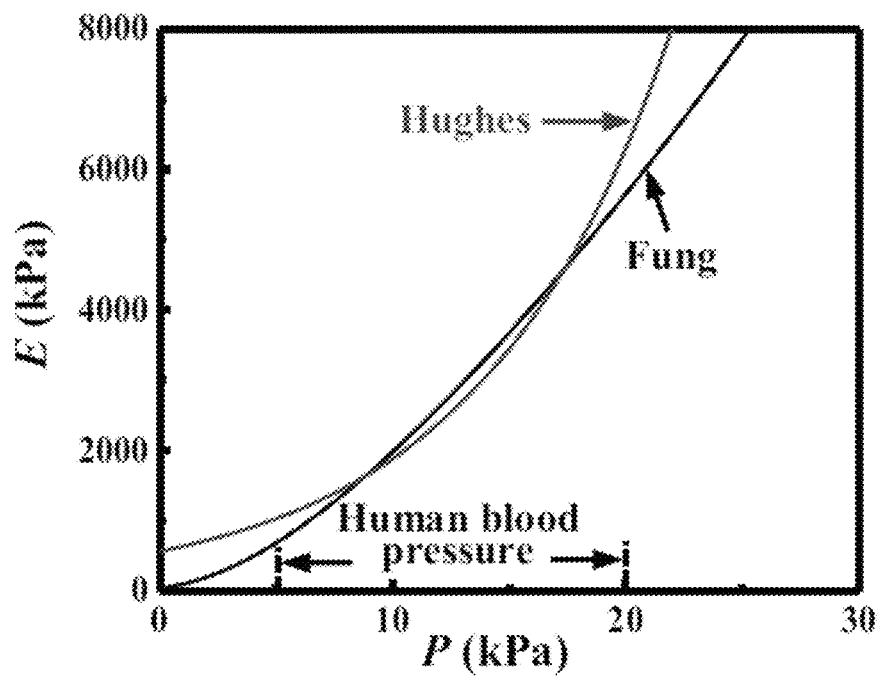
FIG. 7A shows the relations of the arterial stiffness (equivalent modulus) E versus the blood pressure P for a human artery characterized by the Fung hyperelastic model and the Hughes Equation according to one embodiment of the invention, where its parameters $E_0$ and $\zeta$ are determined by fitting the arterial stiffness within the range of human blood pressure (5 kPa to ~20 kPa).
Figure 7B:
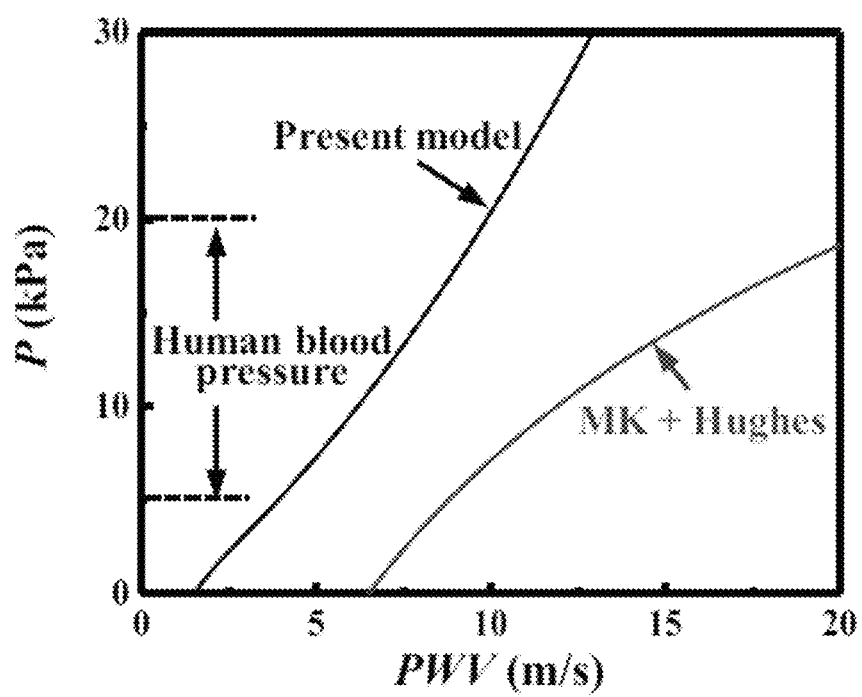
FIG. 7B shows the relations of the blood pressure P versus the PWV of the human artery given by the present model and by the MK and Hughes Equations according to one embodiment of the invention, where the parameters $E_0$ and $\zeta$ are determined from FIG. 7A.

FIGS. 7A and 7B compare the present model (in Equation 14) to the classical MK Equation 1a and the Hughes Equation 1b for a human artery characterized by the Fung hyperelastic model with C=39 kPa, $\alpha_1=0.97$, and $h_0/R_0=0.15$. The arterial stiffness, or the equivalent tangent modulus E, is shown in FIG. 7A versus the blood pressure P. In the range of human blood pressure (5 kPa to ~20 kPa), the arterial stiffness is used to determine the material parameters in the Hughes Equation 1b as $E_0=563$ kPa and $\zeta=0.121$ kPa$^{-1}$, which yields good agreement between the Hughes Equation and the present model. However, for the same range of blood pressure, FIG. 7B shows that the MK and Hughes Equations overestimate the PWV by a factor of ~2 compared with the present model. This large discrepancy results from the large change of radius and thickness of the artery wall (>50%), which is neglected in the MK Equations (due to assumption ii) but is accounted for in the present model.

Figure 7C:
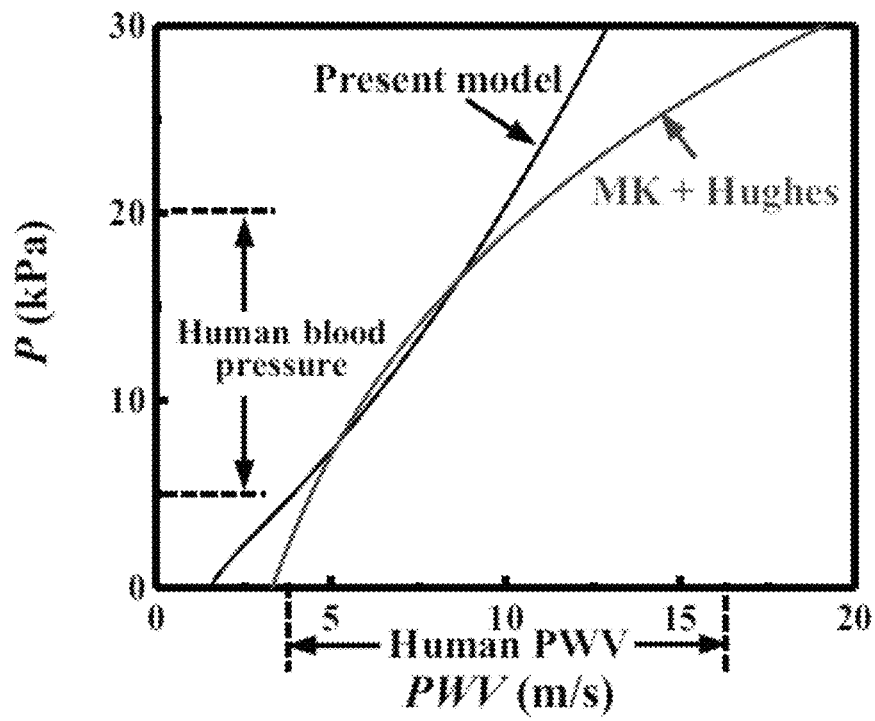
FIG. 7C shows the relations of the blood pressure P versus the PWV for the human artery characterized by the Fung hyperelastic model; the MK and Hughes Equations according to one embodiment of the invention, where the parameters $E_0$ and $\zeta$ in the Hughes Equation are determined by fitting within the range of human blood pressure (5 kPa to ~20 kPa).
Figure 7D:
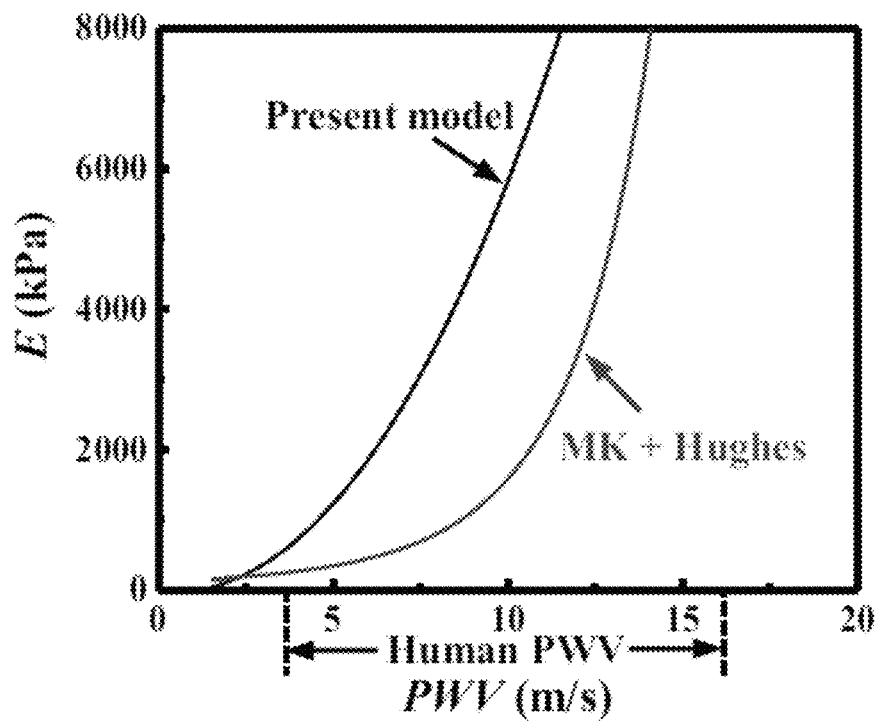
FIG. 7D shows the relations of the artery stiffness (equivalent modulus) E versus the PWV of the human artery given by the present model and by the Hughes Equation according to one embodiment of the invention, where the parameters $E_0$ and $\zeta$ are determined from FIG. 7C.

Another important clinical application of PWV is to determine the arterial stiffness (equivalent tangent modulus) of the artery wall as the elastic properties of arteries are affected by aging and cardiovascular diseases, therefore providing useful prognostic in-formation. The blood pressure P is shown in FIG. 7C versus the PWV. In the range of human blood pressure (5 kPa to ~20 kPa), the pressure-PWV relation is used to determine the material parameters in the MK and Hughes Equations 1a and 1b as $E_0=145$ kPa and $\zeta=0.117$ kPa$^{-1}$, which yields good agreement between the MK and Hughes Equations and the present model. However, for the same range of PWV, FIG. 7D shows that the MK and Hughes Equations significantly underestimate the equivalent tangent modulus by a factor of ~3 compared with the present model. The main reason for this large discrepancy is the same as that shown in FIGS. 7A and 7B.

For the human artery characterized by the Fung hyperelastic model with C=39 kPa, $\alpha_1=0.97$, and $h_0/R_0=0.15$, the range of human blood pressure (5 kPa to ~20 kPa) gives $A/A_0=2.46$ to ~3.55, which is relatively large such that function erfi in Equation 11 can be approximated by erfi(x)≈$e^{x^2}/(\sqrt{\pi}x)$ (28). Equations 11 and 12, at the limit $E_{zz}=0$, have the asymptotes for large $A/A_0$, $$P \approx \frac{C}{2}\frac{A_0}{A-A_0}e^{\frac{a_1(A-A_0)^2}{4A_0^2}} \tag{16}$$

$$PWV^2 \approx \frac{Ca_1}{4\rho}\frac{A}{A_0}e^{\frac{a_1(A-A_0)^2}{4A_0^2}}. \tag{17}$$

Figure 8A:
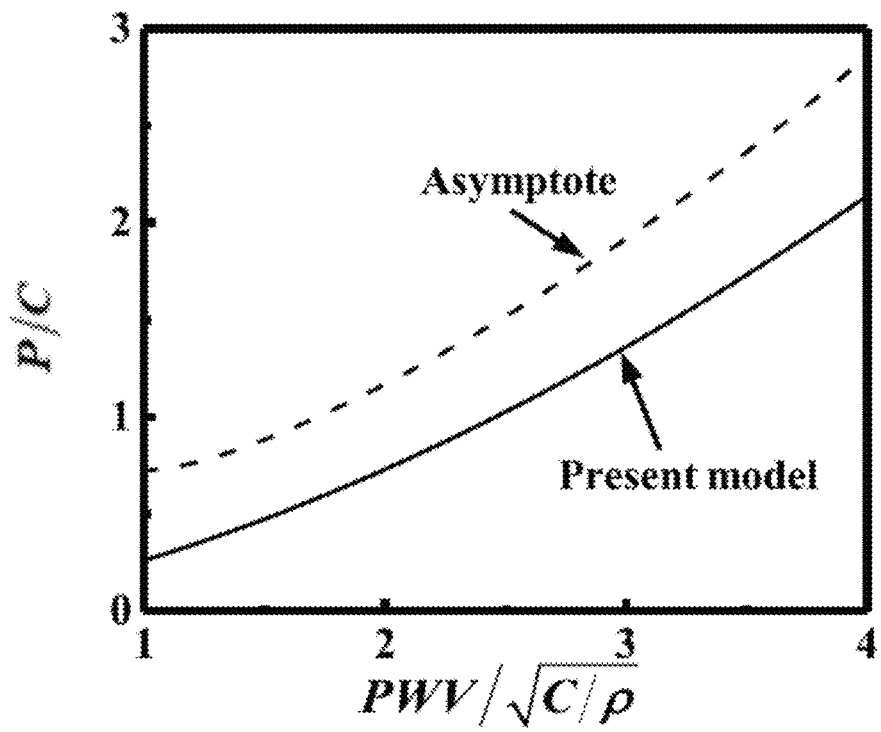
FIG. 8A shows the relations of the normalized blood pressure P versus the normalized PWV given by the present model (in Equations 11 and 12) and its asymptote (in Equation 18) according to one embodiment of the invention.

Eliminating the variable A yields the following relation:

$$\ln\frac{P}{C} + \ln\left(\sqrt{1 + \frac{8\rho}{a_1}\frac{PWV}{P}} - 1\right) = \frac{a_1}{16}\left(\sqrt{1 + \frac{8\rho}{a_1}\frac{PWV^2}{P}} - 1\right)^2, \quad (18)$$

which, as shown in FIG. 8A, is in reasonable agreement with the P versus PWV curve at large pressure, and their difference is approximately a constant (i.e., a shift along the vertical axis). The above equation suggests that the blood pressure scales with $PWV^2$, i.e., $P \approx \alpha PWV^2$, and the scaling coefficient $\alpha$ is approximately a constant since the logarithmic term ln (P/C) has a very weak dependence on the pressure. Accordingly, the relation between P and PWV can be represented by Equation 3:

$$P = \alpha PWV^2 + \beta, \quad (3)$$

where $\beta$ represents the constant shift between the two curves in FIG. 5A, and a and B depend on the material properties and geometry of the artery (C, $\alpha_1$, $\rho$, $R_0$, and $h_0$) and are to be determined from the experiments.

Figure 8B:
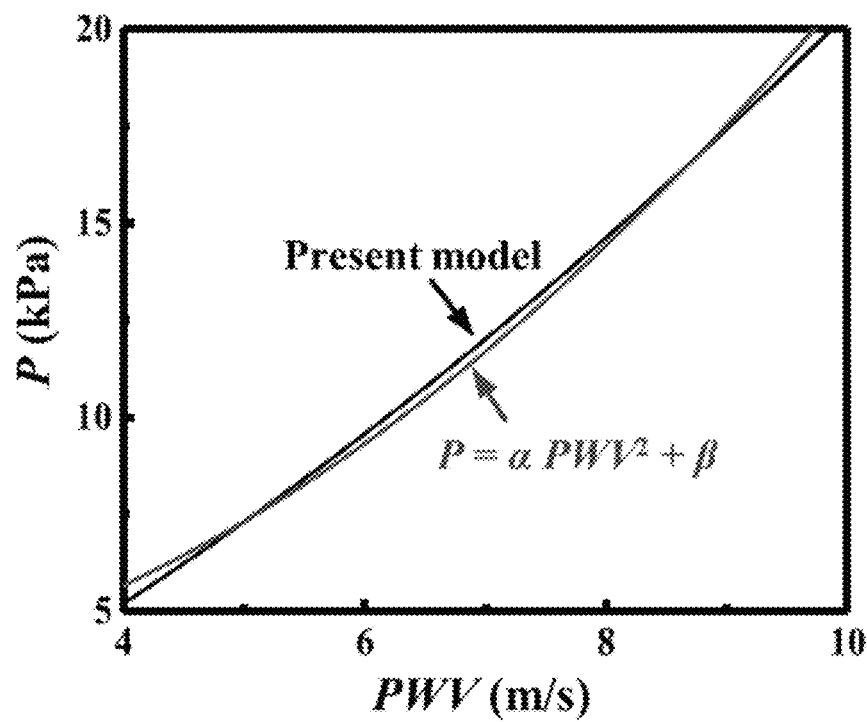
FIG. 8B shows a comparison of the formula $P=\alpha PWV^2+\beta$ to the present model (Equations 11 and 12) according to one embodiment of the invention.
Figure 8C:
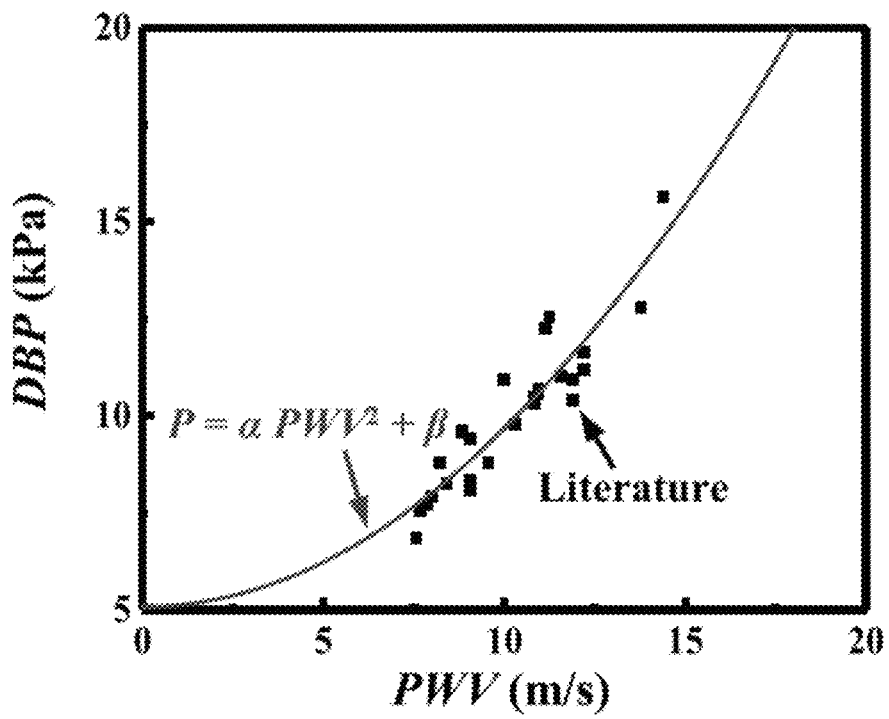
FIG. 8C shows a comparison of the formula $P=\alpha PWV^2+\beta$ to literature data according to one embodiment of the invention.

For the human artery characterized by the Fung hyperelastic model with C=39 kPa, $\alpha_1$=0.97, and $h_0/R_0$=0.15, the constants are $\alpha$=0.18 kPa·s²·m⁻² and $\beta$=2.7 kPa, which show excellent agreement (FIG. 8B) with the P versus PWV relation obtained from Eqs. 10 and 11 in the range of human blood pressure (5 kPa to ~20 kPa). FIG. 8C further compares Equation 3 with literature data of the experimental diastolic blood pressure (DBP, measured by an invasive method) versus PWV (obtained from the ear and toe pulses) during and after anesthesia for surgery. For $\alpha$=0.046 kPa·s²·m⁻² and $\beta$=5.1 kPa, Equation 3 agrees reasonably well with the experimental data.

Figure 13:
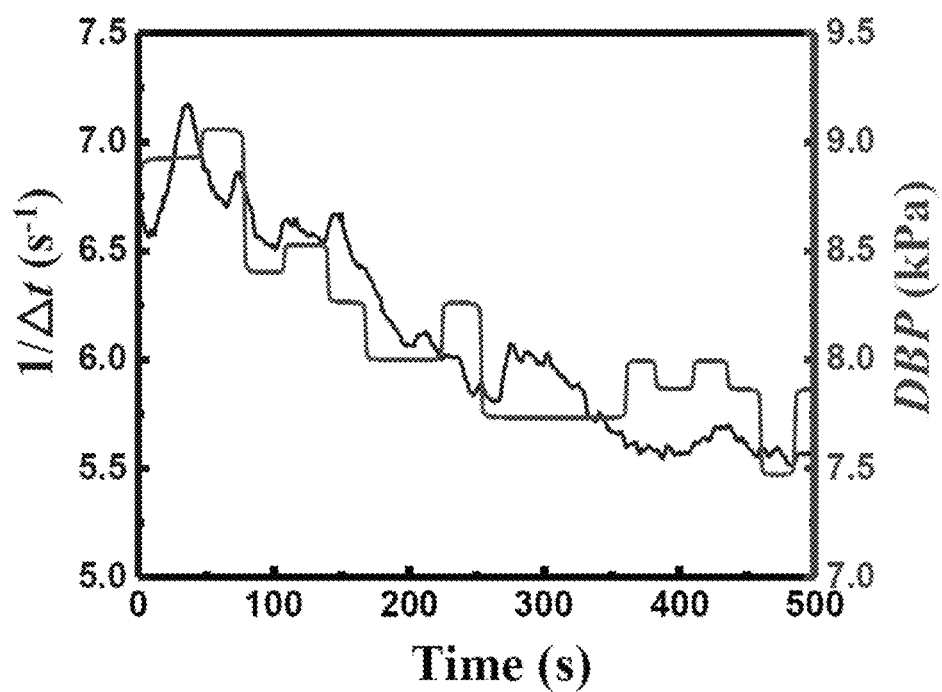
FIG. 13 shows the relations of $1/\Delta t$ and DBP versus time during the post-exercise period according to one embodiment of the invention.

FIGS. 12A and 12B show a multimodal wearable sensor called the BioStamp® (MC10 Inc.), which contains electrodes and an optical sensor for collection of ECG and PPG signals simultaneously. The BioStamp® mounts on the torso in the subclavicular region (FIG. 12A) or, alternatively, on the posterior side overlaying the scapula (FIG. 12B). These two positions allow collection of ECG and PPG signals concurrently, and exploit the temporal relationship between these two signals to compute pulse arrival times (PVW=L/Δt: pulse arrival distance, L, pulse arrival time, Δt). Evaluations of the correlations between these Δt measurements and blood pressure rely on episodic measurements of blood pressure with a conventional cuff device with the subject instrumented with the BioStamp. The Δt and DBP versus time are measured during the postexercise period. The 1/Δt and DBP both decrease during the first 300 s (after sprinting), then approach a stable resting value as shown in FIG. 13. Their relation can be described by substituting Equation 2 into Equation 3, $$P = \alpha \frac{L^2}{\Delta t^2} + \beta. \quad (19)$$

Figure 8D:
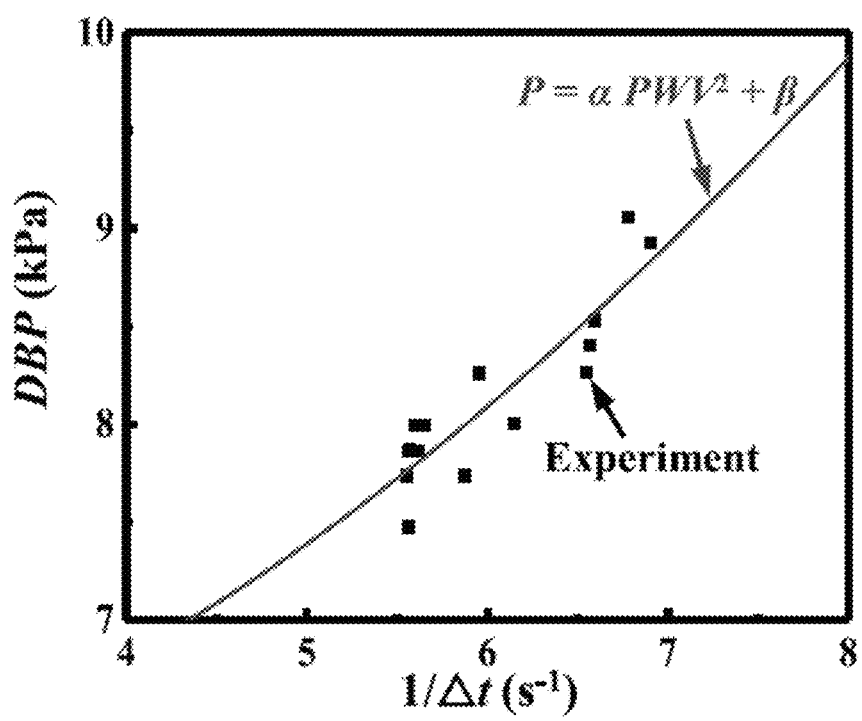
FIG. 8D shows a comparison of $P=\alpha\ PWV^2+\beta$ to the experiments of blood pressure P versus $1/\Delta t$ according to one embodiment of the invention.

The 1/Δt and DBP response during the first 300 seconds are shown in FIG. 8D, together with Equation 19 and $\alpha L^2$=0.064 kPa·s² and $\beta$=5.8 kPa, which shows reasonable agreement with the experimental data. In general, once $\beta$ and $\alpha$ in Equation 3 (or $\alpha L^2$ in Equation 19) are determined, then the continuous, cuffless, and noninvasive blood pressure can be monitored by measuring the PWV.

Hemodynamic Simulator

A pressurized bottle filled with water driven by a 12-V solenoid valve (Adafruit Industries) produced pulse wave flow by opening of a given repeatable pressure in the water reservoir. Two factory-calibrated pressure sensors (HHP886; OMEGA Engineering) with measurement accuracy of ±1.5% were located before strain sensor #1 and after strain sensor #2 as shown in FIG. 5A. Strain sensors were placed on the surface of a PDMS tube at a specific distance. Resistance difference during pulse wave by data acquisition system at 1-kHz sampling rate (Powerlab 8/35; ADInstruments) provided the detection of the peak of resistance change from strain sensors. The water reservoir controlled the diastolic pressure in the tube by adjusting the water height. The water generated from the pulse generator flowed out from the tube to maintain the pressure in the tube before and after pulse generation.

Fabrication of Thin CB-PDMS Strain Sensor

Spin coating 30:1 PDMS (Sylgard 184 Silicone Elastomer; Dow Corning) at 1,000 rpm on a Si wafer generated a substrate. Spin coating polyimide (PI2545; HD Microsystems) at 3,000 rpm for 30 s followed by baking at 110° C. for 1 min, 150° C. for 4 min, and 250° C. for 5 min produced a thin layer. Spin coating AZ4620 (AZ Electronic Materials) at 2,000 rpm for 30 s and developing generated a mold for the strain sensor. Fabrication of thin CB-PDMS began with mixing 25 wt % carbon black (VULCAN XC72R; Cabot Corporation) and 30:1 PDMS. A doctor blade method formed a thin CB-PDMS layer in the opening region in the mold. After baking at 70° C. for 2 h, immersion in acetone removed the photoresist to leave only the patterned CB-PDMS on a PI layer. Spin coating and baking at 70° C. for 2 h of 30:1 PDMS generated a uniform encapsulation layer.

Fabrication of Thin PDMS Tube

Pouring a precursor to PDMS (Sylgard 184 Silicone Elastomer; Dow Corning) with a specific mixing ratio into the inside of clear poly(ethylene terephthalate)-glycol tube with 12.7-mm inner diameter (McMaster-Carr) to cover all of the inside of the tube and curing it overnight while held in a vertical position at room temperature at 20° C. generated one layer of thin PDMS. The tube was then reversed before pouring a second layer to reach an approximately homogeneous thickness along the length of the tube (thickness variation is less than 10%). The number of repetitions of this process determined the thickness of the tubing. A week of additional curing process reached a stable state of the PDMS in terms of elastic properties.

Measurement of Elastic Properties

Elastic properties of each PDMS tube were measured using a RSA3 dynamic mechanical analyzer, within a few hours after the pulse wave velocity measurement to avoid any aging effect.

Relation Between P and A

FIGS. 4B and 4C show the schematic diagram of the artery cross section before (initial thickness $h_0$ and radius $R_0$ in FIG. 4B) and after (thickness h and radius R in FIG. 4C) the deformation due to the blood pressure (P). In the cylindrical coordinates {r, θ, z}, the true stress and logarithmic strain are $\{\sigma_{rr}, \sigma_{\theta\theta}, \sigma_{zz}\}$ and {εrr, εθθ, εzz} at any point Q ($r_0$ and r before and after the deformation, respectively). The linear elastic constitutive model gives $\sigma_{\theta\theta} - \sigma_{rr} = [E/(1+v)](\varepsilon_{\theta\theta} - \varepsilon_{rr})$. In the in vitro experiments the tube length (~2 m) is much larger than its radius (~6 mm) such that the plane-strain model is adopted (i.e., the axial strain $\varepsilon_{zz}$=0), which together with the material incompressibility, give $\varepsilon_{rr} = -\varepsilon_{\theta\theta}$ such that $$\sigma_{\theta\theta} - \sigma_{rr} = \bar{E}\varepsilon_{\theta\theta}, \quad (20)$$

where the plane-strain modulus $\bar{E}=E/(1-v^2)$ is related to the linear elastic modulus E and Poissons' ratio $v=0.5$ of the tube, and the logarithmic strain $\varepsilon_{\theta\theta}=\ln(r/r_0)$. Substitution of Equation 20 into Equation 6 yields $$P = \int_{R^2}^{(R+h)^2} \frac{1}{2}(\sigma_{\theta\theta}-\sigma_{rr})\frac{dr^2}{r^2} \qquad (21)$$
$$= \int_{R^2/R_0^2}^{(R+h)^2/(R_0+h_0)^2} \left[-\frac{\ln\lambda^{1/2}}{2\lambda(\lambda-1)}\right]d\lambda,$$

which leads to Equation 7, where the inner radii $R_0$ and R of the artery area before and after the deformation are related to the corresponding inner areas by $A_0=\pi R_0^2$ and $A=\pi R^2$.

For the human artery characterized by the Fung hyperelastic model with the axial strain $E_{zz}$ and strain in the circumferential direction $E_{\theta\theta}=(e^{2\varepsilon_{\theta\theta}}-1)/2$, the constitutive model gives $$\sigma_{\theta\theta}-\sigma_{rr} = \frac{\partial W}{\partial \varepsilon_{\theta\theta}} = \frac{1}{2}Ce^{a_2 E_{zz}^2}a_1\left(e^{2\varepsilon_{\theta\theta}}-1\right)e^{2\varepsilon_{\theta\theta}+\frac{1}{4}a_1\left(e^{2\varepsilon_{\theta\theta}}-1\right)^2}, \qquad (22)$$

where W given in Equation 10 is for two-dimensional analysis, and the left hand side of the above equation results from the stress state $\{\sigma_{rr}, \sigma_{\theta\theta}, \sigma_{zz}\}$ subtracted by a hydrostatic stress $\{\sigma_{rr}, \sigma_{rr}, \sigma_{rr}\}$, i.e., $\{0, \sigma_{\theta\theta}-\sigma_{rr}, \sigma_{zz}-\sigma_{rr}\}$ for this incompressible material. Substitution of Equation 22 into Equation 6 yields $$P = \int_{R^2}^{(R+h)^2} \frac{1}{2}(\sigma_{\theta\theta}-\sigma_{rr})\frac{dr^2}{r^2} \qquad (23)$$
$$= \int_{R^2/R_0^2}^{(R+h)^2/(R_0+h_0)^2}\left[-\frac{1}{4}Ce^{a_2 E_{zz}^2}a_1 e^{\frac{1}{4}a_1(\lambda-1)^2}\right]d\lambda,$$

which can be simplified to Equation 11.

Effect of Liquid Viscosity in the Tube

For the tube [$h_0=0.29$ mm, $R_0=6.35$ mm, and 15:1 PDMS (580 kPa)], both water (viscosity $\mu \approx 0.001$ Pa·s and desity $\rho=1000$ kg/m$^3$) and water/glycerol mixture (viscosity $\mu \approx 0.006$ Pas and desity $\rho=1130$ kg/m$^3$) are used as the liquid in the tube in the experiments. FIG. 11 shows that the PWV for water/glycerol mixture is slightly smaller than that for water at the same pressure. The present model, which accounts for the effect of mass density but not viscosity of the liquid, agrees well with the experiments without any parameter fitting. This suggests that the effect of the liquid viscosity may be small, considering the viscosities of two liquids are different by a factor of 6. The viscosity of the blood is ~0.004 Pa·s, between those of water and water/glycerol mixture, such that its effect on human's PWV should also be small.

Asymptote of P and PWV at Large A

For a large ratio $A/A_0$, the first term $e^{a_1(A-A_0)^2/(4A_0^2)}/A$, inside the square root on the right hand side of Equation 12 overwhelms the second term $e^{a_1(A-A_0)^2/[4(A_0+A_{wall})^2]}/(A_0+A_{wall})$. Therefore, at $E_{zz}=0$, Equation 12 has the asymptote $$PWV^2 \sim \frac{Ca_1}{4\rho}\frac{A}{A_0}e^{\frac{a_1(A-A_0)^2}{4A_0^2}}. \qquad (24)$$

The function erfi(x) has the asymptote $e^{x^2}/(\sqrt{\pi}x)$[20] at a large x. Similarly, at $E_{zz}=0$, Equation 11 has the asymptote $$P \sim \frac{C}{2}\frac{A_0}{A-A_0}e^{\frac{a_1(A-A_0)^2}{4A_0^2}}, \qquad (25)$$

because the second term erfi $\{\sqrt{a_1}(A-A_0)/[2(A_0+A_{wall})]\}$ of the right hand side of Equation 11 is overwhelmed by the first term erfi$[\sqrt{a_1}(A-A_0)/(2A_0)]$ for a large $A/A_0$. The ratio of Eq. S5 to Equation 25 gives $$\frac{PWV^2}{P} = \frac{a_1}{2\rho}\left[\frac{A(A-A_0)}{A_0^2}\right], \qquad (26)$$

which is a quadratic equation for $A/A_0$, and has the solution $$\frac{A}{A_0} = \frac{1}{2} + \sqrt{\frac{1}{4}+\frac{2\rho}{a_1}\frac{PWV^2}{P}}. \qquad (27)$$

Its substitution into Equation 25 yields Equation. 18.

In sum, this example establishes a relation between the blood pressure P and pulse wave velocity PWV that does not rely on the Hughes Equation 1b or on assumptions in the MK Equation 1a. This relation degenerates to the MK Equation 1a in a regime of extremely low blood pressures. An in vitro hemodynamic simulator is developed to collect PWV and pressure data using liquid flow through a PDMS (with linear stress-strain relation) tube. These in vitro experiments show that the PWV depends strongly on pressure, unlike expectations based on the MK Equation but in excellent, quantitative agreement with the newly established relation without any parameter fitting. For human arteries, which are well characterized by the Fung hyperelastic model, a simple formula $P=\alpha PWV^2+\beta$ is established within the range of human blood pressure. This formula is validated by literature data as well as by experiments on human subjects, and can be used to determine the blood pressure from the measured PWV in continuous, cuffless, and non-invasive blood pressure monitoring.

EXAMPLE 2

This example, related to another aspect of the invention, provides a device overview of the apparatus and corresponding methods and applications thereof according to certain embodiments of the invention.

The relevance of Example 1 is, in a practical sense, that PAT itself is a surrogate for PWV. PAT is most commonly done by measuring the time gap between an R-wave peak on the ECG waveform and the first positive inflection on the plethysmograph. Numerous parametric estimation techniques are available that use PAT as an estimation of PWV. New wearable sensors are now capable of measuring PAT as a surrogate of PWV. This can be accomplished with an onboard combined PPG and ECG sensors. Thus, a wearable sensor capable of capturing PAT that is then translated to PWV and then translated again with an improved analytical model to blood pressure has significant utility, including for sensor systems, geometries, mounting and various hardware and software useful for measuring physiological parameters for determining PAT.

The methods and devices provided herein have broad applications in consumer health (athletics/sports) and clinical medicine where continuous blood pressure metrics has utility.

One particularly valuable application is in clinical medicine where continuous blood pressure has high value but the morbidity of an invasive arterial line is too high. Examples of clinical applications include:

Pre-eclampsia affects anywhere between 2-8% of pregnancies. It is characterized by the onset of high blood pressure and proteinuria in a pregnant woman. When severe, pre-eclampsia leads to red blood cell breakdown, low platelets, dysfunctional liver and kidney function, visual disturbances, and shortness of breath. Pre-eclampsia leads to poor outcomes for both mother and the baby. In this clinical application, blood pressure can be so labile that women are even admitted to the labor ward for months for close monitoring.

Hemodialysis and Hypertension in End Stage Renal Disease: hypertension is an important risk factor in patients with end stage renal disease undergoing hemodialysis. Poorly controlled hypertension has been associated with an increased risk of cardiovascular mortality, left ventricular hypertrophy, cerebrovascular disease, and other end organ damage in this population. Moreover, intermittent blood pressure measurements, with the aid of a blood pressure cuff, continue to serve as a marker of intravascular volume status and cardiovascular stability during hemodialysis treatment sessions. A rapid decrease in blood pressure during hemodialysis, for example, is often interpreted as a sign of intravascular volume depletion and adequate fluid removal or "ultrafiltration" to achieve a patient's dry weight. The two current methods of cuff-based blood pressure monitoring entail sequential measurements of either sounds auscultated by stethoscope (auscultatory method) or pulse wave measurements (oscillometric method). These are commonly referred to as manual and automated blood pressure measurements, respectively, and the automated oscillometric method is almost universally used in both inpatient and outpatient hemodialysis units due to its ease of use and the need for frequent intermittent blood pressure readings. The manual auscultatory method is prone to operator bias, poor technique, and variations in hearing between operators. The automated oscillometric method can be prone to errors related to patient arm movements, and particularly in hemodialysis patients, extensive vascular disease and the placement of arteriovenous grafts and fistulas. Furthermore, variations in pulse amplitude ratios in hemodialysis patients have been shown to make oscillometric blood pressure readings particularly less reliable in this population. Pulse transit time (PTT) has recently become a subject of interest due to its observed linear relationship with blood pressure. An improved analytical model tying PTT to blood pressure would be of high value in the field of hypertension and renal disease.

Pediatric critical care and neonatal critical care: invasive arterial lines are particularly dangerous in premature neonates. These lines cause thrombosis, infection, and even death. Thus, the ability to measure blood pressure continuously without the associated morbidity would represent a major advantage in these patients.

Critical congenital heart defects/post-operative care: for every 1 in 100 births in the U.S., a neonate will be born with a congenital heart defect. 25% of these individuals will have a critical defect that requires surgical intervention in the first year of life. Home monitoring for vital signs is essential to the clinical care and survival of these patients. A measure of a continuous blood pressure is currently not feasible in the home setting.

Renal artery stenosis: this is a rare cause of hypertension that can lead to labile blood pressures. Blood pressure monitoring is essential in assessing the pre- and post-operative state of these patients.

Rare tumors leading to labile blood pressure requiring continuous monitoring: certain tumors such as pheocromocytomas produce epinephrine analogues that can increase blood pressure significantly.

The devices and methods are relevant for a range of consumer health applications, including:

Continuous blood pressure serves as an additional metric for consumers engaging in physical activity along with other traditional measures such as heart rate.

Essential hypertension: essential hypertension affects more than 80 million Americans. Deemed a "silent killer", essential hypertension has minimal symptoms until a catastrophic event such as a myocardial infarction or a cerebrovascular occurs. Monitoring PAT over time may be useful in consumer health to track their blood pressure over time and to adjust medications with their physicians as needed.

This range of applications is reflected by the devices and methods described herein that utilize a new model that is superior to known models in the art that relate PWV with blood pressure. The models are embedded within algorithm modules executable by processors that are contained in patch-like, stretchable, flexible and wearable sensors that provide more accurate sensing of continuous blood pressure through the measurement of PWV and PAT. Of course, the models provided herein are also compatible with traditional device systems that measure pulse wave velocity, but require wrist/finger straps to operate.

As established in Example 1, a new relation between the blood pressure P and PWV is provided, which does not rely on the Hughes Equation nor the assumptions used in the MK Equation. This relation degenerates to the MK Equation under extremely low blood pressures, and it accurately captures the results of in vitro experiments using artificial blood vessels at comparatively high pressures. For human arteries, which are well characterized by the Fung hyperelastic model, a simple formula between P and PWV is established within the range of human blood pressure. This formula is validated by literature data as well as by experiments on human subjects, with applicability in the determination of blood pressure from PWV in continuous, cuff-less, and non-invasive blood pressure monitoring systems.

Figure 14:
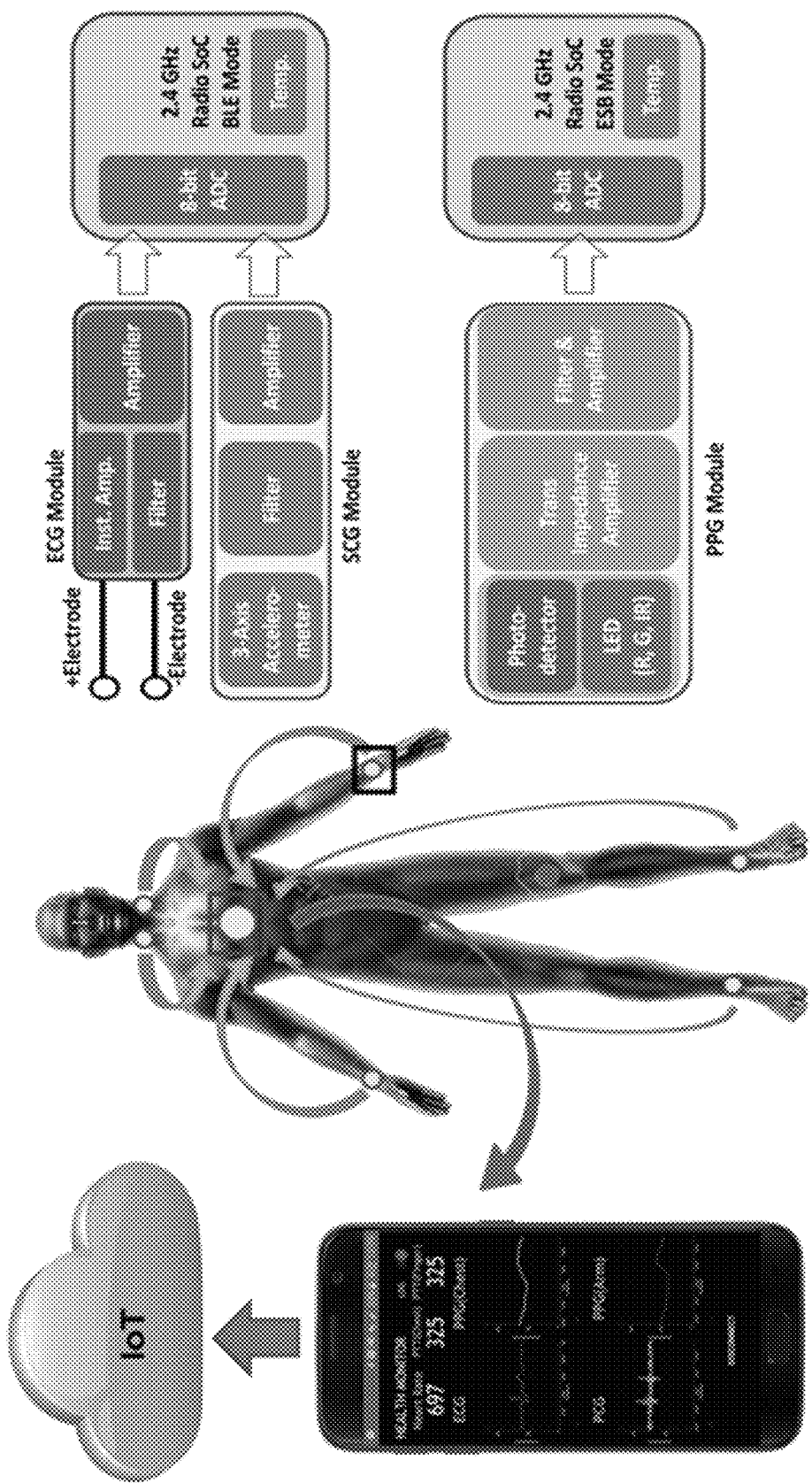
FIG. 14 is a functional block diagram showing a synchronous real-time blood pressure monitoring system according to certain embodiments of the invention.

FIG. 14 summarizes the technical approach for synchronous real-time blood pressure monitoring. The objectives, as illustrated, are miniaturized, non-invasive and continuous blood pressure monitoring platform based on pulse transit time. A star-topology based time-synchronized wireless body sensor network for accessing blood pressure at physiologically important locations is built and evaluated. Mechanical properties for flexible, stretchable, and conformable device platform are optimized.

In certain embodiments, a synchronous real-time blood pressure monitoring system is provided to validate the high correlation between pulse transit time and blood pressure, and to provide wireless, continuous and synchronous multi-nodal data acquisition and real-time signal processing, including for highly stretchable, flexible, and conformable mechanical platforms for skin interfaces (FIGS. 2D, 2E, 14 and 23). The time-synchronized sensors can be achieved by, for example, a master-slave configuration (FIG. 15).

FIG. 16 illustrates the wearable electronics can be used to continuously monitor BP, and may be displayed on a remote reader, including a hand-held or tablet device.

Figure 17:
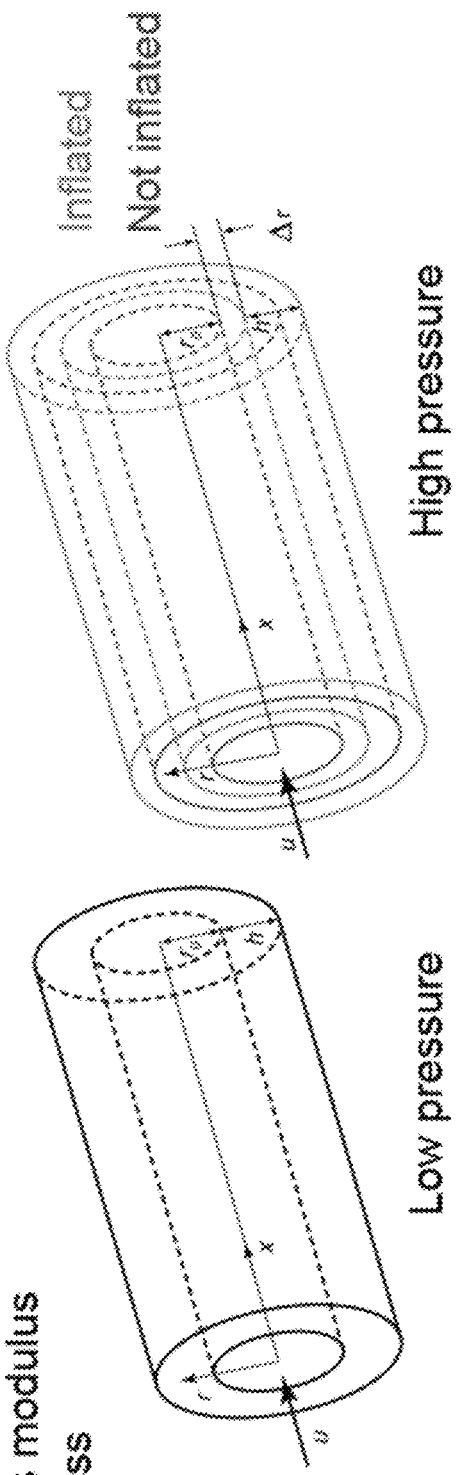
FIG. 17 shows the difference between the MK-based models and the present model according to one embodiment of the invention.

FIG. 17 schematically summarizes the differences between the MK-based models and the instant model. In this manner, the time delay between heart beat and pulse at distal extremity is used to determine BP.

Figure 18:
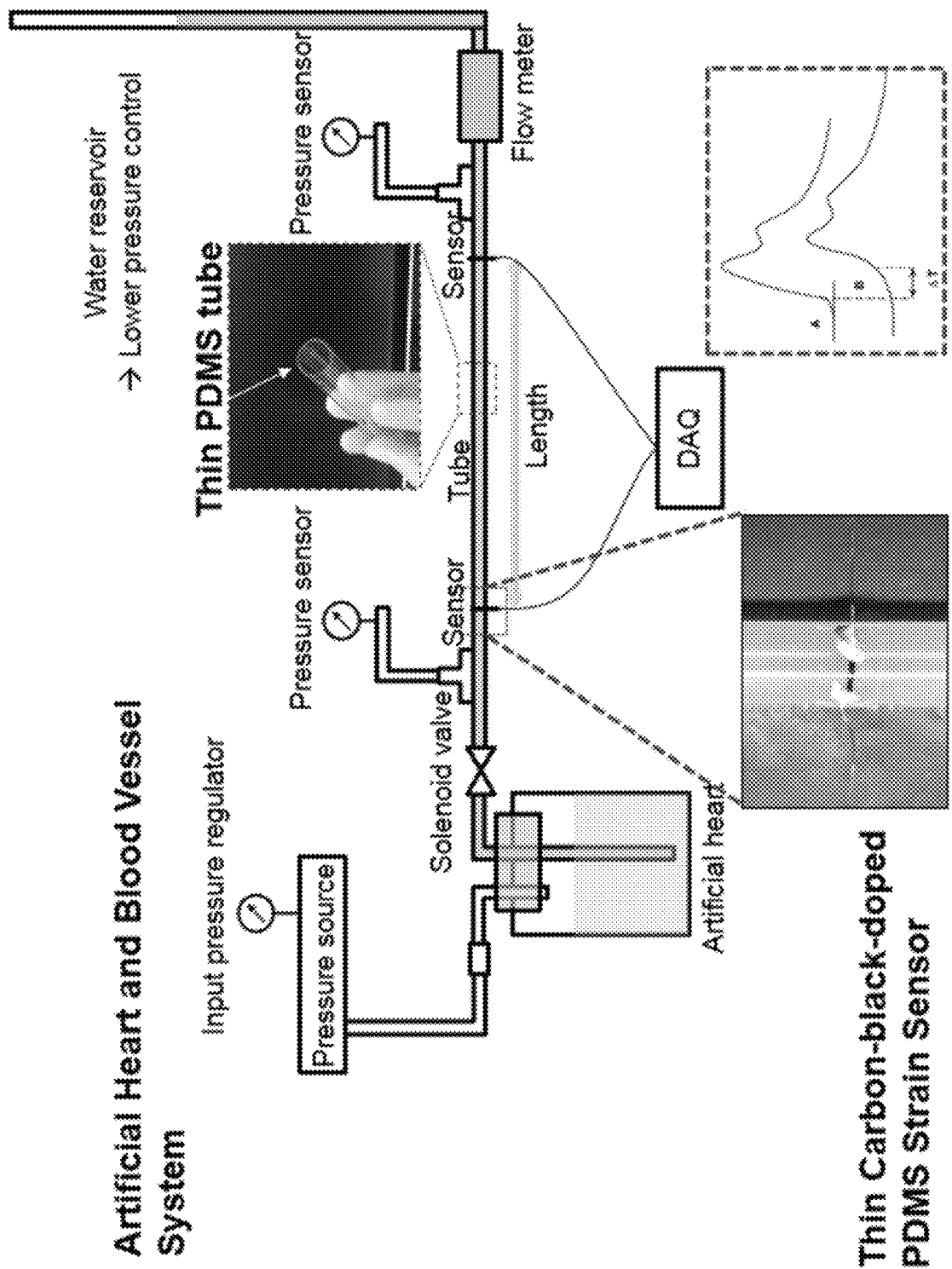
FIG. 18 is a schematic diagram of an in vitro experimental system having an artificial heart and blood vessel system according to one embodiment of the invention.
Figure 19:
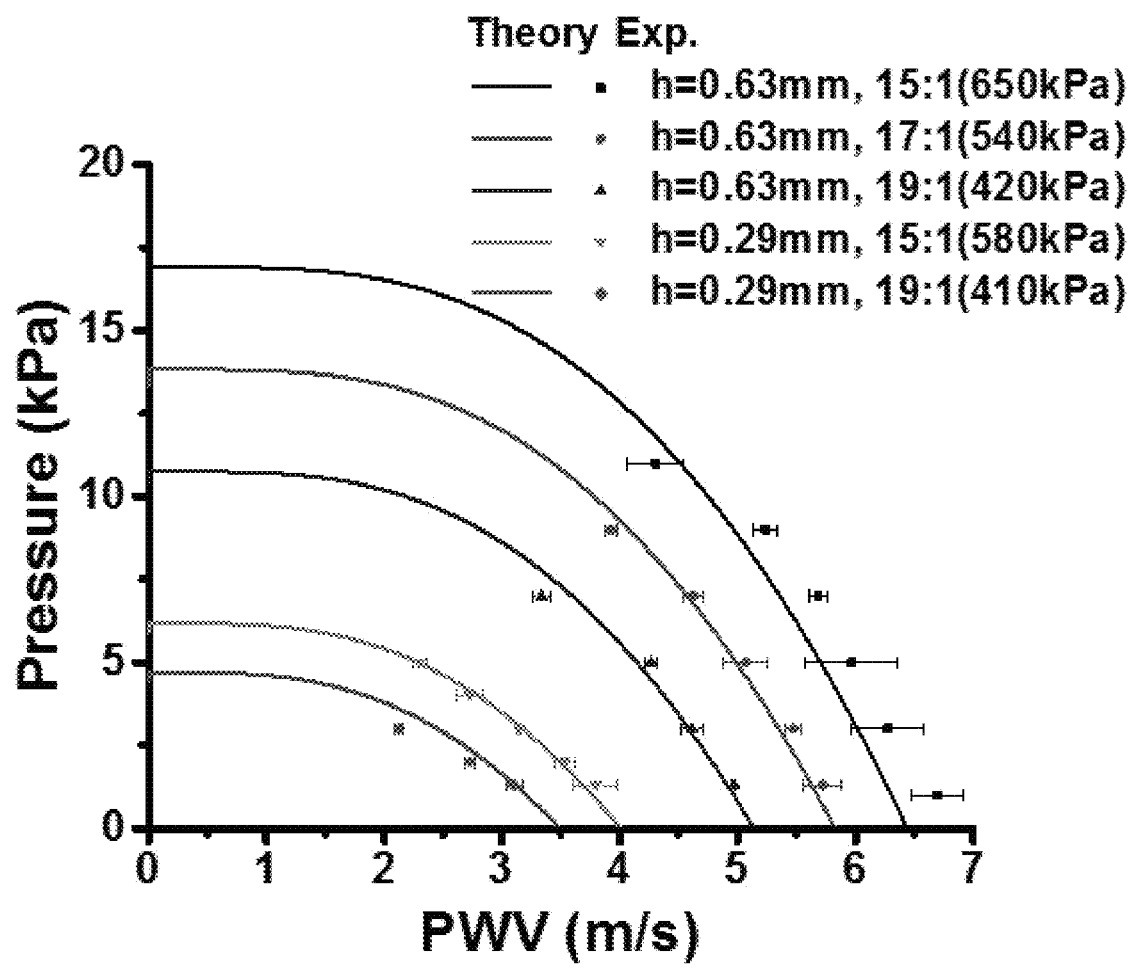
FIG. 19 shows the relations of pressure versus PWV of the model for a linearly elastic tube according to certain embodiments of the invention.

FIG. 18 is similar to FIG. 5A and summarizes the in vitro system that, at least in part, validates the model, and illustrates determination of PAT and, therefore, PWV. Various elastic tubes, having different geometry and moduli, validate the model, for a linear elastic tube. As desired, a calibration step further improves BP sensitivity and/or accuracy. FIG. 19 shows the relations of pressure versus PWV of the model for a linearly elastic tube according to certain embodiments of the invention.

Figure 20:
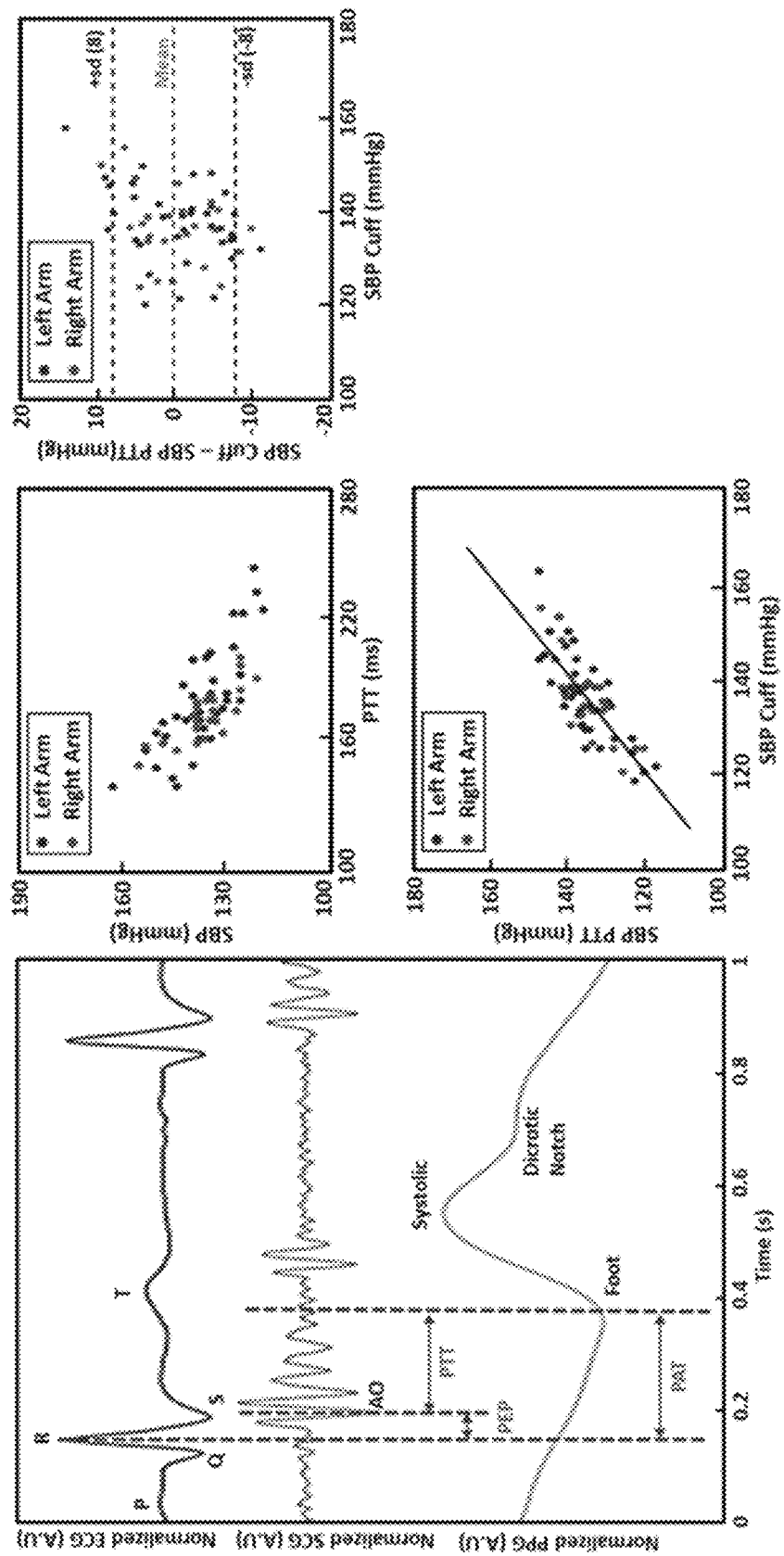
FIG. 20 shows the representative results according to certain embodiments of the invention.
Figure 21:
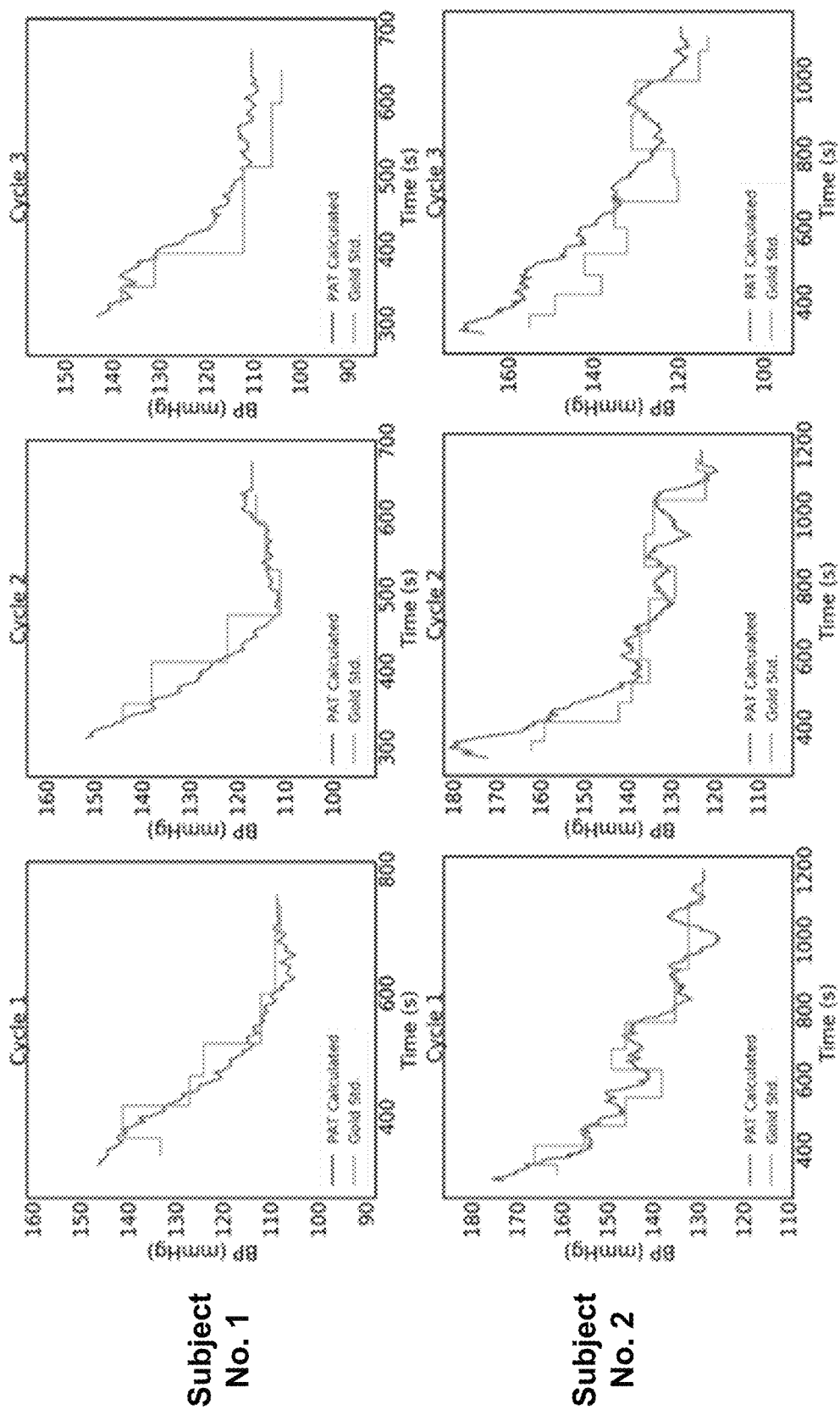
FIG. 21 shows the relations of PAT versus BP adult validation for repeated cycling in 2 subjects over time according to certain embodiments of the invention.
Figure 22:
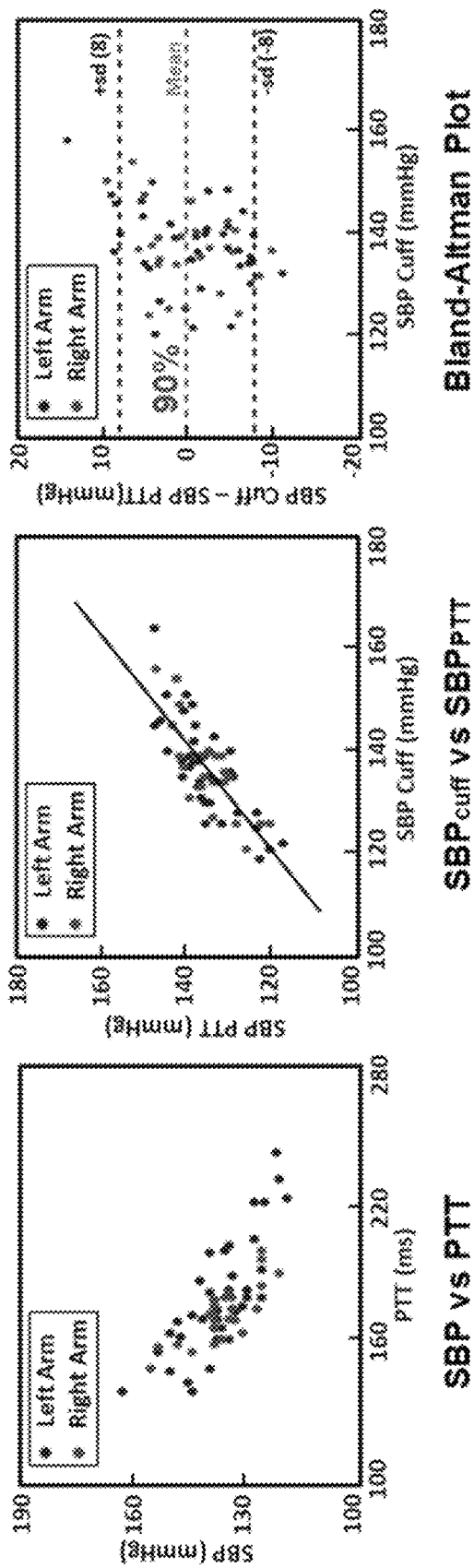
FIG. 22 shows the relations of PAT versus BP adult validation for left and right arms according to certain embodiments of the invention.

Representative results are provided in FIGS. 20-22. In particular, there is good correlation between PAT and BP. The protocol (FIGS. 21 and 22) involves cycling 5 minutes, with a first session serving as calibration, to accommodate person-to-person variability in the PAT vs BP relationship.

Figure 23:
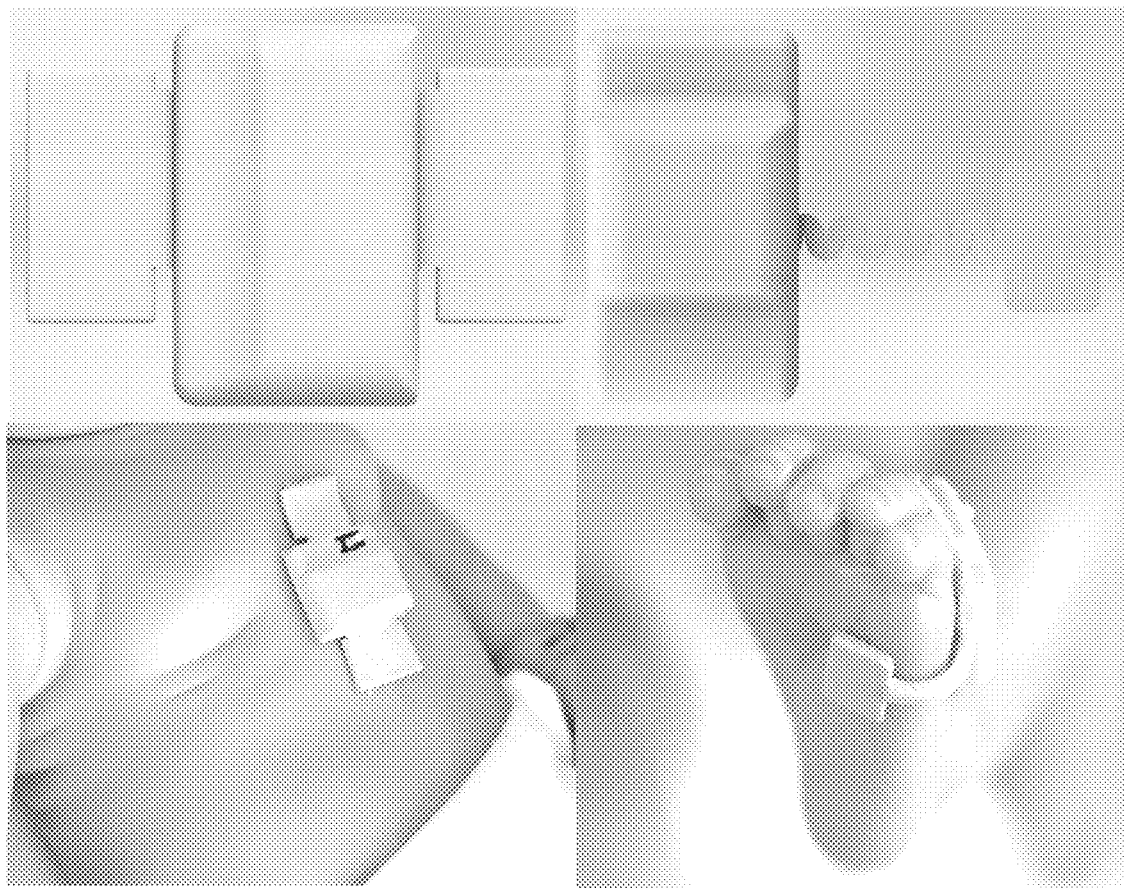
FIG. 23 is a schematic drawing of two patch sensor geometries, configure to connect to a neonate skin at different positions according to certain embodiments of the invention. As illustrated, the positions are the chest and the foot.

FIG. 23, together with FIGS. 2D and 2E, illustrates a physiological monitor that can be adapted and configured to non-invasively and continuously measure blood pressure. A pair of electronically coupled sensor systems, each comprises a plurality of electronic components and a serpentine interconnect to connect different electronic components. The components may include various chips, such as memory and/or processors to onboard initiate module algorithms useful for BP determination, PCB's, transmitter system, including Bluetooth-compatible, and power systems. As shown in each of FIGS. 2D and 2E, the top panels illustrate an elastomeric encapsulation layer with a bottom surface tissue-facing surface. For BP determination, one sensor can be placed on the torso region and another on a limb region (FIG. 23). The sensors can be time-synchronized (including by a master-slave configuration summarized in FIG. 15) with a microprocessor, either on-board or in a separate receiver (e.g., see the handheld device of FIG. 16) that determines PAT and PWV that is, in turn, used to determine blood pressure.

EXAMPLE 3

This example, related to another aspect of the invention, shows advanced algorithms for wearable sensors according to certain embodiments of the invention.

FIGS. 24A-26G exemplify various electronic components, methodology, algorithms and related output data to improve sensor characteristics. For example, described are methods of continuously determining an optimal driving signal provided to an electronic component of the wearable sensor to obtain an optimized measurement of the physiological parameter. The advanced algorithms may be implemented in any of a range of sensor types, including PPG and ECG sensors, and networks thereof.

Figure 24A:
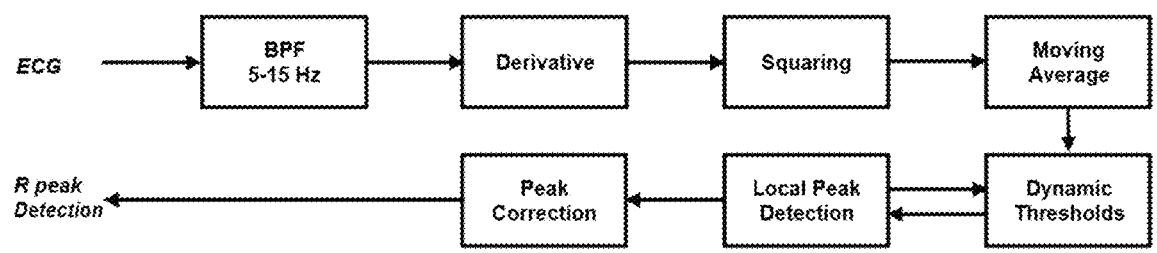
FIG. 24A is a block diagram of in-sensor analytics for peak detection from ECG waveforms according to certain embodiments of the invention, including use of various algorithms.
Figure 24B:
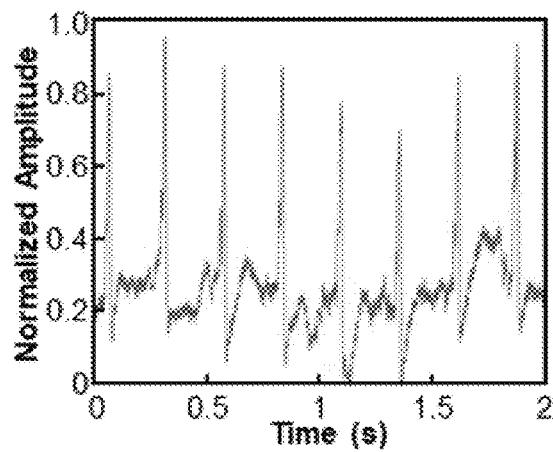
FIGS. 24B-24G show signals of modified Pan-Tompkins algorithm for peak detection from ECG signals according to certain embodiments of the invention.
Figure 24C:
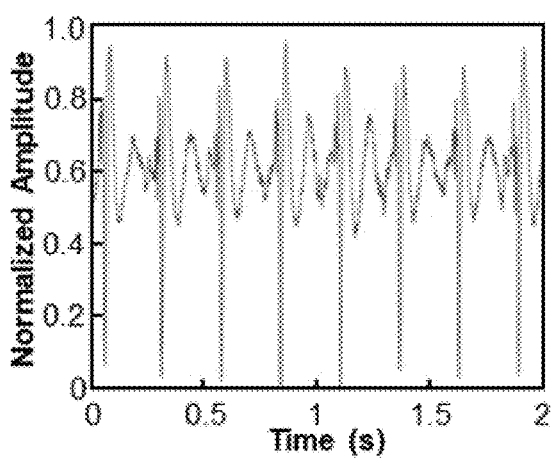
Figure 24D:
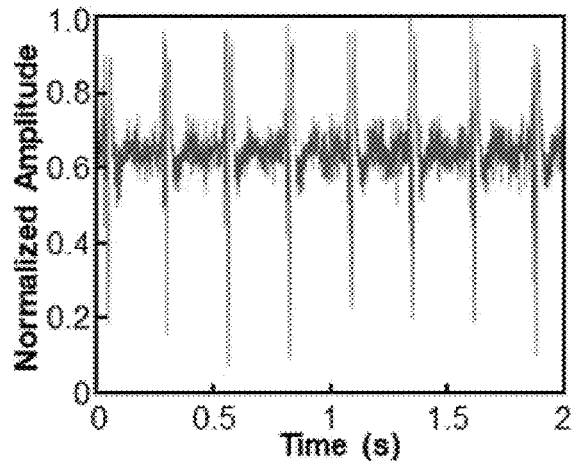
Figure 24E:
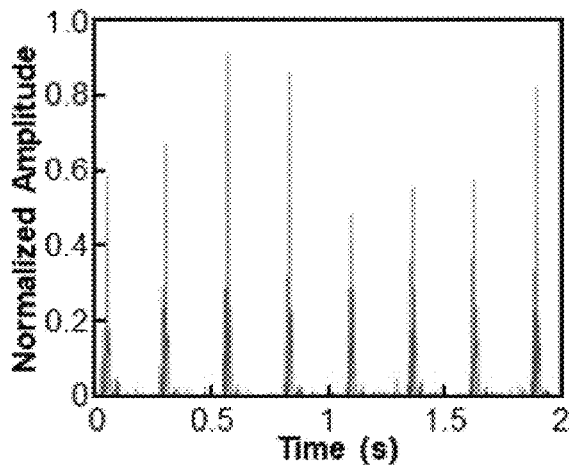
Figure 24F:
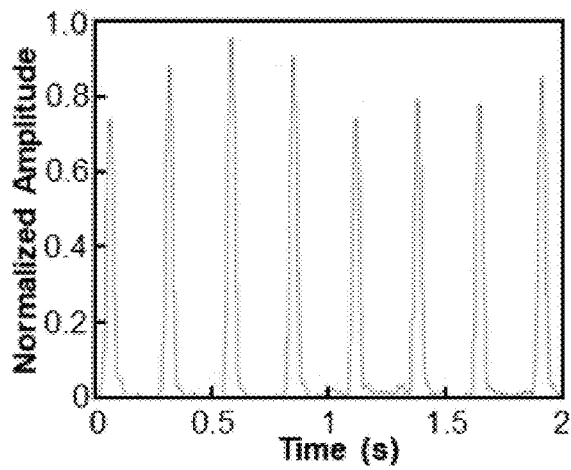
Figure 24G:
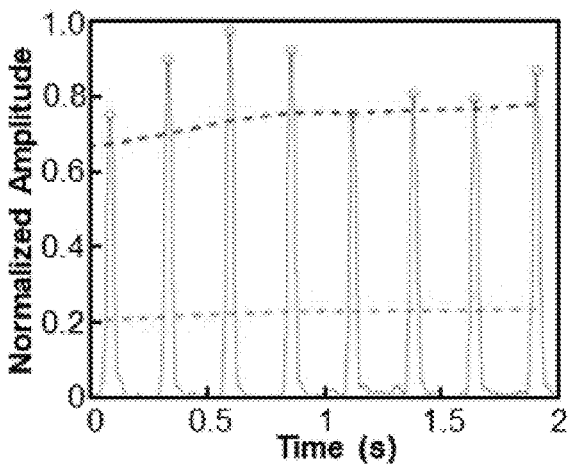

For example, computational facilities on the NFC SoC of the ECG EES can support a streamlined version of the Pan-Tompkins algorithm for accurate, on-board analysis of the QRS complex of ECG signals in real-time to yield HR and HRV on a beat-to-beat basis. FIGS. 24B-24G show signals of modified Pan-Tompkins algorithm for peak detection from ECG signals according to certain embodiments of the invention. Specifically, FIG. 24A summarizes an approach that starts with digital bandpass filter (BPF) ($f_{c1}$=5 Hz, $f_{c2}$=15 Hz) to attenuate the noise. Differentiating and squaring the resulting data yields the slope of QRS peaks and prevents false peak detection associated with the T wave. Applying a moving average and a dynamic threshold identifies a running estimate of the R peak and the magnitude of the noise. Automatic adjustments of the threshold rely on these estimates for the preceding beat cycle (FIGS. 24B-24G). The R-to-R intervals determined in this way yield the instantaneous HR. Simultaneous recordings obtained using a clinical standard system, henceforth referred to as 'gold' standard data, validate the ECG module hardware and in-sensor analytics, via measurements on a healthy adult volunteer (FIGS. 25A and 25B). The ECG signals and computed HR values from these two platforms show no measurable differences. Periodic modulations of the amplitude of the R peak define the RR (FIG. 25C), which also agrees with the gold standard (visual counting by a physician in this case; FIG. 25D).

Any of the devices and methods provided herein may include dynamic thresholding of a PPG sensor. By applying a step function of current driving the LEDs, the optimal amount of driving current to obtain the best photopleth signal is achieved. This allows for dynamic determination of LED operation for PPG operation on a patient-by-patient (e.g., automated individualized sensor optimization) in skin types of various pigmentation and translucency (important in skin of color and neonatal skin).

Figure 26A:
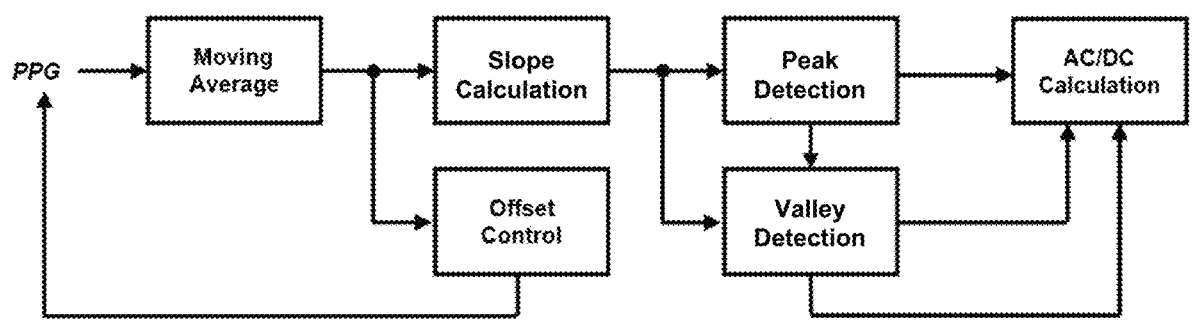
FIGS. 26A-26G show operational characteristics of the PPG EES according to certain embodiments of the invention.
Figure 26B:
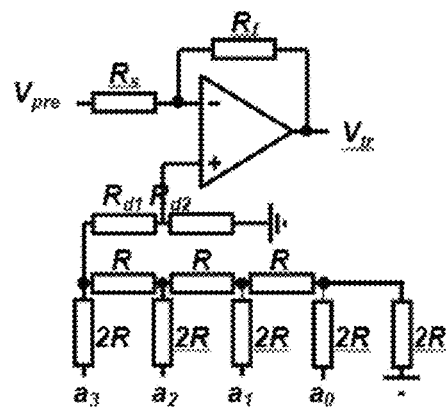

FIGS. 26A-26G show operational characteristics of the PPG EES according to certain embodiments of the invention. The PPG EES relies on similar NFC protocols, but with in-sensor analytic methods that not only reduce requirements on transmission bandwidth but also provide, when used in conjunction with adaptive circuits, crucial functionality for stable operation. Specifically, the processing in this case can enable (i) dynamic baseline control to ensure that the input to the ADC on the NFC SoC lies within the linear response range and (ii) real-time calculation of $SpO_2$ from the PPG traces (FIG. 26A). Here, the processing begins with application of a moving average filter to the photodetector response from the red and IR LEDs. When the larger of these two averaged PPG amplitudes (typically that associated with the IR response) lies outside of a range that is optimal for the ADC (0.25-0.7 V), a programmable difference amplifier with voltage dividers at V+ dynamically adjust the baseline level. The circuit shown in FIG. 26B demonstrates the operation where the governing equation is $$V_{tr} = -\frac{R_f}{R_s}V_{pre} + \left(1 + \frac{R_f}{R_s}\right)V_+ \qquad (28)$$

where $V_{tr}$ is the voltage output of the amplifier, $V_{pre}$ is the voltage of the input signal, $R_s$ is the input resistance, $R_f$ is the feedback resistance. The voltage divider at $V_+$ with resistor $R_{d1}$ and $R_{d2}$ governs following equation with $V_{ref}$ of 1.8V $$V_+ = \frac{R_{d2}V_{ref}}{R_{d2}+R_{d1}}\left(\frac{a_0}{16} + \frac{a_1}{8} + \frac{a_2}{4} + \frac{a_3}{2}\right) \qquad (29)$$

Figure 26C:
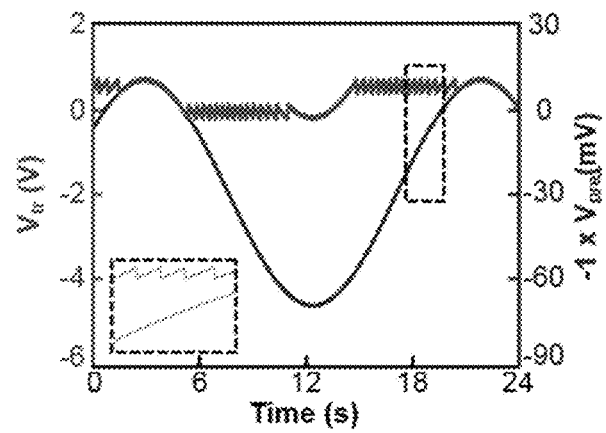
Figure 26D:
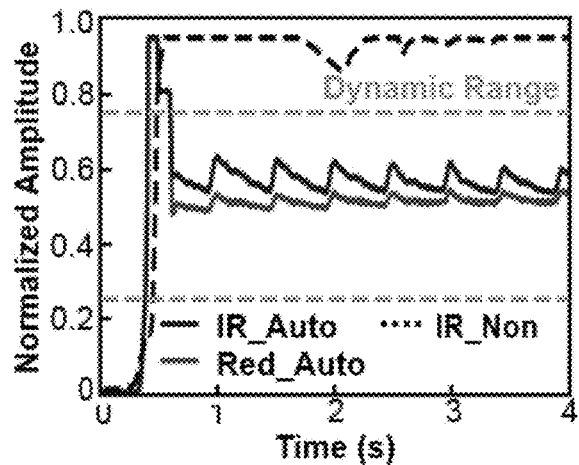

Sixteen different baseline states can be accessed via activation of binary values from four general purpose input output pins ($a_0$, $a_1$, $a_2$, $a_3$) on the SoC, applied through an R-2R resistor ladder. FIG. 26C shows dynamic control of the output voltage ($V_tr$) of a sinusoidal input signal (frequency=50 mHz, amplitude=40 mV, $V_{offset}$=-30 mV). Starting with the default setting of the GPIO ports ($a_0$, $a_1$, $a_2$, $a_3$; all high, or 1111), the baseline level automatically adjusts to lower levels associated as the value of $V_{tr}$ drifts above the upper boundary of the specified voltage range, and vice versa as $V_{tr}$ falls below the lower boundary. The result maintains $V_{tr}$ in the allowed range. FIG. 26D summarizes the operation in an actual PPG recording. Without this type of real-time, in-sensor processing (IR_Non in FIG. 26D) robust operation is not practical: PPG signals would quickly drift outside of the narrow operating range of the ADC due to patient-to-patient variations in skin pigmentation and unavoidable, time-dependent fluctuations in optical scattering that result from micro-motions relative to underlying blood vessels and subdermal structures.

Figure 26E:
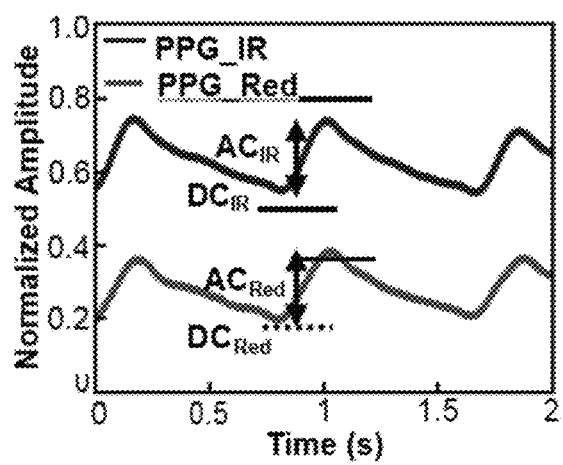
Figure 26F:
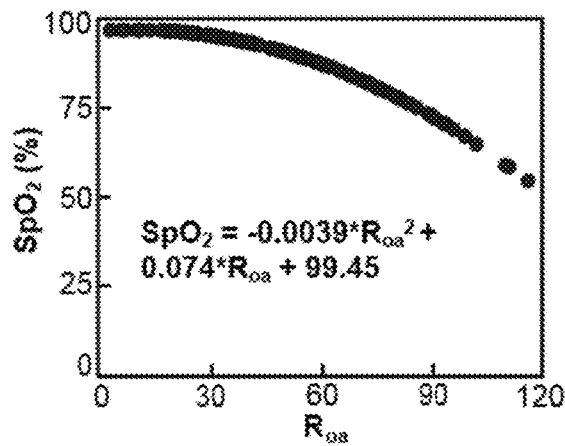
Figure 26G:
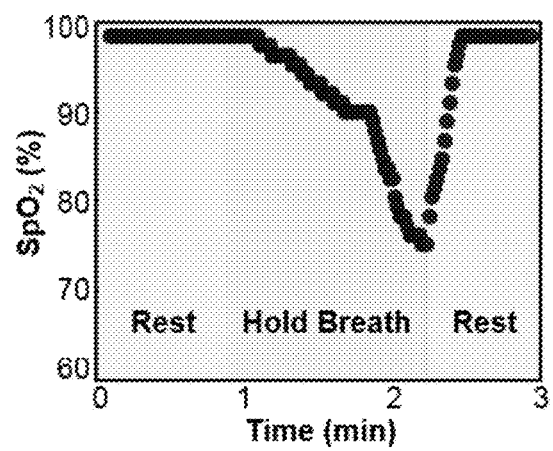

Calculating $SpO_2$ involves determining the ratio ($R_{oa}$) between the alternating and direct components of the PPG signals according to $$R_{oa} = \frac{AC_{RED}}{DC_{RED}} / \frac{AC_{IR}}{DC_{IR}} \qquad (30)$$

for data from the red and IR LEDs (FIG. 26E). An empirical calibration formula determined by comparison to an FDA-cleared fingertip oximeter measurement (MightySat Fingertip Oximeter, Masimo®) converts the $R_{oa}$ to $SpO_2$ (FIG. 26F). Time dependent variations of $SpO_2$ determined in this manner appear in FIG. 26G with demonstration in a decrease with a breath hold in an adult volunteer.

The advanced algorithms for wearable sensors provide auto-calibration and ensure a sensor is compatible with a wide range of patients, including PPG and ECG sensors. In this manner, sensor accuracy, reliability and robustness are improved. The algorithm may be broadly characterized as "dynamic thresholding" or "dynamic thresholds", where various inputs/outputs, such as driving voltage or current or output voltage or current are filtered to attenuate noise, or are selected or adjusted to provide an optimal input to accommodate differences between patients and differences as sensor location is moved on a patient. This may maintain output voltages in a desired range, avoid drift, and accommodate time-dependent fluctuations or noise due to fluctuations in optical scattering arising from micro-motions relative to subdermal structures, including underlying blood vessels.

In certain embodiments, any of the systems and devices described herein may be used to practice any of the methods of the invention.

In a further aspect, the invention relates to a non-transitory tangible computer-readable medium storing instructions which, when executed by one or more processors, cause the method as discussed above to be performed.

The foregoing description of the exemplary embodiments of the present invention has been presented only for the purposes of illustration and description and is not intended to be exhaustive or to limit the invention to the precise forms disclosed. Many modifications and variations are possible in light of the above teaching.

The embodiments were chosen and described in order to explain the principles of the invention and their practical application so as to activate others skilled in the art to utilize the invention and various embodiments and with various modifications as are suited to the particular use contemplated. Alternative embodiments will become apparent to those skilled in the art to which the present invention pertains without departing from its spirit and scope. Accordingly, the scope of the present invention is defined by the appended claims rather than the foregoing description and the exemplary embodiments described therein.

LIST OF REFERENCES

[1]. Lewington S (2002) Prospective studies collaboration. Age-specific relevance of usual blood pressure to vascular mortality: A meta-analysis of individual data for one mil-lion adults in 61 prospective studies. Lancet 360: 1903-1913, and erratum (2003) 361: 1060.

[2]. Méndez A S, et al. (2018) Risk factors for orthostatic hypotension: Differences between elderly men and women. Am J Hypertens 31:797-803.

[3]. Wright J T, Jr, et al.; SPRINT Research Group (2015) A randomized trial of intensive versus standard blood-pressure control. N Engl J Med 373:2103-2116.

[4]. Lewington S, et al.; China Kadoorie Biobank Consortium (2016) The burden of hypertension and associated risk for cardiovascular mortality in China. JAMA Intern Med 176:524-532.

[5]. McLaughlin A R (1928) A modified erlanger sphygmomanometer. Science 67:72-73.

[6]. Punzi H A (1998) Why ambulatory blood pressure monitoring? Am J Health Syst Pharm 55:S12-S16.

[7]. Ukawa T, et al. (2012) Novel non-invasive method of measurement of endothelial function: Enclosed-zone flow-mediated dilatation (ezFMD). Med Biol Eng Comput 50: 1239-1247.

[8]. Chandrasekhar A, et al. (2018) Smartphone-based blood pressure monitoring via the oscillometric finger-pressing method. Sci Transl Med 10:eaap8674.

[9]. Pickering T G, et al. (2005) Recommendations for blood pressure measurement in humans and experimental animals: Part 1: Blood pressure measurement in humans: A statement for professionals from the subcommittee of professional and public education of the American Heart Association council on high blood pressure research. Circulation 111:697-716.

[10]. Fuke S, Suzuki T, Nakayama K, Tanaka H, Minami S (2013) Blood pressure estimation from pulse wave velocity measured on the chest. Conf Proc IEEE Eng Med Biol Soc 2013:6107-6110.

[11]. Berkelmans G F N, Kuipers S, Westerhof B E, Spoelstra-de Man A M E, Smulders Y M (2018) Comparing volume-clamp method and intra-arterial blood pressure measurements in patients with atrial fibrillation admitted to the intensive or medium care unit. J Clin Monit Comput 32:439-446.

[12]. Scheer B, Perel A, Pfeiffer U J (2002) Clinical review: Complications and risk factors of peripheral arterial catheters used for haemodynamic monitoring in anaesthesia and intensive care medicine. Crit Care 6:199-204.

[13]. Peter L, Noury N, Cerny M (2014) A review of methods for non-invasive and contin-uous blood pressure monitoring: Pulse transit time method is promising? IRBM 35: 271-282.

[14]. Sharma M, et al. (2017) Cuff-less and continuous blood pressure monitoring: A methodological review. Technologies 5:21.

[15]. Boutry C M, et al. (2015) A sensitive and biodegradable pressure sensor array for cardiovascular monitoring. Adv Mater 27:6954-6961.

[16]. Katsuura T, et al. (2017) Wearable pulse wave velocity sensor using flexible piezo-electric film array. 2017 IEEE Biomedical Circuits and Systems Conference (BioCAS) (Inst Electr Electron Eng, New York), abstr 7208.

[17]. Bramwell J C (1922) The velocity of the pulse wave in man. Proc R Soc B 93:298-306.
[18]. Hughes D J, Babbs C F, Geddes L A, Bourland J D (1979) Measurements of Young's modulus of elasticity of the canine aorta with ultrasound. Ultrason Imaging 1: 356-367.
[19]. Fung Y C (1997) Biomechanics: Circulation (Springer, New York).
[20]. Timoshenko S (1940) Theory of Plates and Shells (McGraw-Hill, London).
[21]. Fung Y C (1993) Biomechanics: Mechanical Properties of Living Tissues (Springer, New York).
[22]. Lu N S, Lu C, Yang S X, Rogers J (2012) Highly sensitive skin-mountable strain gauges based entirely on elastomers. Adv Funct Mater 22:4044-4050.
[23]. Dagdeviren C, et al. (2014) Conformable amplified lead zirconate titanate sensors with enhanced piezoelectric response for cutaneous pressure monitoring. Nat Commun 5:4496.
[24]. Maximon L C (2003) The dilogarithm function for complex argument. Proc R Soc A 459: 2807-2819.
[25]. Morris R M, Leach P G L (2015) Symmetry reductions and solutions to the Zoomeron equation. Phys Scr 90:015202.
[26]. Chamiot-Clerc P, Copie X, Renaud J F, Safar M, Girerd X (1998) Comparative reactivity and mechanical properties of human isolated internal mammary and radial arteries. Cardiovasc Res 37:811-819.
[27]. Laurent S, et al.; European Network for Non-invasive Investigation of Large Arteries (2006) Expert consensus document on arterial stiffness: Methodological issues and clinical applications. Eur Heart J 27:2588-2605.
[28]. Acton F S (1970) Numerical Methods That Work (Harper Row, Washington, DC).
[29]. Chen Y, Wen C, Tao G, Bi M (2012) Continuous and noninvasive measurement of systolic and diastolic blood pressure by one mathematical model with the same model parameters and two separate pulse wave velocities. Ann Biomed Eng 40:871-882.
[30]. Liu Y, et al. (2018) Intraoperative Monitoring of neuromuscular function with soft, skin-mounted wireless devices. npj Digital Med, 1:19.
[31]. Jang K I, et al. (2017) Self-assembled three dimensional network designs for soft electronics. Nat Commun 8:15894.
[32]. Li H, et al. (2017) Epidermal inorganic optoelectronics for blood oxygen measurement. Adv Healthc Mater, 6:1601013.
[33]. doi.org/10.1073/pnas.1814392115 Yniji Ma et al. "Relation between blood pressure and pulse wave velocity for human arteries" PNAS (published Oct. 15, 2018)

What is claimed is:

1. An apparatus for non-invasively measuring a blood pressure of a mammal subject, comprising:
a first sensor system and a second sensor system that are time-synchronized to each other and spatially separated by a pulse arrival distance L, wherein the first sensor system is attached to a first position of the mammal subject for detecting a first signal, the second sensor system attached to a second position of the mammal subject for detecting a second signal, the second position is more distal or proximal to a heart of the mammal subject than the first position, and the pulse arrival distance L is defined by the first and second positions, wherein each of the first sensor system and the second sensor system comprises:
a plurality of electronic components, and a plurality of flexible and stretchable interconnects electrically connected to different electronic components, wherein the plurality of electronic components comprise a sensor member for measuring the first signal or the second signal of the mammal subject;
an elastomeric encapsulation layer at least partially surrounding the plurality of electronic components and the plurality of flexible and stretchable interconnects to form a tissue-facing surface operably attached to the mammal subject and an environment-facing surface; and
a microfluidic chamber formed between the tissue-facing surface and the plurality of electronic components in the elastomeric encapsulation layer;
wherein the sensor member of the first sensor system includes at least one electrode, and the microfluidic chamber of the first sensor system has at least one through openings defined therethrough such that during use the at least one electrode is directly in epidermal contact with a skin surface of the mammal subject through the at least one opening for detecting the first signal; and
a microcontroller unit (MCU) adapted in wireless communication with the first sensor system and the second sensor system, and configured to:
receive output signals of the first sensor system and the second sensor system;
process the output signals to determine a pulse arrival time (PAT) as a time delay $\Delta t$ between detection of the first signal and detection of the second signal;
determine a pulse wave velocity (PWV) based on the PAT and the pulse arrival distance L, wherein $$PWV = \frac{L}{\Delta t};$$

and
determine the blood pressure P of the mammal subject from the PWV, wherein P is a parabolic function of the PWV.

2. The apparatus of claim 1, wherein $P=\alpha PWV^2+\beta$, and a and B are empirically determined constants depending on artery geometry and artery material properties of the mammal subject.

3. The apparatus of claim 2, wherein at a blood pressure range between 5 kPA and 20 kPa, $$0.13 \text{ kPa} \times s^2/m^2 \leq \alpha \leq 0.23 \text{ kPa} \times s^2/m^2; \text{ and}$$

$$2.2 \text{ kPa} \leq \beta \leq 3.2 \text{ kPa}.$$

4. The apparatus of claim 1, wherein the MCU is further configured to transmit the determined blood pressure to at least one of a patient database, a cloud server, and a mobile device.

5. The apparatus of claim 1, wherein the MCU is further configured to generate an alarm when the determined blood pressure is out of a pre-defined range, and notify a practitioner or caregiver of the alarm.

6. The apparatus of claim 1, wherein the plurality of flexible and stretchable interconnects comprise at least one of serpentine interconnects and zigzag interconnects.

7. The apparatus of claim 1, wherein the first sensor system is an electrocardiography (ECG) system, and the second sensor system is a photoplethysmography (PPG) sensor system.

8. The apparatus of claim 7, wherein the sensor member of the first sensor system comprises at least two ECG electrodes spatially separated from each other by an electrode distance.

9. The apparatus of claim 7, wherein the sensor member of the second sensor system comprises a photoplethysmogram (PPG) sensor comprising an optical source and an optical detector located within a sensor footprint.

10. The apparatus of claim 1, wherein the first sensor system is an inertial motion sensor system or an accelerometer system.

11. The apparatus of claim 1, wherein the first position is at a torso region of the mammal subject, and the second position is at an extremity region of the mammal subject.

12. The apparatus of claim 1, being used for continuously measuring the blood pressure of the mammal subject for a time period.

13. The apparatus of claim 1, wherein each system is in wireless communication with the MCU via a near field communication (NFC) protocol, or Bluetooth protocol.

14. The apparatus of claim 1, wherein the mammal subject is a human subject or a non-human subject.

15. The apparatus of claim 1, wherein the microfluidic chamber is at least partially filled with at least one of an ionic liquid and a gel.

16. The apparatus of claim 15, wherein the ionic liquid in the microfluidic chamber contains a dye for visualization.

17. The apparatus of claim 1, wherein the at least one electrode includes a pair of electrodes spatially separated from each other by an electrode distance for ECG generation.

18. The apparatus of claim 17, wherein each of the pair of electrodes is either a mesh electrode or a solid electrode.

19. An apparatus for non-invasively measuring blood pressure of a mammal subject, comprising:
a sensing apparatus attached to the mammal subject, comprising:
a first sensor system operably attached to a first position of the mammal subject for detecting a first signal; and
a second sensor system operably attached to a second position of the mammal subject for detecting a second signal,
wherein the second position is more distal or proximal to a heart of the mammal subject than the first position, and the first sensor system and the second sensor system are time-synchronized, and spatially separated by a pulse arrival distance L defined by the first and second positions; and
wherein each of the first sensor system and the second sensor system comprises a plurality of electronic components, and a plurality of flexible and stretchable interconnects electrically connected to different electronic components, wherein the plurality of electronic components comprise a sensor member for measuring the first signal or the second signal of the mammal subject; an elastomeric encapsulation layer at least partially surrounding the plurality of electronic components and the plurality of flexible and stretchable interconnects to form a tissue-facing surface operably attached to the mammal subject and an environment-facing surface; and a microfluidic chamber formed between the tissue-facing surface and the plurality of electronic components in the elastomeric encapsulation layer;
wherein the sensor member of the first sensor system includes at least one electrode, and the microfluidic chamber of the first sensor system has at least one through openings defined therethrough such that during use the at least one electrode is directly in epidermal contact with a skin surface of the mammal subject through the at least one opening for detecting the first signal; and
a microcontroller unit (MCU) in wireless communication with the sensor systems, configured to:
receive output signals of the first sensor system and the second sensor system;
process the output signals to determine a pulse wave velocity (PWV) based on a pulse arrival time (PAT), wherein the PAT is a time delay Δt between detection of the first signal and detection of the second signal; and
determine a blood pressure P of the mammal subject from the PWV.

20. The apparatus of claim 19, wherein the MCU is further configured to determine the PWV by:
determining the PAT as the time delay Δt between the detection of the first signal and the detection of the second signal; and
determining the PWV based on the PAT and the pulse arrival distance L, wherein $$PWV = \frac{L}{\Delta t}.$$

21. The apparatus of claim 19, wherein the blood pressure P of the mammal subject is calculated from the PWV according to the formula of:

$$P = \alpha PWV^2 + \beta,$$

wherein α and β are empirically determined constants depending on artery geometry and artery material properties of the mammal subject.

22. The apparatus of claim 21, wherein at a blood pressure range between 5 kPa and 20 kPa, $$0.13 \text{ kPa} \times \text{s}^2/\text{m}^2 \leq \alpha \leq 0.23 \text{ kPa} \times \text{s}^2/\text{m}^2; \text{ and}$$

$$2.2 \text{ kPa} \leq \beta \leq 3.2 \text{ kPa}.$$

23. The apparatus of claim 19, wherein the MCU is further configured to transmit the determined blood pressure to at least one of a patient database, a cloud server, and a mobile device.

24. The apparatus of claim 19, wherein the MCU is further configured to generate an alarm the determined blood pressure is out of a pre-defined range, and notify a practitioner or caregiver of the alarm.

25. The apparatus of claim 19, wherein the plurality of flexible and stretchable interconnects comprise at least one of serpentine interconnects and zigzag interconnects.

26. The apparatus of claim 19, wherein the first sensor system is an electrocardiography (ECG) system, and the second sensor system is a photoplethysmography (PPG) sensor system.

27. The apparatus of claim 26, wherein the sensor member of the first sensor system comprises at least two ECG electrodes spatially separated from each other by an electrode distance.

28. The apparatus of claim 26, wherein the sensor member of the second sensor system comprises a photoplethysmogram (PPG) sensor comprising an optical source and an optical detector located within a sensor footprint.

29. The apparatus of claim 19, wherein the first sensor system is an inertial motion sensor system or an accelerometer system.

30. The apparatus of claim 19, wherein the first position is at a torso region of the mammal subject, and the second position is at an extremity region of the mammal subject.

31. The apparatus of claim 19, wherein each of the first sensor system and the second sensor system is in wireless communication with the MCU via a near field communication (NFC) protocol, or Bluetooth protocol.

32. A method of non-invasively measuring blood pressure of a mammal subject, comprising:
utilizing a sensing apparatus with the mammal subject, wherein the sensing apparatus is in wireless communication with a microcontroller unit (MCU), and comprises a first sensor system attached to a first position of the mammal subject for measuring a first signal and a second sensor system attached to a second position of the mammal subject for measuring a second signal, the second position is more distal or proximal to a heart of the mammal subject than the first position, and the first sensor system and the second sensor system are time-synchronized, and spatially separated by a pulse arrival distance L defined by the first and second positions, wherein each of the first sensor system and the second sensor system comprises a plurality of electronic components, and a plurality of flexible and stretchable interconnects electrically connected to different electronic components, wherein the plurality of electronic components comprise a sensor member for measuring the first signal or the second signal of the mammal subject; an elastomeric encapsulation layer at least partially surrounding the plurality of electronic components and the plurality of flexible and stretchable interconnects to form a tissue-facing surface operably attached to the mammal subject and an environment-facing surface; and a microfluidic chamber formed between the tissue-facing surface and the plurality of electronic components in the elastomeric encapsulation layer; wherein the sensor member of the first sensor system includes at least one electrode, and the microfluidic chamber of the first sensor system has at least one through openings defined therethrough such that during use the at least one electrode is directly in epidermal contact with a skin surface of the mammal subject through the at least one opening for detecting the first signal;
measuring, by the sensing apparatus, the first signal and the second signal of the mammal subject;
processing, by the MCU, output signals of the first sensor system and the second sensor system to determine a pulse wave velocity (PWV) based on a pulse arrival time (PAT), wherein the PAT is a time delay $\Delta t$ between detection of the first signal and detection of the second signal; and
determining a blood pressure P of the mammal subject from the PWV.

33. The method of claim 32, wherein said determining the PWV comprises:
determining the PAT as the time delay $\Delta t$ between the detection of the first signal and the detection of the second signal; and
determining the PWV based on the PAT and the pulse arrival distance L, wherein $$PWV = \frac{L}{\Delta t}.$$

34. The method of claim 33, wherein the blood pressure P of the mammal subject is calculated from the PWV according to the formula of:

$$P = \alpha PWV^2 + \beta,$$

wherein $\alpha$ and $\beta$ are empirically determined constants depending on artery geometry and artery material properties of the mammal subject.

35. The method of claim 34, wherein at a blood pressure range between 5 kPa and 20 kPa, $$0.13 \text{ kPa} \times \text{s}^2/\text{m}^2 \leq \alpha \leq 0.23 \text{ kPa} \times \text{s}^2/\text{m}^2; \text{ and}$$

$$2.2 \text{ kPa} \leq \beta \leq 3.2 \text{ kPa}.$$

36. The method of claim 32, further comprising transmitting the determined blood pressure to at least one of a patient database, a cloud server, and a mobile device.

37. The method of claim 32, further comprising generating an alarm the determined blood pressure is out of a pre-defined range, and notify a practitioner or caregiver of the alarm.

38. The method of claim 32, wherein the first sensor system is an electrocardiography (ECG) system, and the second sensor system is a photoplethysmography (PPG) sensor system.

39. The method of claim 32, wherein the first sensor system is an inertial motion sensor system or an accelerometer system.

40. The method of claim 32, wherein the first position is at a torso region of the mammal subject, and the second position is at an extremity region of the mammal subject.

41. The method of claim 32, wherein each of the first sensor system and the second sensor system is in wireless communication with the MCU via a near field communication (NFC) protocol, or Bluetooth protocol.

42. A non-transitory tangible computer-readable medium storing instructions which, when executed by one or more processors, cause the method of claim 32 to be performed.

* * * * *